United States Patent [19]

Kato et al.

[11] Patent Number: 5,104,760

[45] Date of Patent: Apr. 14, 1992

[54] ELECTROPHOTOGRAPHIC LIGHT-SENSITIVE MATERIAL

[75] Inventors: Eiichi Kato; Kazuo Ishii, both of Shizuoka, Japan

[73] Assignee: Fuji Photo Film Co., Ltd., Kanagawa, Japan

[21] Appl. No.: 550,841

[22] Filed: Jul. 10, 1990

[30] Foreign Application Priority Data

Jul. 10, 1989 [JP] Japan .................................. 1-175730
Aug. 18, 1989 [JP] Japan .................................. 1-212397

[51] Int. Cl.$^5$ .......................................... G03G 5/087
[52] U.S. Cl. ........................................ 430/96; 430/49; 430/58; 430/910
[58] Field of Search ..................... 430/96, 49, 58, 910

[56] References Cited

U.S. PATENT DOCUMENTS

| | | | |
|---|---|---|---|
| 4,952,475 | 8/1990 | Kato et al. | 430/96 |
| 4,954,407 | 9/1990 | Kato et al. | 430/96 |
| 4,960,661 | 10/1990 | Kato et al. | 430/49 |
| 4,968,572 | 11/1990 | Kato et al. | 430/96 |
| 5,009,975 | 4/1991 | Kato et al. | 430/96 |

*Primary Examiner*—Marion E. McCamish
*Assistant Examiner*—Stephen Rosasco
*Attorney, Agent, or Firm*—Sughrue, Mion, Zinn Macpeak & Seas

[57] ABSTRACT

An electrophotographic light-sensitive material comprising a support having at least one photoconductive layer containing an inorganic photoconductive substance and a binder resin comprising (A) at least one resin containing not less than 30% by weight of a copolymerizable component corresponding to a repeating unit represented by the general formula (I) and having at least one acidic group selected from the group consisting of —PO$_3$H$_2$, —SO$_3$H, —COOH, —OH

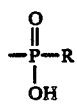

(wherein R represents a hydrocarbon group of —OR' (wherein R' represents a hydrocarbon group)) and a cyclic acid anhydride-containing group at one of the terminals of the main chain thereof;

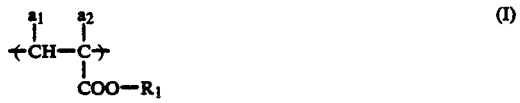

wherein $a_1$ and $a_2$ each represents a hydrogen atom, a halogen atom, a cyano group or a hydrocarbon group; and R$_1$ represents a hydrocarbon group; and (B) at least one copolymer resin containing at least one polyester type macromonomer represented by the following general formula (IIIa), (IIIb), (IIIc), or (IIId):

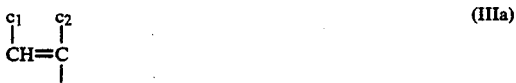

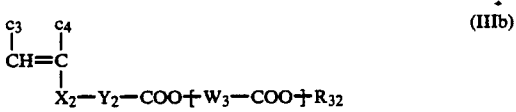

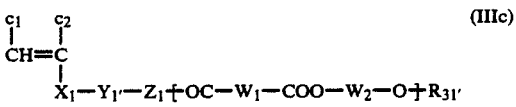

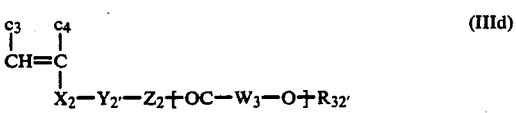

wherein the group in the brackets represents a recurring unit; $c_1$ and $c_2$, which may be the same or different, each represents a hydrogen atom, a halogen atom, a cyano group, a hydrocarbon group having from 1 to 8 carbon atoms, —COO—V$_1$, or —COO—V$_2$ bonded through a hydrocarbon group having from 1 to 8 carbon atoms (wherein V$_1$ and V$_2$ each represents a hydrocarbon group having from 1 to 18 carbon atoms); X$_1$ represents a direct bond, —COO—, —OCO—, —CH$_2$)$_{l_1}$COO—, —CH$_2$)$_{l_2}$OCO— (wherein $l_1$ and $l_2$ each represents an integer of from 1 to 3),

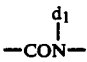

wherein $d_1$ represent a hydrogen atom or a hydrocarbon group having from 1 to 12 carbon atoms, —CONHCONH—, —CONHCOO—, —O—,

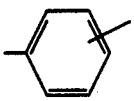

or —SO$_2$—; Y$_1$ represents a group bonding X$_1$ to —COO—; W$_1$ and W$_2$, which may be the same or different, each represents a divalent aliphatic group, a divalent aromatic group (each of the aforesaid groups may have, in the bond of each divalent organic moiety, at least one bonding group selected from —O—, —S—,

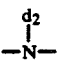

wherein $d_2$ represents a hydrogen atom or a hydrocarbon group having from 1 to 12 carbon atoms), —SO$_2$—, (List continued on next page.)

—COO—, —OCO—, —CONHCO—, —NHCONH—, $$-\underset{d_4}{\overset{d_3}{\underset{|}{\overset{|}{Si}}}}-)$$

$$-\underset{|}{\overset{d_3}{\underset{}{\overset{|}{CON}}}}-$$

(wherein $d_3$ has the same meaning as $d_2$), $$-\overset{d_4}{\underset{}{\overset{|}{SO_2N}}}-$$

(wherein $d_4$ has the same meaning as $d_2$), and or an organic moiety composed of a combination of these moieties; $R_{31}$ represents a hydrogen atom or a hydrocarbon group; $c_3$ and $c_4$ have the same meaning as $c_1$ and $c_2$; $X_2$ has the same meaning as $X_1$; $Y_2'$ represents a group bonding $X_2$ to —COO—; $W_3$ represents a divalent aliphatic group; $R_{32}$ has the same meaning as $R_{31}$; $R_{31}'$ represents a hydrogen atom, a hydrocarbon group or —$COR_{33}'$ (wherein $R_{33}'$ represents a hydrocarbon group); $Y_1$, represents a group bonding $X_1$ to $Z_1$; $Z_1$ represents —$CH_2$—, —O—, or —NH—; $Y_2'$ represents a group bonding $X_2$ to $Z_2$; $Z_2$ has the same meaning as $Z_1$; and $R_{32}'$ has the same meaning as $R_{31}'$.

9 Claims, No Drawings

ELECTROPHOTOGRAPHIC LIGHT-SENSITIVE MATERIAL

FIELD OF THE INVENTION

This invention relates to an electrophotographic light-sensitive material, and more particularly to an electrophotographic light-sensitive material which is excellent in electrostatic characteristics, moisture resistance, and durability.

BACKGROUND OF THE INVENTION

An electrophotographic light-sensitive material may have various structures depending upon the characteristics required or an electrophotographic process to be employed.

An electrophotographic system in which the light-sensitive material comprises a support having thereon at least one photoconductive layer and, if necessary, an insulating layer on the surface thereof is widely employed. The electrophotographic light-sensitive material comprising a support and at least one photoconductive layer formed thereon is used for the image formation by an ordinary electrophotographic process including electrostatic charging, imagewise exposure, development, and, if desired, transfer.

Furthermore, a process using an electrophotographic light-sensitive material as an offset master plate precursor for direct plate making is widely practiced.

Binders which are used for forming the photoconductive layer of an electrophotographic light-sensitive material are required to be excellent in the film-forming properties by themselves and the capability of dispersing a photoconductive powder therein. Also, the photoconductive layer formed using the binder is required to have satisfactory adhesion to a base material or support. Further, the photoconductive layer formed by using the binder is required to have various excellent electrostatic characteristics such as high charging capacity, small dark decay, large light decay, and small fatigue due to previous light-exposure and also have excellent image forming properties, and the photoconductive layer stably maintains these electrostatic characteristics against a change of humidity at the time of image formation.

Binder resins which have been conventionally used include silicone resins (e.g., JP-B-34-6670, the term "JP-B" as used herein means an "examined Japanese patent publication"), styrene-butadiene resins (e.g., JP-B-35-1960), alkyd resins, maleic acid resins, polyamides (e.g., JP-B-35-11219), polyvinyl acetate resins (e.g., JP-B-41-2425), vinyl acetate copolymers (e.g., JP-B-41-2426), acrylic resins (JP-B-35-11216), acrylic acid ester copolymers (e.g., JP-B-35-11219, JP-B-36-8510, and JP-B-41-13946), etc.

However, in the electrophotographic light-sensitive materials using these binder resins, there are various problems such that 1) the affinity of the binder with photoconductive powders is poor thereby reducing the dispersibility of the coating composition containing them, 2) the charging property of the photoconductive layer containing the binder is low, 3) the quality (in particular, the dot image reproducibility or resolving power) of the image portions of duplicate images is poor, 4) the image quality is liable to be influenced from the environmental conditions (e.g., high temperature and high humidity or low temperature and low humidity) at the formation of duplicate images, and 5) the photoconductive layer is insufficient in film strength and adhesion, which causes, when the light-sensitive material is used for an offset master, peeling off of the photoconductive layer, at offset printing resulting in decrease of the number of prints.

For improving the electrostatic characteristics of a photoconductive layer, various approaches have hitherto been taken. For example, incorporation of a compound having an aromatic ring or a furan ring containing a carboxy group or a nitro group either alone or in combination with a dicarboxylic anhydride in a photoconductive layer is disclosed in JP-B-42-6878 and JP-B-45-3073. However, the thus improved electrophotographic light-sensitive materials are yet insufficient in electrostatic characteristics and, in particular light-sensitive materials having excellent light decay characteristics have not yet been obtained. Thus, for compensating the insufficient sensitivity of these light-sensitive materials, an attempt to incorporate a large amount of a sensitizing dye in the photoconductive layer has been made. However, light-sensitive materials containing a large amount of a sensitizing dye undergo considerable deterioration in whiteness, which means reduced quality as a recording medium, and sometimes deterioration in dark decay characteristics occurs, thereby satisfactory reproduced images are not obtained.

On the other hand, JP-A-60-10254 (the term "JP-A" as used herein means an "unexamined published Japanese patent application") discloses a method of controlling the average molecular weight of a resin to be used as a binder resin for a photoconductive layer. More specifically, JP-A-60-10254 discloses a technique for improving the electrostatic characteristics (in particular, reproducibility as a PPC light-sensitive material on repeated use), and moisture resistance of the photoconductive layer by the combination use of an acrylic resin having an acid value of from 4 to 50 and an average molecular weight of from $1 \times 10^3$ to $1 \times 10^4$ and an acrylic resin having an acid value of from 4 to 50 and an average molecular weight of from $1 \times 10^4$ to $2 \times 10^5$.

Furthermore, lithographic printing master plates using electrophotographic light-sensitive materials have been extensively investigated. As binder resins for a photoconductive layer having both the electrostatic characteristics as an electrophotographic light-sensitive material and the printing characteristics as a printing master plate, there are, for example, a combination of a resin having a molecular weight of from $1.8 \times 10^4$ to $10 \times 10^4$ and a glass transition point (Tg) of from 10° to 80° C. obtained by copolymerizing a (meth)acrylate monomer and a copolymerizable monomer in the presence of fumaric acid and a copolymer composed of a (meth)acrylate monomer and a copolymerizable monomer other than fumaric acid as disclosed in JP-B-50-31011, a terpolymer containing a (meth)acrylic acid ester unit with a substituent having a carboxylic acid group at least 7 atoms distant from the ester linkage as disclosed in JP-A-53-54027, a tetra- or pentapolymer containing an acrylic acid unit and a hydroxyethyl (meth)acrylate unit as disclosed in JP-A-54-20735 and JP-A-57-202544, and a terpolymer containing a (meth)acrylic ester unit with an alkyl group having from 6 to 12 carbon atoms as a substituent and a vinyl monomer containing a carboxyl group as disclosed in JP-A-58-68046. These resins are described to be effective to improve an oil desensitizing property of the photoconductive layer.

However, none of these resins proposed have proved to be satisfactory for practical use in electrostatic characteristics such as charging property, dark charge retention, and photosensitivity, and the surface smoothness of the photoconductive layer.

Also, the practical evaluations on conventional binder resins which are said to be developed for electrophotographic lithographic master plates have found that they have problems in the aforesaid electrostatic characteristics, background staining of prints, etc.

For solving these problems, JP-A-63-217354 and JP-A-64-70761 disclose that the smoothness and the electrostatic characteristics of a photoconductive layer can be improved and images having no background staining are obtained by using a low-molecular weight resin (molecular weight of from 1,000 to 10,000) containing from 0.05 to 10% by weight a copolymer component having an acidic group at the side chain of the copolymer and by using the same resin but having an acidic group at the terminal of the main chain of the polymer as the binder resin, respectively, and also U.S. Pat. No. 4,871,638, JP-A-63-220148, JP-A-63-220149, JP-A-1-100554, JP-A-1-102573, and JP-A-1-116643 disclose that the film strength of a photoconductive layer can be sufficiently increased to improve the printing durability without reducing the aforesaid characteristics by using the aforesaid low-molecular weight resin in combination with a high-molecular weight resin (molecular weight of 10,000 or more) and by utilizing a cross-linking reaction, respectively.

However, it has been found that, even in the case of using these resins, it is yet insufficient to keep the stable performance in the case of greatly changing the environmental conditions from high-temperature and high-humidity to low-temperature and low-humidity. In particular, in a scanning exposure system using a semiconductor laser beam, the exposure time becomes longer and also there is a restriction on the exposure intensity as compared to a conventional overall simultaneous exposure system using a visible light, and hence a higher performance has been required for the electrostatic characteristics, in particular, the dark charge retention characteristics and photosensitivity.

Further, when the scanning exposure system using a semiconductor laser beam is applied to hitherto known light-sensitive materials for electrophotographic lithographic printing master plates, various problems may occur in that the difference between $E_{\frac{1}{2}}$ and $E_{1/10}$ is particularly large and thus it is difficult to reduce the remaining potential after exposure, which results in severe fog formation in duplicated images, and when employed as offset masters, edge marks of originals pasted up appear on the prints, in addition to the insufficient electrostatic characteristics described above.

SUMMARY OF THE INVENTION

The present invention has been made for solving the problems of conventional electrophotographic light-sensitive materials as described above and meeting the requirement for the light-sensitive materials.

An object of this invention is to provide an electrophotographic light-sensitive material having stable and excellent electrostatic characteristics and giving clear good images even when the environmental conditions during the formation of duplicated images are changed to a low-temperature and low-humidity or to high-temperature and high-humidity.

Another object of this invention is to provide a CPC electrophotographic light-sensitive material having excellent electrostatic characteristics and small effects due to the environmental conditions.

A further object of this invention is to provide an electrophotographic light-sensitive material effective for a scanning exposure system using a semiconductor laser beam.

A still further object of this invention is to provide an electrophotographic lithographic printing master plate forming neither background stains nor edge marks of orignals pasted up on the prints.

Other objects of this invention will become apparent from the following description and examples.

It has been found that the above described objects of this invention are accomplished by an electrophotographic light-sensitive material comprising a support having provided thereon at least one photoconductive layer containing an inorganic photoconductive substance and a binder resin, wherein the binder resin comprises (A) at least one resin having a weight average molecular weight of from $1 \times 10^3$ to $2 \times 10^4$ and containing not less than 30% by weight of a copolymerizable component corresponding to a repeating unit represented by the general formula (I) described below and having at least one acidic group selected from the group consisting of $-PO_3H_2$, $-SO_3H$, $-COOH$, $-OH$,

(wherein R represents a hydrocarbon group or $-OR'$ (wherein R' represents a hydrocarbon group)) or a cyclic acid anhydride-containing group at one of the terminals of the main chain thereof;

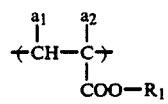

wherein $a_1$ and $a_2$ each represents a hydrogen atom, a halogen atom, a cyano group or a hydrocarbon group; and $R_1$ represents a hydrocarbon group; and (B) at least one copolymer resin having a weight average molecular weight of from $3 \times 10^4$ to $1 \times 10^6$ and containing at least one polyester type macromonomer having a weight average molecular weight of from $1 \times 10^3$ to $1.5 \times 10^4$ and represented by the following general formula (IIIa), (IIIb), (IIIc), or (IIId):

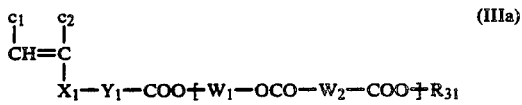

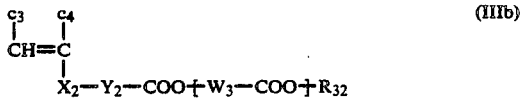

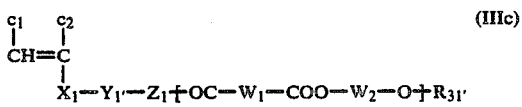

-continued

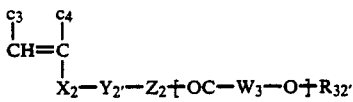  (IIId)

wherein the group in the brackets represents a recurring unit; $c_1$ and $c_2$, which may be the same or different, each represents a hydrogen atom, a halogen atom, a cyano group, a hydrocarbon group having from 1 to 8 carbon atoms, —COO—$V_1$, or —COO—$V_2$ bonded through a hydrocarbon group having from 1 to 8 carbon atoms (wherein $V_1$ and $V_2$ each represents a hydrocarbon group having from 1 to 18 carbon atoms); $X_1$ represents a direct bond, —COO—, —OCO—, $\text{+CH}_2\text{+}_{l_1}$—COO—, $\text{+CH}_2\text{+}_{l_2}$—OCO— (wherein $l_1$ and $l_2$ each represents an integer of from 1 to 3),

(wherein $d_1$ represent a hydrogen atom or a hydrocarbon group having from 1 to 12 carbon atoms), —CONHCONH—, —CONHCOO—, —O—,

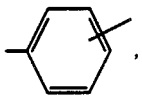

or —SO$_2$—; $Y_1$ represents a group bonding $X_1$ to —COO—; $W_1$ and $W_2$, which may be the same or different, each represents a divalent aliphatic group, a divalent aromatic group (each of the aforesaid groups may have, in the bond of each divalent organic moiety, at least one bonding group selected from —O—, —S—,

(wherein $d_2$ represents a hydrogen atom or a hydrocarbon group having from 1 to 12 carbon atoms), —SO$_2$—, —COO—, —OCO—, —CONHCO—, —NHCONH—,

(wherein $d_3$ has the same meaning as $d_2$),

(wherein $d_4$ has the same meaning as $d_2$), and

or an organic moiety composed of a combination of these moieties; $R_{31}$ represents a hydrogen atom or a hydrocarbon group; $c_3$ and $c_4$ have the same meaning as $c_1$ and $c_2$; $X_2$ has the same meaning as $X_1$; $Y_2$ represents a group bonding $X_2$ to —COO—; $W_3$ represents a divalent aliphatic group; $R_{32}$ has the same meaning as $R_{31}$; $R_{31}'$ represents a hydrogen atom, a hydrocarbon group or —COR$_{33}'$ (wherein $R_{33}'$ represents a hydrocarbon group); $Y_1'$ represents a group bonding $X_1$ to $Z_1$; $Z_1$ represents —CH$_2$—, —O—, or —NH—; $Y_2'$ represents a group bonding $X_2$ to $Z_2$; $Z_2$ has the same meaning as $Z_1$; and $R_{32}'$ has the same meaning as $R_{31}'$.

DETAILED DESCRIPTION OF THE INVENTION

The binder resin which can be used in this invention comprises at least (A) a low-molecular weight resin (hereinafter referred to as resin (A)) containing the copolymerizable component having the specific repeating unit and having the acidic group (the term "acidic group" as used herein means and includes a cyclic acid anhydride-containing group, unless otherwise indicated) at one of the terminals of the main chain thereof and (B) a high-molecular weight resin (hereinafter referred to as resin (B)) composed of a graft copolymer containing at least one of the polyester type macromonomers represented by the above-described general formulae (IIIa), (IIIb), (IIIc) and (IIId).

According to a preferred embodiment of this invention, the low molecular weight resin (A) is a low molecular weight resin with an acidic group being bonded to one of the terminals of the main chain thereof (hereinafter referred to as resin (A')) containing a methacrylate component having a specific substituent containing a benzene ring which has a specific substituent(s) at the 2-position or 2- and 6- positions thereof or a specific substituent containing an unsubstituted naphthalene ring represented by the following general formula (IIa) or (IIb):

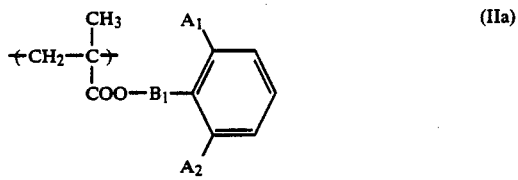

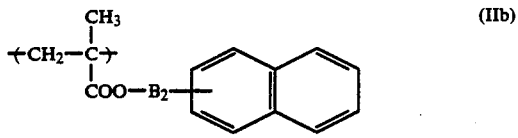

wherein $A_1$ and $A_2$ each represents a hydrogen atom, a hydrocarbon group having from 1 to 10 carbon atoms, a chlorine atom, a bromine atom, —COD$_1$ or —COOD$_2$, wherein $D_1$ and $D_2$ each represents a hydrocarbon group having from 1 to 10 carbon atoms, provided that both $A_1$ and $A_2$ do not simultaneously represent hydrogen atoms; and $B_1$ and $B_2$ each represents a direct bond or a linking group containing from 1 to 4 linking atoms, which connects —COO— and the benzene ring.

According to another preferred embodiment of this invention, the high molecular weight resin (B) is a high molecular weight resin (hereinafter referred to as resin (B')) of a graft type copolymer containing at least one of the macromonomers represented by the general formulae (IIIa), (IIIb), (IIIc) and (IIId) described above and having at least one acidic group selected from —PO$_3$H$_2$, —SO$_3$H, —COOH, —OH,

(wherein R$_0$ has the same meaning as R defined above) and a cyclic acid anhydride-containing group at the terminal of the main chain of the polymer.

In case of employing macromonomers represented by the general formulae (IIIa) to (IIId) wherein R$_{31}$, R$_{32}$ R$_{31}'$ or R$_{32}'$ represents the hydrocarbon group, it is particularly preferred that the resin (B) has the acidic group at the terminal of the main chain of the polymer.

In the present invention, the acidic group bonded to the terminal of the polymer main chain of the resin (A) which contains the specific copolymerizable component is adsorbed onto stoichiometrical defects of an inorganic photoconductive substance, and the resin has a function to improve covering power for the photoconductive substance, since it has a low molecular weight, to sufficiently cover the surface thereof, whereby electron traps of the photoconductive substance can be compensated for and humidity resistance can be greatly improved, while assisting the photoconductive substance to be sufficiently dispersed without agglomeration. On the other hand, the resin (B) serves to sufficiently heighten the mechanical strength of a photoconductive layer, which may be insufficient in case of using the resin (A) alone, without damaging the excellent electrophotographic characteristics attained by the use of the resin (A).

It is believed that the excellent characteristics of the electrophotographic light-sensitive material may be obtained by employing the resin (A) and the resin (B) as binder resins for inorganic photoconductive substance, wherein the weight average molecular weight of the resins and the content and position of the acidic group therein are specified, whereby the strength of interactions between the inorganic photoconductive substance and the resins can be appropriately controlled. More specifically, it is believed that the electrophotographic characteristics and mechanical strength of the layer as described above can be greatly improved by the fact that the resin (A) having a relatively strong interaction to the inorganic photoconductive substance selectively adsorbes thereon; whereas, in the resin (B) which has a weak activity compared with the resin (A), the acidic group bonded to the specific position of the polymer main chain thereof mildly interacts with the inorganic photoconductive substance to a degree which does not damage the electrophotographic characteristics, and the long main molecular chain and the molecular chains of the graft portion mutually interact.

In case of using the resin (A'), the electrophotographic characteristics, particularly, V$_{10}$, D. R. R. and E$_{1/10}$ of the electrophotographic material can be furthermore improved as compared with the use of the resin (A). While the reason for this is not fully understood, it is believed that the polymer molecular chain of the resin (A') suitably arranges on the surface of inorganic photoconductive substance such as zinc oxide in the layer depending on the plane effect of the benzene ring having a substituent at the ortho position or the naphthalene ring which is an ester component of the methacrylate whereby the above described improvement is achieved.

On the other hand, when the resin (B') is employed, the electrophotographic characteristics, particularly, D. R. R. and E$_{1/10}$ of the electrophotographic material are further improved without damaging the excellent characteristics due to the resin (A), and these preferred characteristics are almost maintained in the case of greatly changing the environmental conditions from high temperature and high humidity to low temperature and low humidity.

Further, according to the present invention, the smoothness of the photoconductive layer is improved.

On the other hand, when an electrophotographic light-sensitive material having a photoconductive layer with a rough surface is used as an electrophotographic lithographic printing master plate, the dispersion state of inorganic particles as photoconductive substance and a binder resin is improper and thus a photoconductive layer is formed in a state containing aggregates of the photoconductive substance, whereby the surface of the non-image portions of the photoconductive layer is not uniformly and sufficiently rendered hydrophilic by applying thereto an oil-desensitizing treatment with an oil-desensitizing solution to cause attaching of printing ink at printing, which results in the formation of background staining in the non-image areas of prints.

According to the present invention, the interaction of adsorption and covering between the inorganic photoconductive substance and the binder resins is suitably performed and the sufficient mechanical strength of the photoconductive layer is achieved by the combination of the resins described above.

In the resin (A), the weight average molecular weight is suitably from $1\times10^3$ to $2\times10^4$, preferably from $3\times10^3$ to $1\times10^4$, the content of the copolymerizable component corresponding to the repeating unit represented by the general formula (I) is suitably not less than 30% by weight, preferably from 50 to 97% by weight, and the content of the acidic group bonded to the terminal of the polymer main chain is suitably from 0.5 to 15% by weight, preferably from 1 to 10% by weight.

In the resin (A'), the content of the methacrylate copolymerizable component corresponding to the repeating unit represented by the general formula (IIa) or (IIb) is suitably not less than 30% by weight, preferably from 50 to 97% by weight, and the content of the acidic group bonded to the terminal of the polymer main chain is suitably from 0.5 to 15% by weight, preferably from 1 to 10% by weight based on 100 parts by weight of the resin (A').

The glass transition point of the resin (A) is preferably from −20° C. to 110° C., and more preferably from −10° C. to 90° C.

On the other hand, the weight average molecular weight of the resin (B) is suitably from $3\times10^4$ to $1\times10^6$, preferably from $8\times10^4$ to $5\times10^5$. The content of the macromonomer represented by the general formula (IIIa), (IIIb), (IIIc) or (IIId) in the resin (B) is suitably from 0.5 to 80% by weight, preferably from 1 to 40%.by weight. In case of using the macromonomer represented by the general formula (IIIa), (IIIb), (IIIc) or (IIId) wherein R$_{31}$ or R$_{32}$ represents a hydrogen atom, the content thereof is preferably from 0.5 to 30% by weight.

The glass transition point of the resin (B) is preferably from 0° C. to 110° C., and more preferably from 20° C. to 90° C.

If the molecular weight of the resin (A) is less than $1 \times 10^3$, the film-forming ability thereof is undesirably reduced, whereby the photoconductive layer formed cannot keep a sufficient film strength, while if the molecular weight thereof is larger than $2 \times 10^4$, the fluctuations of electrophotographic characteristics (in particular, initial potential, dark decay retention and photosensitivity of $E_{1/10}$) of the photoconductive layer especially containing a spectral sensitizing dye for the sensitization in the range of from near-infrared to infrared become somewhat large, and thus the effect for obtaining stable duplicated images according to the present invention is reduced under severe conditions of high temperature and high humidity or low temperature or low humidity.

If the content of the acidic group in the resin (A) is less than 0.5% by weight, the resulting electrophotographic light-sensitive material has too low initial potential to provide a sufficient image density. If, on the other hand, it is more than 15% by weight, dispersibility of the photoconductive substance is reduced, the smoothness of the photoconductive layer and the electrophotographic characteristics thereof under a high humidity condition are deteriorated. Further, background staining is increased when it is used as an offset master.

If the molecular weight of the resin (B) is less than $3 \times 10^4$, a sufficient film strength may not be maintained. On the other hand, the molecular weight thereof is larger than $1 \times 10^6$; the dispersibility of the photoconductive substance is reduced, the smoothness of the photoconductive layer is deteriorated, and image quality of duplicated images (particularly reproducibility of fine lines and letters) is degradated. Further, the background staining increases in case of using as an offset master.

Further, if the content of the macromonomer is less than 0.5% by weight in the resin (B), electrophotographic characteristics (particularly dark decay retention and photosensitivity) may be reduced and the fluctuations of electrophotographic characteristics of the photoconductive layer, particularly that containing a spectral sensitizing dye for the sensitization in the range of from near-infrared to infrared become large due to change the environmental conditions. The reason for this is considered that the construction of the polymer becomes that similar to a conventional homopolymer or random copolymer resulting from a very small amount of the macromonomer portion present therein to constitute the graft part.

On the other hand, the content of the macromonomer is more than 80% by weight, the copolymerizability of the macromonomer with other monomers corresponding to other copolymerizable components may become insufficient, and the sufficient electrophotographic characteristics can not be obtained as the binder resin.

Moreover, when the content of the macromonomer represented by the general formula (IIIa) or (IIIb) wherein $R_{31}$ or $R_{32}$ is a hydrogen atom is more than 30% by weight, the dispersibility is reduced, the smoothness of the photoconductive layer is deteriorated, image quality of duplicated images is degradated, and further background staining on the prints is increased when used as an offset master. The reason for this is considered that, due to the increase in the amount of macromonomers containing —COOH or —OH, the resin exhibits the strong interaction with the inorganic photoconductive substance and thus the aggregates of the inorganic photoconductive substance are formed.

Now, the resin (A) which can be used in this invention will be explained in detail below.

The resin (A) used in this invention contains at least one repeating unit represented by the general formula (I) as a copolymerizable component as described above.

In the general formula (I), $a_1$ and $a_2$ each represents a hydrogen atom, a halogen atom (e.g., chlorine and bromine), a cyano group or a hydrocarbon group, preferably an alkyl group having from 1 to 4 carbon atoms (e.g., methyl, ethyl, propyl and butyl); and $R_1$ represents a hydrocarbon group, preferably a substituted or unsubstituted alkyl group having from 1 to 18 carbon atoms (e.g., methyl, ethyl, propyl, butyl, pentyl, hexyl, octyl, decyl, dodecyl, tridecyl, tetradecyl, 2-chloroethyl, 2-bromoethyl, 2-cyanoethyl, 2-hydroxyethyl, 2 methoxyethyl, 2-ethoxyethyl, and 3-hydroxypropyl), a substituted or unsubstituted alkenyl group having from 2 to 18 carbon atoms (e.g., vinyl, allyl, isopropenyl, butenyl, hexenyl, heptentyl, and octenyl), a substituted or unsubstituted aralkyl group having from 7 to 12 carbon atoms (e.g., benzyl, phenethyl, naphthylmethyl, 2-naphthylethyl, methoxybenzyl, ethoxybenzyl, and methylbenzyl), a substituted or unsubstituted cycloalkyl group having from 5 to 8 carbon atoms (e.g., cyclopentyl, cyclohexyl, and cycloheptyl), or a substituted or unsubstituted aryl group (e.g., phenyl, tolyl, xylyl, mesityl, naphthyl, methoxyphenyl, ethoxyphenyl, fluorophenyl, difluorophenyl, bromophenyl, chlorophenyl, dichlorophehyl, iodophenyl, methoxycarbonylphenyl, ethoxycarbonylphenyl, cyanophenyl, and nitrophenyl).

More preferably, the copolymerizable component corresponding to the repeating unit represented by the general formula (I) is a methacrylate component having the specific aryl group represented by the following general formula (IIa) or (IIb):

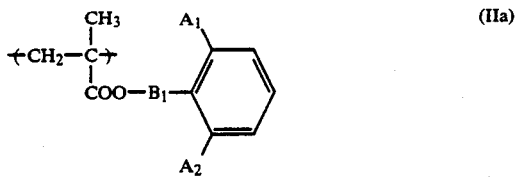

(IIa)

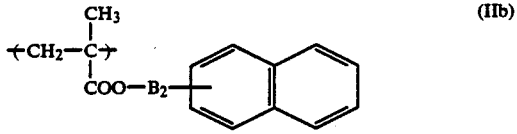

(IIb)

wherein $A_1$ and $A_2$ each represents a hydrogen atom, a hydrocarbon group having from 1 to 10 carbon atoms, a chlorine atom, a bromine atom, $-COD_1$ or $-COOD_2$, wherein $D_1$ and $D_2$ each represents a hydrocarbon group having from 1 to 10 carbon atoms, provided that both $A_1$ and $A_2$ do not simultaneously represent hydrogen atoms; and $B_1$ and $B_2$ represents a direct bond or a linking group containing from 1 to 4 linking atoms, which connects —COO— and the benzene ring.

In the general formula (IIa), $A_1$ and $A_2$ each preferably represents a hydrogen atom, a chlorine atom, a bromine atom, an alkyl group having from 1 to 4 carbon atoms (e.g., methyl, ethyl, propyl, and butyl), an aralkyl group having from 7 to 9 carbon atoms (e.g., benzyl, phenethyl, 3-phenylpropyl, chlorobenzyl, dichlorobenzyl, bromobenzyl, methylbenzyl, methoxybenzyl, and chloromethylbenzyl), an aryl group (e.g., phenyl, tolyl, xylyl, bromophenyl, methoxyphenyl, chlorophenyl, and dichlorophenyl), —COD$_1$ or —COOD$_2$, wherein D$_1$ and D$_2$ each preferably represents any of the above-recited hydrocarbon groups, provided that A$_1$ and A$_2$ do not simultaneously represent hydrogen atoms.

In the general formula (IIa), B$_1$ is a direct bond or linking group containing from 1 to 4 linking atoms, e.g., —CH$_2$—$_{n1}$ (n$_1$ represents an integer of 1, 2 or 3), —CH$_2$OCO—, —CH$_2$CH$_2$OCO—, —CH$_2$O$_{n2}$ (n$_2$ represents an integer of 1 or 2), and —CH$_2$CH$_2$O—, which connects —COO— and the benzene ring.

In the general formula (IIb), B$_2$ has the same meaning as B$_1$ in the general formula (IIa).

Specific examples of the copolymerizable component corresponding to the repeating unit represented by the general formula (IIa) or (IIb) which can be used in the resin (A') according to the present invention are set forth below, but the present invention should not be construed as being limited thereto. In the following formulae, T$_1$ and T$_2$ each represents Cl, Br or I; R$_{11}$ represents —C$_a$H$_{2a+1}$ or

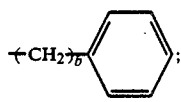

a represents an integer of from 1 to 4; b represents an integer of from 0 to 3; and C represents an integer of from 1 to 3.

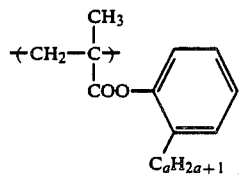

i-1)

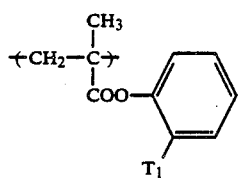

i-2)

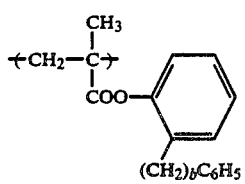

i-3)

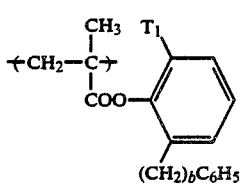

i-4)

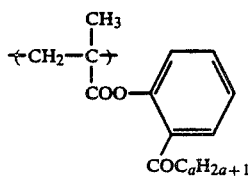

i-5)

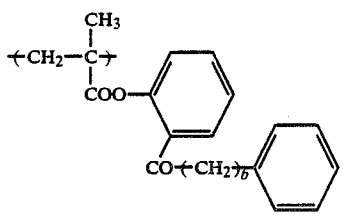

i-6)

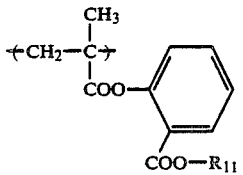

i-7)

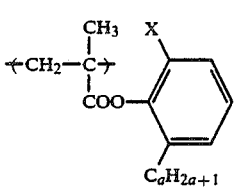

i-8)

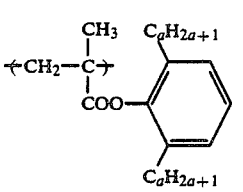

i-9)

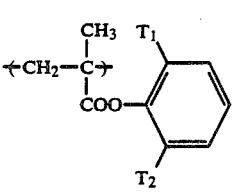

i-10)

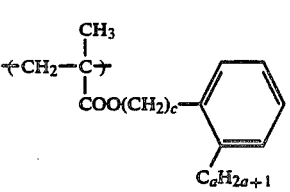

i-11)

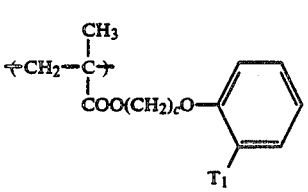

i-12)

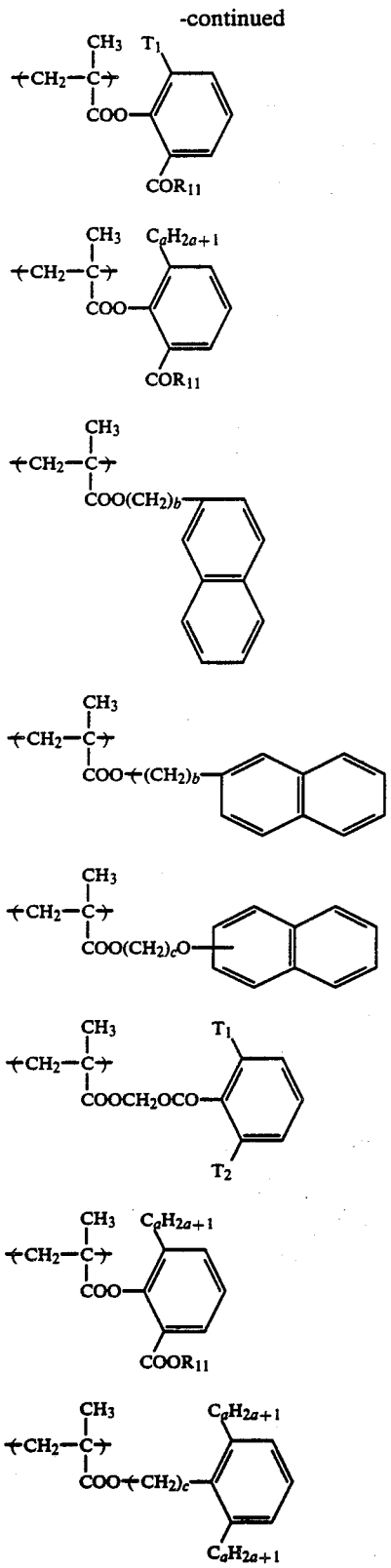

The acidic group which is bonded to one of the terminals of the polymer main chain in the resin (A) according to this invention preferably includes —PO₃H₂, —SO₃H, —COOH, i-13)
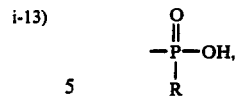

and a cyclic acid anhydride-containing group.
In the acidic group i-14)
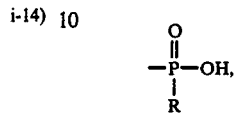

above, R represents a hydrocarbon group or —OR', wherein R' represents a hydrocarbon group. The hydrocarbon group represented by R or R' preferably includes an aliphatic group having from 1 to 22 carbon atoms (e.g., methyl, ethyl, propyl, butyl, hexyl, octyl, decyl, dodecyl, octadecyl, 2-chloroethyl, 2-methoxyethyl, 3-ethoxypropyl, allyl, crotonyl, butenyl, cyclohexyl, benzyl, phenethyl, 3-phenylpropyl, methylbenzyl, chlorobenzyl, fluorobenzyl, and methoxybenzy) and a substituted or unsubstituted aryl group (e.g., phenyl, tolyl, ethylphenyl, propylphenyl, chlorophenyl, fluorophenyl, bromophenyl, chloromethylphenyl, dichlorophenyl, methoxyphenyl, cyanophenyl, acetamidophenyl, acetylphenyl, and butoxyphenyl).

The cyclic acid anhydride-containing group is a group containing at least one cyclic acid anhydride. The cyclic acid anhydride to be contained includes an aliphatic dicarboxylic acid anhydride and an aromatic dicarboxylic acid anhydride.

Specific examples of the aliphatic dicarboxylic acid anhydrides include succinic anhydride ring, glutaconic anhydride ring, maleic anhydride ring, cyclopentane-1,2-dicarboxylic acid anhydride ring, cyclohexane-1,2-dicarboxylic acid anhydride ring, cyclohexene-1,2-dicarboxylic acid anhydride ring, and 2,3-bicyclo[2,2,-2]octanedicarboxylic acid anhydride. These rings may be substituted with, for example, a halogen atom (e.g., chlorine and bromine) and an alkyl group (e.g., methyl, ethyl, butyl, and hexyl).

Specific examples of the aromatic dicarboxylic acid anhydrides include phthalic anhydride ring, naphthalene-dicarboxylic acid anhydride ring, pyridinedicarboxylic acid anhydride ring and thiophenedicarboxylic acid anhydride ring. These rings may be substituted with, for example, a halogen atom (e.g., chlorine and bromine), an alkyl group (e.g., methyl, ethyl, propyl, and butyl), a hydroxyl group, a cyano group, a nitro group, and an alkoxycarbonyl group (e.g., methoxycarbonyl and ethoxycarbonyl).

The above-described acidic group may be bonded to one of the polymer main chain terminals either directly or via an appropriate linking group.

The linking group can be any group for connecting the acidic group to the polymer main chain terminal Specific examples of suitable linking group include

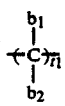

(wherein b₁ and b₂, which may be the same or different, each represents a hydrogen atom, a halogen atom (e.g., chlorine, and bromine), a hydroxyl group, a cyano group, an alkyl group (e.g., methyl, ethyl, 2-chloroethyl, 2-hydroxyethyl, propyl, butyl, and hexyl), an aralkyl group (e.g., benzyl, and phenethyl), an aryl group (e.g., phenyl),

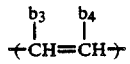

(wherein $b_3$ and $b_4$ each has the same meaning as defined for $b_1$ or $b_2$ above),

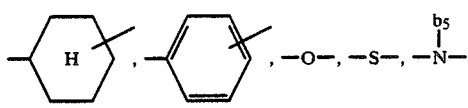

(wherein $b_5$ represents a hydrogen atom or a hydrocarbon group preferably having from 1 to 12 carbon atoms (e.g., methyl, ethyl, propyl, butyl, hexyl, octyl, decyl, dodecyl, 2-methoxyethyl, 2-chloroethyl, 2-cyanoethyl, benzyl, methylbenzyl, chlorobenzyl, methoxybenzyl, phenethyl, phenyl, tolyl, chlorophenyl, methoxyphenyl, and butylphenyl), —CO—, —COO—, —OCO—,

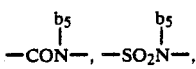

—SO$_2$—, —NHCONH—, —NHCOO—, —NHSO$_2$—, —CONHCOO—, —CONHCONH—, a heterocyclic ring, preferably a 5-membered or 6-membered ring containing at least one of an oxygen atom, a sulfur atom and a nitrogen atom as a hetero atom or a condensed ring thereof (e.g., thiophene, pyridine, furan, imidazole, pyridine, and morpholine),

(wherein $b_6$ and $b_7$, which may be the same or different, each represents a hydrocarbon group or —Ob$_8$ (wherein $b_8$ represents a hydrocarbon group)), and a combination thereof. Suitable example of the hydrocarbon group represented by $R_6$, $R_7$ or $R_8$ include those described for $R_5$.

The binder resin (A) preferably contains from 1 to 20% by weight of a copolymerizable component having a heat- and/or photocurable functional group in addition to the copolymerizable component represented by the general formula (I) (including that represented by the general formula (IIa) or (IIb)) and the copolymerizable component containing the acidic group, in view of achieving higher mechanical strength.

The term "heat- and/or photocurable functional group" as used herein means a functional group capable of inducing a curing reaction of resin on application of at least one of heat and light.

Specific examples of the photocurable functional group include those used in conventional photosensitive resins known as photocurable resins as described, for example, in Hideo Inui and Gentaro Nagamatsu, Kankosei Kobunshi, Kodansha (1977), Takahiro Tsunoda, Shin-Kankosei Jushi, Insatsu Gakkai Shuppanbu (1981), G. E. Green and B. P. Strak, J. Macro. Sci. Reas. Macro. Chem., C 21 (2), pp. 187 to 273 (1981–82), and C. G. Rattey, Photopolymerization of Surface Coatings, A Wiley Interscience Pub. (1982).

The heat-curable functional group which can be used includes functional groups excluding the above-specified acidic groups. Examples of the heat-curable functional groups usable are described, for example, in Tsuyoshi Endo, Netsukokasei Kobunshi no Seimitsuka, C. M. C. (1986), Yuji Hara, Saishin Binder Gijutsu Binran, Chapter II-I, Sogo Gijutsu Center (1985), Takayuki Ohtsu, Acryl Jushi no Gosei Sekkei to Shin-Yotokaihatsu, Chubu Kei-ei Kaihatsu Center Shuppanbu (1985), and Eizo Ohmori, Kinosei Acryl Kei Jushi, Techno System (1985).

Specific examples of the heat-curable functional group which can used include —OH, —SH, —NH$_2$ —NHR$_2$ (wherein $R_2$ represents a hydrocarbon group, for example, a substituted or unsubstituted alkyl group having from 1 to 10 carbon atoms (e.g., methyl, ethyl, propyl, butyl, hexyl, octyl, decyl, 2-chloroethyl, 2-methoxyethyl, and 2-cyanoethyl), a substituted or unsubstituted cycloalkyl group having from 4 to 8 carbon atoms (e.g., cycloheptyl and cyclohexyl), a substituted or unsubstituted aralkyl group having from 7 to 12 carbon atoms (e.g., benzyl, phenethyl, 3-phenylpropyl, chlorobenzyl, methylbenzyl, and methoxybenzyl), and a substituted or unsubstituted aryl group (e.g., phenyl, tolyl, xylyl, chlorophenyl, bromophenyl, methoxyphenyl, and naphthyl)),

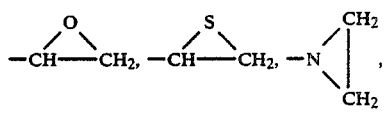

—CONHCH$_2$OR$_3$ (wherein $R_3$ represents a hydrogen atom or an alkyl group having from 1 to 8 carbon atoms (e.g., methyl, ethyl, propyl, butyl, hexyl, and octyl), —N=C=O and

(wherein $b_1$ and $b_2$ each represents a hydrogen atom, a halogen atom (e.g., chlorine and bromine) or an alkyl group having from 1 to 4 carbon atoms (e.g., methyl and ethyl)).

Another examples of the functional group include polymerizable double bond groups, for example, CH$_2$=CH—, CH$_2$=CH—CH$_2$—,

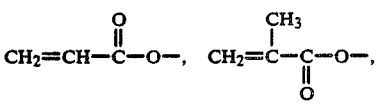

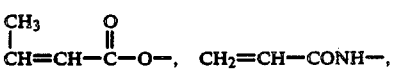

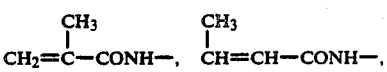

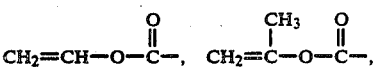

-continued

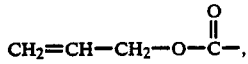

$CH_2=CH-NHCO-$, $CH_2=CH-CH_2-NHCO-$, $CH_2=CH-SO_2-$, $CH_2=CH-CO-$, $CH_2=CH-O-$, and $CH_2=CH-S-$.

In order to introduce at least one functional group selected from the heat- and/or photocurable functional groups into the binder resin according to this invention, a method comprising introducing the functional group into a polymer by high molecular reaction or a method comprising copolymerizing at least one monomer containing at least one of the functional groups and a monomer corresponding to the repeating unit of the general formula (I) (including that of the general formula (IIa) or (IIb)), and a monomer corresponding to the acidic group-containing copolymerizable component can be employed.

The above-described high molecular reaction can be carried out by using conventionally known low molecular synthesis reactions. For the details, reference can be made to, e.g., Nippon Kagakukai (ed.), *Shin-Jikken Kagaku Koza*, Vol. 14, *Yuki Kagobutsu no Gosei to Hanno* (I) to (V), Maruzen K. K. and Yoshio Iwakura and Keisuke Kurita, *Hannosei Kobunshi*, and literatures cited therein.

Suitable examples of the monomers containing the functional group capable of inducing heat- and/or photocurable reaction include vinyl compounds copolymerizable with the monomers corresponding to the repeating unit of the general formula (I) and containing the above-described functional group. More specifically, compounds similar to those described above as acidic group-containing compounds and further containing the above-described functional group in their substituent are illustrated.

Specific examples of the heat- and/or photocurable functional group-containing repeating units are set forth below, but the present invention should not be construed as being limited thereto. In the following formulae, $R_{11}$, a, d and e each has the same meaning as defined above; $P_1$ and $P_3$ each represents —H or —$CH_3$; $R_{14}$ represents —CH=$CH_2$ or —$CH_2$CH=$CH_2$; $R_{15}$ represents —CH=$CH_2$,

or —CH=CHCH$_3$; $R_{16}$ represents —CH=$CH_2$, —$CH_2$CH=$CH_2$,

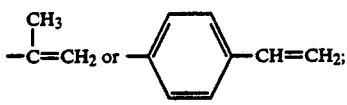

Z represents S or O; $T_3$ represents —OH or —$NH_2$; h represents an integer of from 1 to 11; and i represents an integer of from 1 to 10.

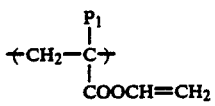 ii-1)

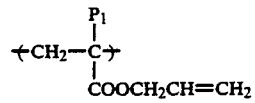 ii-2)

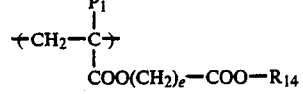 ii-3)

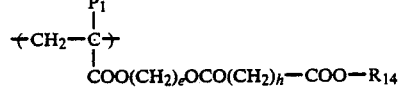 ii-4)

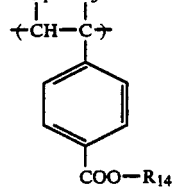 ii-5)

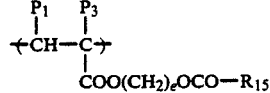 ii-6)

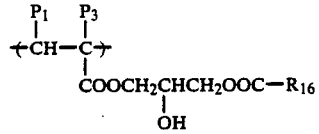 ii-7)

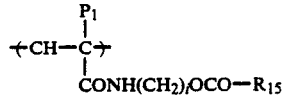 ii-8)

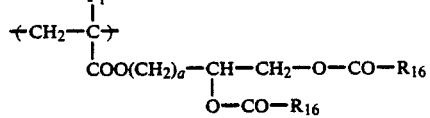 ii-9)

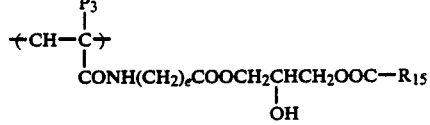 ii-10)

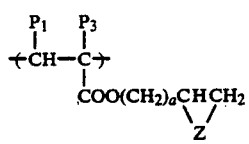 ii-11)

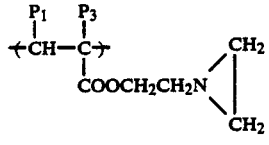 ii-12)

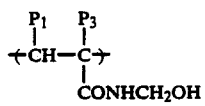 ii-13)

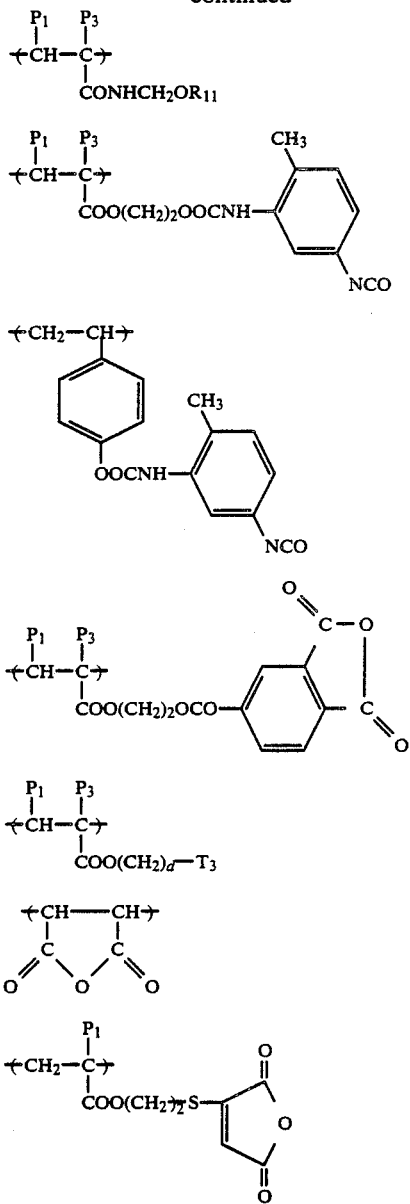

The resin (A) according to the present invention may further comprise other copolymerizable monomers as copolymerizable components in addition to the monomer corresponding to the repeating unit of the general formula (I) (including that of the general formula (IIa) or (IIb)), and, if desired, the heat- and/or photocurable functional group-containing monomer. Examples of such monomers include, in addition to methacrylic acid esters, acrylic acid esters and crotonic acid esters other than those represented by the general formula (I), α-olefins, vinyl or allyl esters of carboxylic acids (including, e.g., acetic acid, propionic acid, butyric acid, and valeric acid, as examples of the carboxylic acids), arylonitrile, methacrylonitrile, vinyl ethers, itaconic acid esters (e.g., dimethyl itaconate, and diethyl itaconate), acrylamides, methacrylamides, styrenes (e.g., styrene, vinyltoluene, chlorostyrene, hydroxystyrene, N,N-dimethylaminomethylstyrene, methoxycarbonylstyrene, methanesulfonyloxystyrene, and vinylnaphthalene), and heterocyclic vinyl compounds (e.g., vinylpyrrolidone, vinylpyridine, vinylimidazole, vinylthiophene, vinylimidazoline, vinylpyrazoles, vinyldioxane, vinylquinoline, vinyltetrazole, and vinyloxazine).

The resin (A) according to this invention, in which the specific acidic group is bonded to only one terminal of the polymer main chain, can easily be prepared by an ion polymerization process, in which a various kind of a reagent is reacted at the terminal of a living polymer obtained by conventionally known anion polymerization or cation polymerization; a radical polymerization process, in which radical polymerization is performed in the presence of a polymerization initiator and/or a chain transfer agent which contains the specific acidic group in the molecule thereof; or a process, in which a polymer having a reactive group (for example, an amino group, a halogen atom, an epoxy group, and an acid halide group) at the terminal obtained by the above-described ion polymerization or radical polymerization is subjected to a high molecular reaction to convert the terminal group to the specific acidic group.

For the details, reference can be made to P. Dreyfuss and R. P. Quirk, Encycl. Polym. Sci. Eng., Vol. 7, p. 551 (1987), Yoshiki Nakajo and Yuya Yamashita, Senryo to Yakuhin, Vol. 30, p. 232 (1985), Akira Ueda and Susumu Nagai, Kagaku to Kogyo, Vol. 60, p. 57 (1986) and literatures cited therein.

Specific examples of the chain transfer agent to be used include mercapto compounds containing the acidic group or the reactive group capable of being converted to the acidic group (e.g., thioglycolic acid, thiomalic acid, thiosalicyclic acid, 2-mercaptopropionic acid, 3-mercaptopropionic acid, 3-mercaptobutyric acid, N-(2-mercaptopropionyl)glycine, 2-mercaptonicotinic acid, 3[N-(2-mercaptoethyl)carbamoyl]propionic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mecaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole, 2-mercapto-3-pyridinol, 4-(2-mercaptoethyloxycarbonyl) phthalic anhydride, 2-mercaptoethylphosphonic acid, and monomethyl 2-mercaptoethylphosphonate), and alkyl iodide compounds containing the acidic group or the acidic-group forming reactive group (e.g., iodoacetic acid, iodopropionic acid, 2-iodoethanol, 2-iodoethanesulfonic acid, and 3-iodopropanesulfonic acid). Preferred of them are mercapto compounds.

Specific examples of the polymerization initiators containing the acidic group or the reactive group include 4,4'-azobis(4-cyanovaleric acid), 4,4-azobis(4-cyanovaleric chloride), 2,2'-azobis(2-cyanopropanol), 2,2'-azobis(2-cyanopentanol), 2,2-azobis[ 2-methyl-N-(2-hydroxyethyl)propionamide], 2,2'-azobis{2-methyl-N-[1,1-bis(hydroxymethyl)-2-hydroxyethyl]propionamide}, 2,2'-azobis{2-[1-(2-hydroxyethyl)-2-imidazolin-2-yl]propane), 2,2'-azobis]2-(2-imidazolin-2-yl)propane], and 2,2'-azobis[2-(4,5,6,7-tetrahydro-1H-1,3-diazepin-2-yl)-propane].

The chain transfer agent or polymerization initiator is usually used in an amount of from 0.5 to 15 parts by weight, preferably from 2 to 10 parts by weight, per 100 parts by weight of the total monomers.

Now, the resin (B) will abe described in detail with reference to preferred embodiments below.

The resin (B) according to the present invention is a high molecular weight resin of a graft type copolymer having a weight average molecular weight of from $3\times10^4$ to $1\times10^6$ and containing, as a copolymerizable component, a polyester type macromonomer having a weight average molecular weight of from $1\times10^3$ to $1.5\times10^4$ and represented by the general formula (IIIa), (IIIb), (IIIc) or (IIId) described above. In a preferred embodiment, the resin further has at least one acidic group selected from $-PO_3H_2$, $-SO_3H$, $-COOH$, $-OH$,

(wherein $R_0$ has the same meaning as R defined above) and a cyclic acid anhydride-containing group at one of the terminals of the main chain of the graft type copolymer.

The polyester type macromonomer having a polymerizable double bond group at one terminal and a carboxyl group or a hydroxyl group at the other terminal, which is employed as a copolymerizable component of the resin (B), is described below in detail.

In the general formulae (IIIa) to (IIId), the moiety in the brackets is a repeating unit sufficient for making the weight average molecular weight of the macromonomers of the formulae (IIIa) to (IIId) fall within a range of from $1\times10^3$ to $1.5\times10^4$.

In a preferred embodiment of the macromonomer represented by the general formula (IIIa) or (IIIc), $c_1$ and $c_2$, which may be the same or different, each represents a hydrogen atom, a halogen atom (e.g., chlorine, bromine, and fluorine), a cyano group, an alkyl group having from 1 to 3 carbon atoms (e.g., methyl, ethyl, and propyl), $-COOV_1$, or $-CH_2COOV_2$ (wherein $V_1$ and $V_2$ each represents an alkyl group having from 1 to 8 carbon atoms (e.g., methyl, ethyl, propyl, butyl, pentyl, hexyl, and octyl), an aralkyl group having from 7 to 9 carbon atoms (e.g., benzyl, phenethyl, and 3-phenylpropyl), or a phenyl group which may be substituted (e.g., phenyl, tolyl, xylyl, and methoxyphenyl)).

It is more preferred that either one of $c_1$ and $c_2$ is a hydrogen atom.

$X_1$ preferably represents a direct bond, $-COO-$, $-OCO-$, $-CH_2COO-$, $-CH_2OCO-$, $-CONH-$, $-CONHCONH-$, $-CONHCOO-$, or

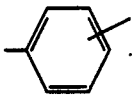

$d_1$ represents a hydrogen atom or a hydrocarbon group having from 1 to 12 carbon atoms (e.g., methyl, ethyl, propyl, butyl, hexyl, octyl, decyl, dodecyl, 2-methoxyethyl, 2-chloroethyl, 2-cyanoethyl, benzyl, methylbenzyl, chlorobenzyl, methoxybenzyl, phenethyl, phenyl, tolyl, chlorophenyl, methoxyphenyl, and butylphenyl).

$Y_1$ represents a group bonding $X_1$ to $-COO-$, i.e., a direct bond or a linkage group. Specific examples of the linkage group include

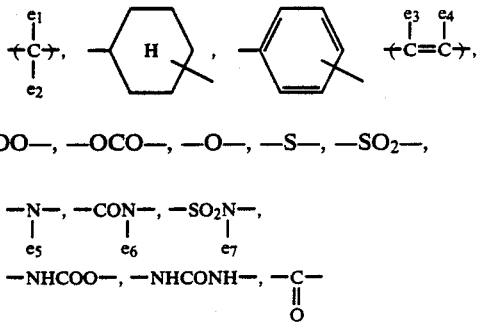

$-COO-$, $-OCO-$, $-O-$, $-S-$, $-SO_2-$, $-\underset{\underset{e_5}{|}}{N}-$, $-\underset{\underset{e_6}{|}}{CON}-$, $-\underset{\underset{e_7}{|}}{SO_2N}-$, $-NHCOO-$, $-NHCONH-$, $-\overset{\overset{O}{\|}}{C}-$ and a linkage group formed by a combination of these linkage groups (in the above formulae, $e_1$ to $e_4$, which may be the same or different, each represents a hydrogen atom, a halogen atom (e.g., preferably, fluorine, chlorine, and bromine), or a hydrocarbon group having from 1 to 7 carbon atoms (e.g., preferably, methyl, ethyl, propyl, butyl, 2-chloroethyl, 2-methoxyethyl, 2-methoxycarbonylethyl, benzyl, methoxybenzyl, phenyl, methoxyphenyl, and methoxycarbonylphenyl) and $e_5$ to $e_7$ each has the same meaning as $d_1$ defined above).

Also, $W_1$ and $W_2$, which may be the same or different, each represents a divalent organic group, i.e., a divalent aliphatic group or a divalent aromatic group, which may contain a linkage group such as $-O-$, $-S-$,

$-SO-$, $-SO_2-$, $-COO-$, $-OCO-$, $-CONHCO-$, $-NHCONH-$,

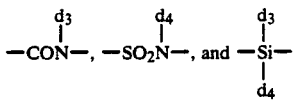

(wherein $d_2$ to $d_4$ each has the same meaning as $d_1$ defined above), or an organic group formed by a combination of these divalent organic groups.

Examples of the divalent aliphatic group include

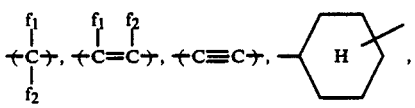

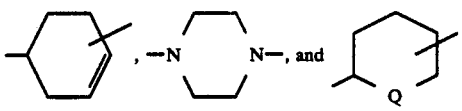

(wherein $f_1$ and $f_2$, which may be the same or different, each represents a hydrogen atom, a halogen atom (e.g., fluorine, chlorine, and bromine), or an alkyl group having from 1 to 12 carbon atoms (e.g., methyl, ethyl, propyl, chloromethyl, bromomethyl, butyl, hexyl, octyl, nonyl, and decyl); and Q represents $-O-$, $-S-$, or $-NR_{34}-$ (wherein $R_{34}$ represents an alkyl group having from 1 to 4 carbon atoms, $-CH_2Cl$ or $-CH_2Br$)).

Examples of the divalent aromatic group include a benzene ring group, a naphthalene ring group, and a 5- or 6-membered heterocyclic ring group (containing at least one of oxygen atom, sulfur atom, and nitrogen atom as the hetero atom constituting the heterocyclic ring).

The aromatic group may have a substituent such as a halogen atom (e.g., fluorine, chlorine, and bromine), an alkyl group having from 1 to 8 carbon atoms (e.g., methyl, ethyl, propyl, butyl, hexyl, and octyl), and an alkoxy group having from 1 to 6 carbon atoms (e.g., methoxy, ethoxy, propoxy, and butoxy).

Examples of the heterocyclic ring group include furan, thiophene, pyridine, pyrazine, piperazine, tetrahydrofuran, pyrrole, tetrahydropyran, and 1,3-oxazoline.

$R_{31}$ in the general formula (IIIa) preferably represents a hydrogen atom or a hydrocarbon group having from 1 to 8 carbon atoms. Specific examples of the hydrocarbon group include those defined for $c_1$ or $c_2$ above.

$Y_1'$ in the general formula (IIIc) has preferably the same meaning as defined for $Y_1$ in the general formula (IIIa) above.

$R_{31}'$ in the general formula (IIIc) preferably represents a hydrogen atom, an alkyl group having from 1 to 4 carbon atoms (e.g., methyl, ethyl, propyl, and butyl) or $-COR_{33}'$ (wherein $R_{33}'$ preferably represents an alkyl group having from 1 to 4 carbon atoms. In a preferred embodiment of the macromonomer represented by the general formula (IIIb) or (IIId), preferred groups of $c_3$, $c_4$, $X_2$, $Y_2$, $Y_2'$, $R_{32}$ and $R_{32}'$ each has the same meaning as defined for the preferred groups of $c_1$, $c_2$, $X_1$, $Y_1$, $Y_1'$, $R_{31}$ and $R_{31}'$.

$W_3$ in the general formula (IIIb) represents a divalent aliphatic group and preferably includes $-(CH_2)_{m1}-$ (wherein $m_1$ represents an integer of from 2 to 18),

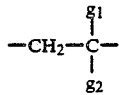

(wherein $g_1$ and $g_2$, which may be the same or different, each represents a hydrogen atom or an alkyl group (e.g., methyl, ethyl and propyl), with the proviso that $g_1$ and $g_2$ can not be hydrogen atoms at the same time), and

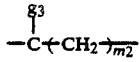

(wherein $g_3$ represents an alkyl group having from 1 to 18 carbon atoms (e.g., methyl, ethyl, propyl, butyl, hexyl, and octyl); and $m_2$ represents an integer of from 1 to 16.

$W_3$ in the general formula (IIId) represents a divalent aliphatic group and preferably includes $-(CH_2)_{m1}-$ (wherein $m_1$ represents an integer of from 2 to 18),

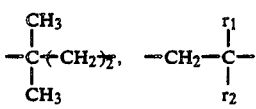

(wherein $r_1$ and $r_2$, which may be the same or different, each represents a hydrogen atom or an alkyl group having from 1 to 12 carbon atoms (e.g., methyl, ethyl, propyl, butyl, hexyl, octyl, decyl), with the proviso that $r_1$ and $r_2$ can not be hydrogen atoms at the same time), and

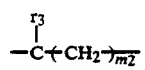

(wherein $r_3$ represents an alkyl group having 1 to 12 carbon atoms (e.g., methyl, ethyl, propyl, butyl, hexyl, and octyl); and $m_2$ represents an integer of from 3 to 18.

Specific examples of the moieties represented by

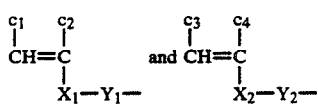

in the macromonomers represented by the general formula (IIIa) and the general formula (IIIb), respectively, are illustrated below but the present invention should not be construed as being limited thereto. In the following formulae, $Q_1$ represents $-H$, $-CH_3$, $-CH_2COOCH_3$, $-Cl$, $-Br$, or $-CN$; $Q_2$ represents $-H$ or $-CH_3$, n represents an integer of from 2 to 12, and m represents an integer of from 1 to 12.

 (III-1)

 (III-2)

 (III-3)

 (III-4)

 (III-5)

(III-6)

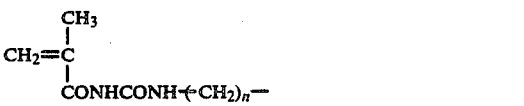 (III-7)

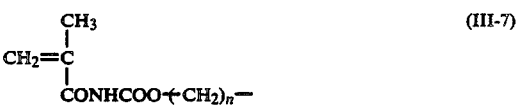 (III-8)

 (III-9)

-continued

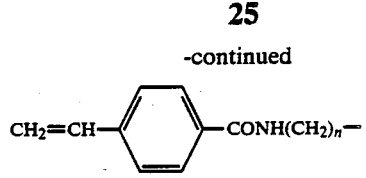 (III-10)

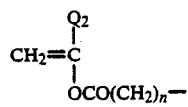 (III-11)

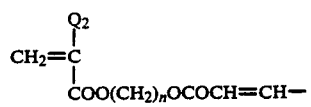 (III-12)

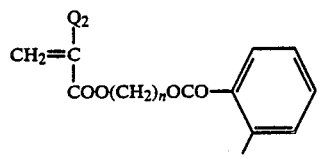 (III-13)

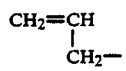 (III-14)

 (III-15)

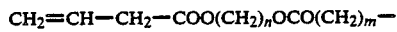 (III-16)

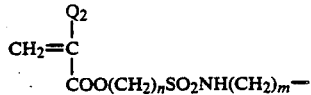 (III-17)

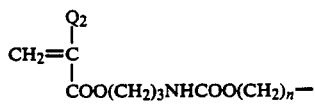 (III-18)

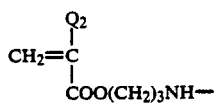 (III-19)

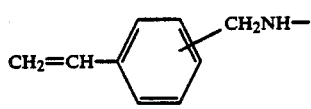 (III-20)

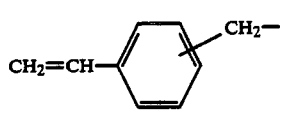 (III-21)

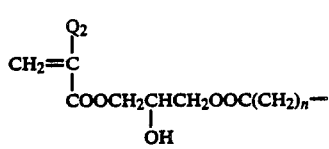 (III-22)

 (III-23)

 (III-24)

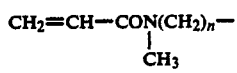 (III-25)

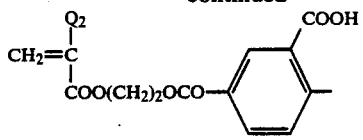 (III-26)

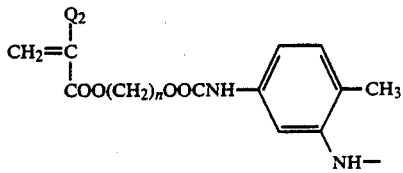 (III-27)

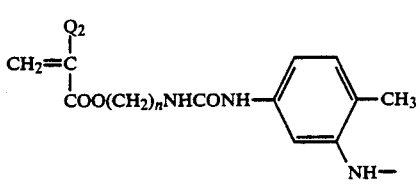 (III-28)

Specific examples of the moieties represented by

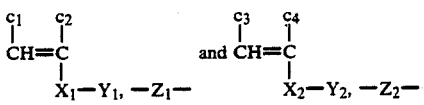

in the macromonomers represented by the general formulae (IIIc) and (IIId), respectively, are illustrated below, but the present invention should not be construed as being limited thereto. In the following formulae, $Q_1$ represents —H, —CH$_3$, —CH$_2$COOCH$_3$, —Cl, —Br, or —CN: $Q_2$ represents —H or —CH$_3$; X represents —Cl or —Br; n represents an integer of from 2 to 12; and m represents an integer of from 1 to 4.

 (III'-1)

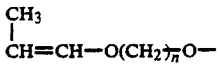 (III'-2)

 (III'-3)

 (III'-4)

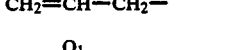 (III'-5)

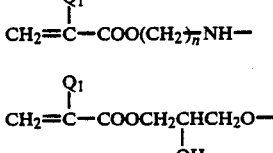 (III'-6)

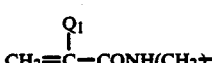 (III'-7)

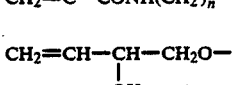 (III'-8)

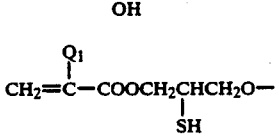 (III'-9)

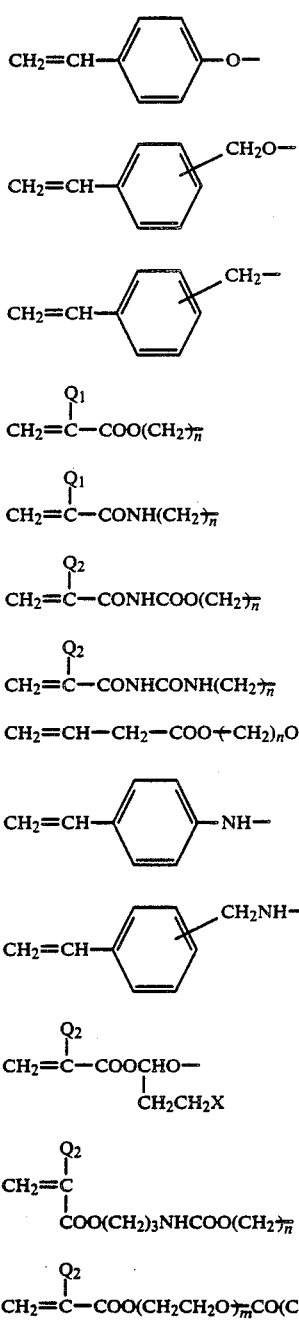

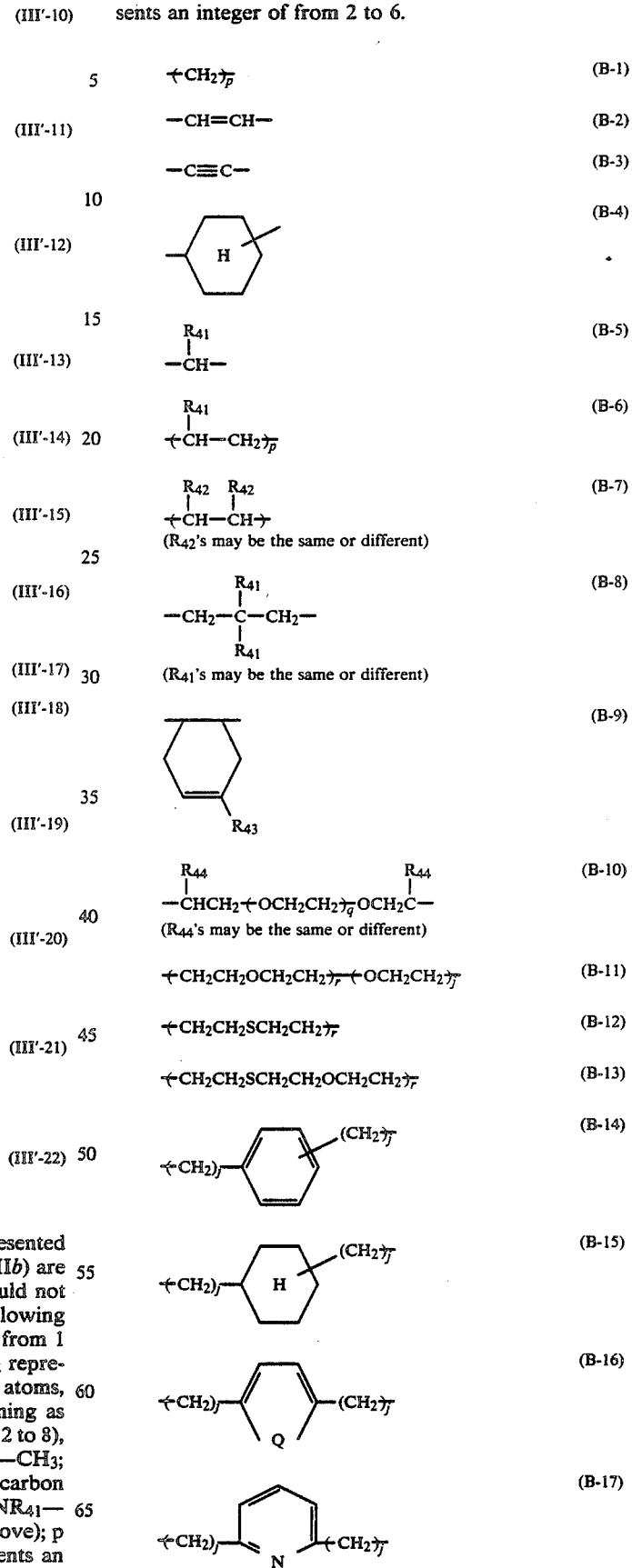

to 10; j represents an integer of from 0 to 4; and k represents an integer of from 2 to 6.

Specific examples of the organic group represented by $W_1$ or $W_2$ in the general formula (IIIa) or (IIIb) are illustrated below, but the present invention should not be construed as being limited thereto. In the following formulae, $R_{41}$ represents an alkyl group having from 1 to 4 carbon atoms, —$CH_2Cl$, or —$CH_2Br$; $R_{42}$ represents an alkyl group having from 1 to 8 carbon atoms, —$CH_2$—$OR_{41}$ (wherein $R_{41}$ has the same meaning as defined above and l represents an integer of from 2 to 8), —$CH_2Cl$, or —$CH_2Br$; $R_{43}$ represents —H or —$CH_3$; $R_{44}$ represents an alkyl group having from 1 to 4 carbon atoms; Q represents —O—, —S—, or —$NR_{41}$— (wherein $R_{41}$ has the same meaning as defined above); p represents an integer of from 1 to 26; q represents an integer of from 0 to 4; r represents an integer from 1

-continued

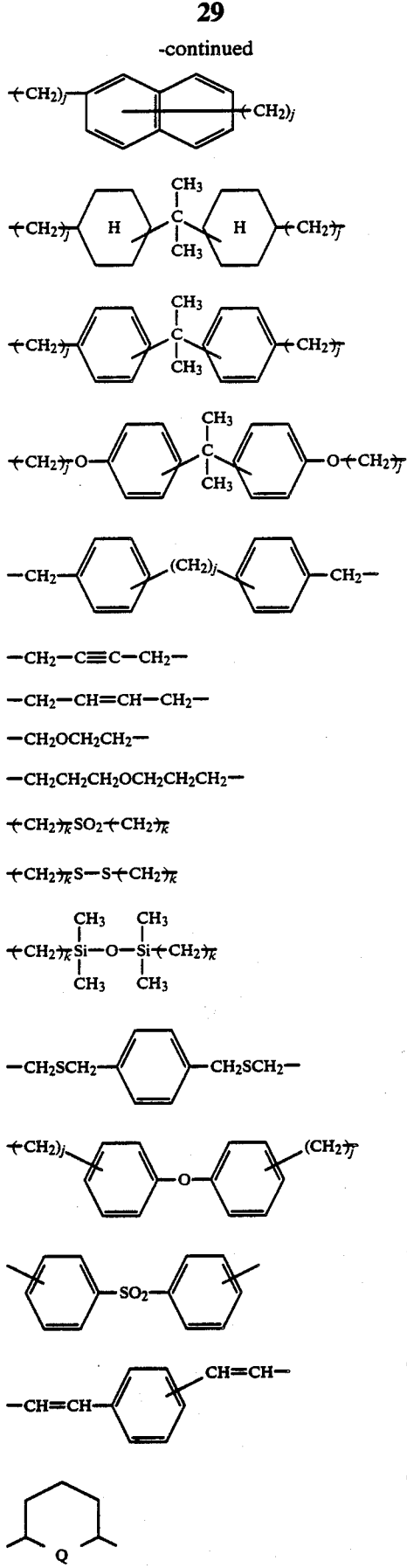

(B-18)
(B-19)
(B-20)
(B-21)
(B-22)
(B-23)
(B-24)
(B-25)
(B-26)
(B-27)
(B-28)
(B-29)
(B-30)
(B-31)
(B-32)
(B-33)
(B-34)

-continued $+CH_2)_n-N\underset{\phantom{X}}{\phantom{XX}}N+CH_2)_n$ (B-35)

(B-36)

(B-37)

(B-38)

The macromonomer represented by the general formula (IIIa) or (IIIc) can be easily produced by a method comprising introducing a polymerizable double bond group by a high molecular reaction into a hydroxyl group (in case of the macromonomer of (IIIa)) or a carboxyl group (in case of the macromonomer of (IIIc)) present at one of the terminals of a polyester oligomer having a weight average molecular weight of from $1 \times 10^3$ to $1.5 \times 10^4$ which has been synthesized by a polycondensation reaction between a diol and a dicarboxylic acid or an anhydride or ester thereof as described, for example, in Kobunshi Gakkai (ed.), *Kobunshi Data Handbook* (*Kisohen*), Baihukan (1986).

The polyester oligomer can be synthesized by a conventional polycondensation reaction. More specifically, reference can be made, for example, to Eiichiro Takiyama, *Polyester Jushi Handbook*, Nikkan Kogyo Shinbunsha (1986), Kobunshi Gakkai (ed.), *Jushukugo to Jufuka*, Kyoritsu Shuppan (1980), and I. Goodman, *Encyclopedia of Polymer Science and Engineering*, Vol. 12, p. 1, John Wily & Sons (1985).

Introduction of a polymerizable double bond group into a hydroxyl group at one terminal of the polyester oligomer can be carried out by utilizing a reaction for forming an ester from an alcohol or a reaction for forming a urethane from an alcohol which are conventional in the field of low-molecular weight compounds.

In more detail, the introduction can be effected by a method of synthesizing the macromonomer through formation of an ester by the reaction between a hydroxy group and a carboxylic acid or an ester, halide or anhydride thereof containing a polymerizable double bond group in the molecule thereof or a method of synthesizing the macromonomer through formation of a urethane by the reaction between a hydroxy group and a monoisocyanate containing a polymerizable double bond group in the molecule thereof. For details, reference can be made, for example, to The Chemical Society of Japan (ed.), *Shin Jikken Kagaku Koza*, Vol. 14, "Yuki Kagobutsu no Gosei to Han-no (II)", Ch. 5, Maruzen Co., (1977), and ibid., "Yuki Kagobutsu no Gosei to Han-no (III)", p. 1652, Maruzen Co., (1978).

Introduction of a polymerizable double bond group into a carboxyl group at one terminal of the polyester oligomer can be carried out by utilizing a reaction for forming an ester from a carboxylic acid or a reaction for forming an acid amide from a carboxylic acid. These reactions are well known in the field of low-molecular weight compounds.

In more detail, the macromonomer can be synthesized by reacting a compound containing a polymerizable double bond group and a functional group capable of chemically reacting with a carboxyl group (e.g., —OH

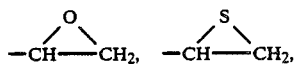

halide (e.g., chloride, bromide, and iodide), —NH$_2$, —COOR$_{32}$ (wherein R$_{32}$ is methyl, trifluoromethyl, or 2,2,2-trifluoroethyl)) in the molecule thereof with a polyester oligomer by a high molecular reaction. For details, reference can be made, for example, to The Chemical Society of Japan (ed.), *Shin Jikken Kagaku Koza*, Vol. 14, "Yuki Kagobutsu no Gosei to Han-no (II)", Ch. 5, Maruzen Co., (1977), and Yoshio Iwakura and Keisuke Kurita, *Han-nosei Kobunshi*, Kodansha (1977).

The macromonomer represented by the general formula (IIIb) can be produced by a method for synthesizing a polyester oligomer by self-polycondensation of a carboxylic acid containing a hydroxyl group in the molecule thereof and then forming a macromonomer from the oligomer by the high molecular reaction as is used for synthesizing the macromonomer of the general formula (IIIa), or a method for synthesizing the macromonomer by a living polymerization reaction between a carboxylic acid containing a polymerizable double bond group and a lactone. For details, reference can be made, for example, to T. Yasuda, T Aida and S. Inoue, *J. Macromol. Sci. chem.*, A, Vol. 21, p. 1035 (1984), T. Yasuda, T. Aida and S. Inoue, *Macromolecules*, Vol. 17, p. 2217 (1984), S. Sosnowski, S. Stomkowski and S. Penczek, *Makromol. Chem.*, Vol. 188, p. 1347 (1987), Y. Gnanou and P. Rempp., *Makromol. Chem.*, Vol. 188, p. 2267 (1987), and T. Shiota and Y. Goto, *J. Appl. Polym. Sci.*, Vol. 11, p. 753 (1967).

The macromonomer represented by the general formula (IIId) can be produced by a method for synthesizing a polyester oligomer by self-polycondensation of a carboxylic acid containing a hydroxyl group in the molecule thereof and then forming a macromonomer from the oligomer by the high molecular reaction as is used for synthesizing the macromonomer of the general formula (IIIc).

Specific examples of the macromonomers represented by the general formula (IIIa) or (IIIb) which can be used in the present invention are illustrated below, but the present invention should not be construed as being limited thereto. In the following formulae, the group in the brackets represents a recurring unit sufficient for making the weight average molecular weight of the macromonomer fall in the range of from $1 \times 10^3$ to $1.5 \times 10^4$; Q$_1$ has the same meaning as defined above; Q$_3$ represents —H or —CH$_3$; R$_{45}$ and R$_{46}$, which may be the same or different, each represents —CH$_3$ or —C$_2$H$_5$; R$_{47}$ and R$_{48}$, which may be the same or different, each represents —Cl, —Br, —CH$_2$Cl, or —CH$_2$Br; s represents an integer of from 1 to 25; t represents an integer of from 2 to 12; u represents an integer of from 2 to 12; x represents an integer of from 2 to 4; y represents an integer of from 2 to 6; and z represents an integer of from 1 to 4.

(M-1)

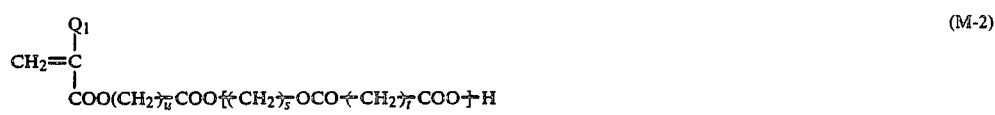

(M-2)

(M-3)

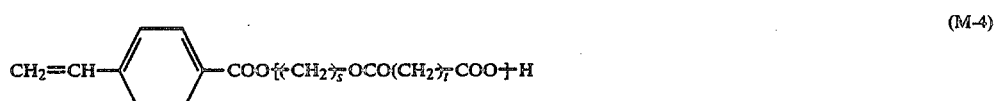

(M-4)

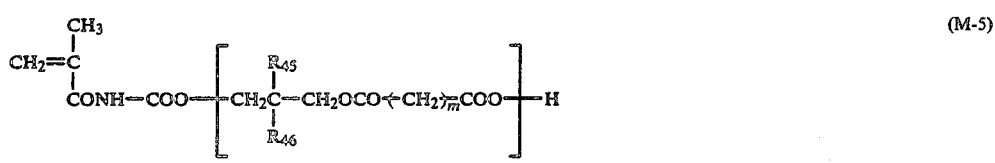

(M-5)

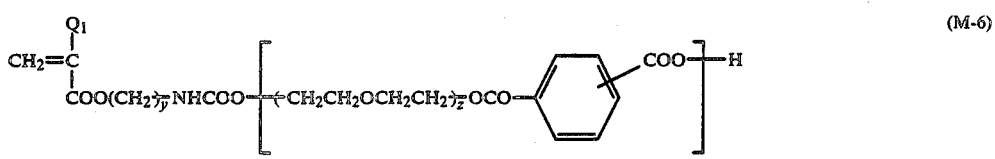

(M-6)

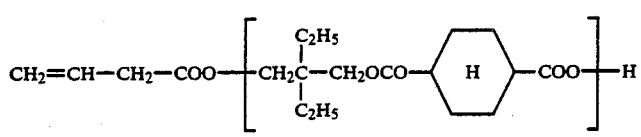  (M-7)
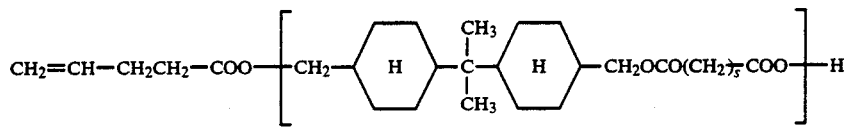  (M-8)
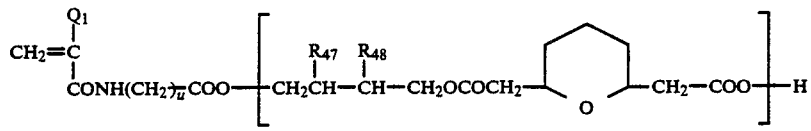  (M-9)
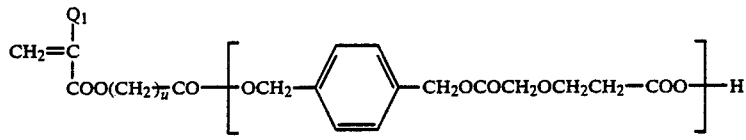  (M-10)
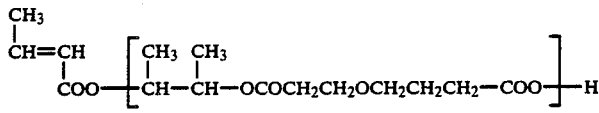  (M-11)
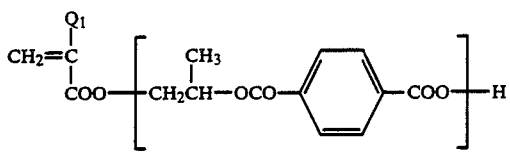  (M-12)
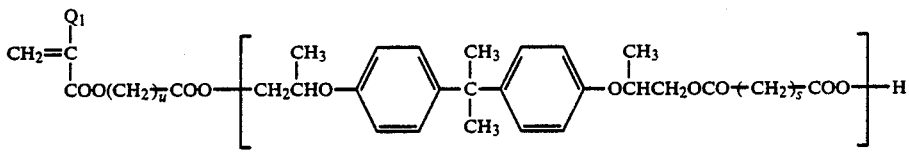  (M-13)
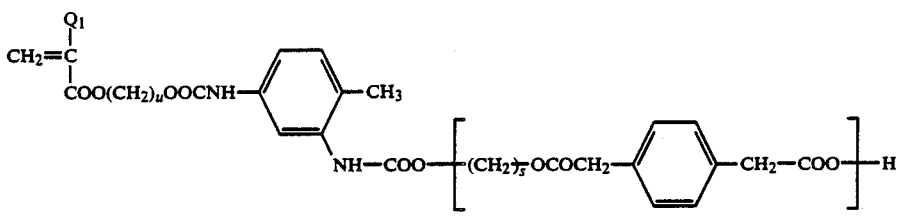  (M-14)
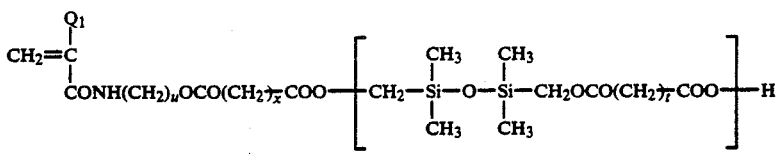  (M-15)
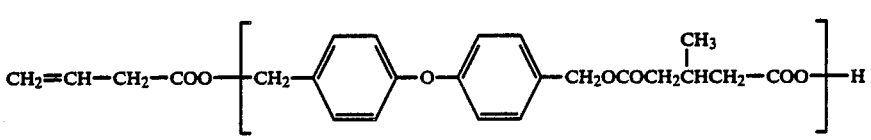  (M-16)
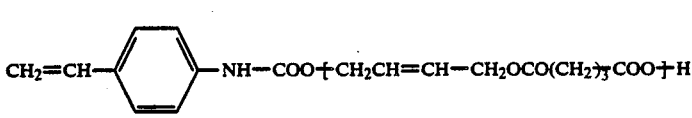  (M-17)

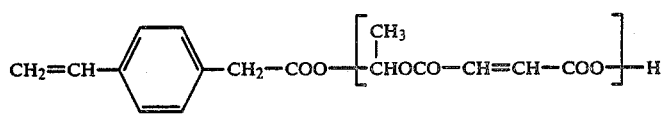 (M-18)

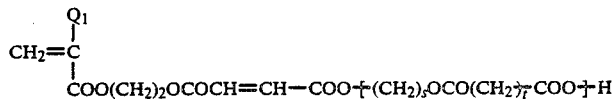 (M-19)

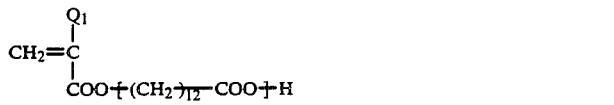 (M-20)

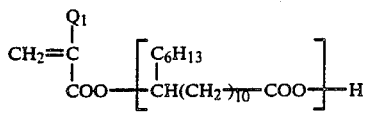 (M-21)

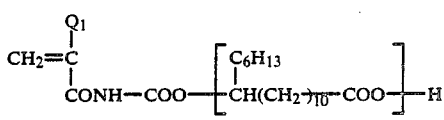 (M-22)

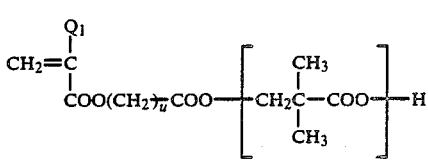 (M-23)

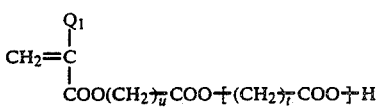 (M-24)

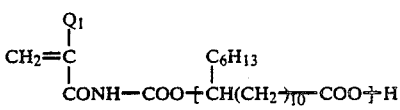 (M-25)

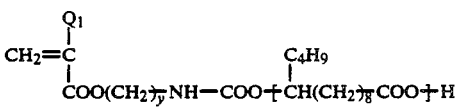 (M-26)

Specific examples of the macromonomers represented by the general formula (IIIc) or (IIId) which can be used in the present invention are illustrated below, but the present invention should not be construed as being limited thereto. In the following formulae, the group in the brackets represents a recurring unit sufficient for making the weight average molecular weight of the macromonomer fall in the range of from $1 \times 10^3$ to $1.5 \times 10^4$; $Q_3$ represents —H or —CH$_3$; $R_{45}$ and $R_{46}$, which may be the same or different, each represents —CH$_3$ or —C$_2$H$_5$; $R_{47}$ represents —CH$_3$, —C$_2$H$_5$, —C$_3$H$_7$, or —C$_4$H$_9$; Y represents —Cl or —Br; W represents —O— or —S—; s represents an integer of from 2 to 12; t represents an integer of from 1 to 25; u represents an integer of from 2 to 12; x represents an integer of from 2 to 16; y represents an integer of from 1 to 4; and z represents 0, 1 or 2.

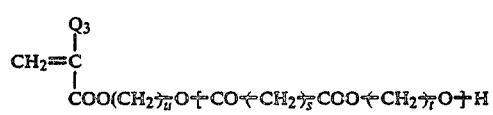 (M'-1)

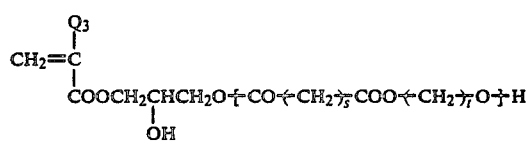 (M'-2)

-continued
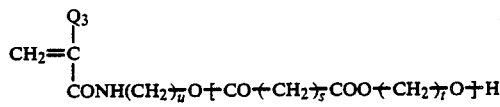
(M'-3)
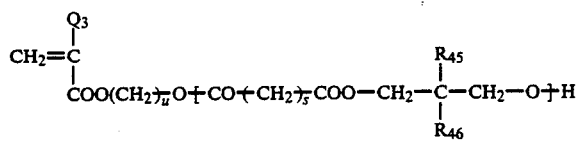
(M'-4)
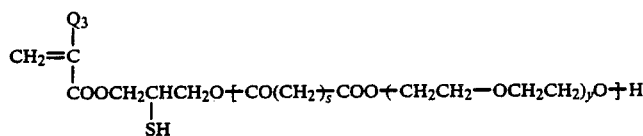
(M'-5)
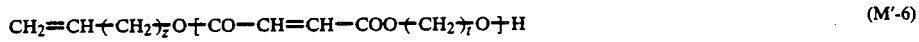
(M'-6)
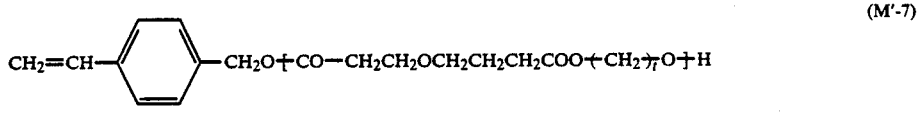
(M'-7)
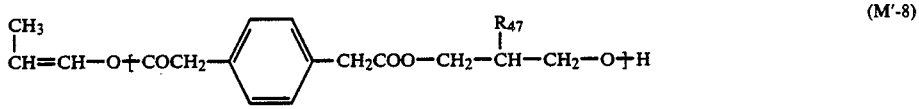
(M'-8)
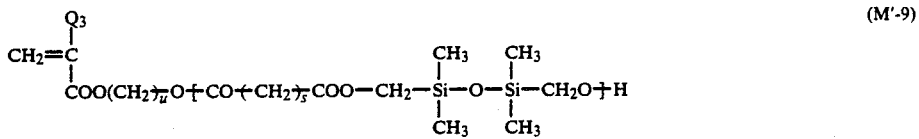
(M'-9)
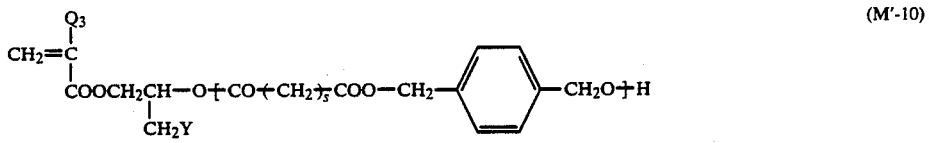
(M'-10)
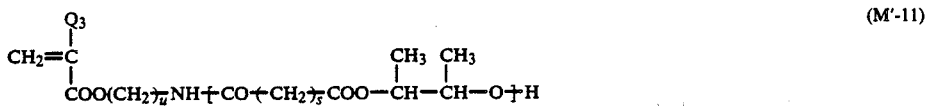
(M'-11)
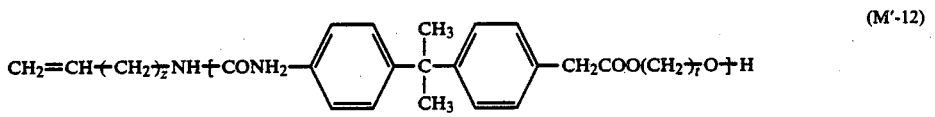
(M'-12)
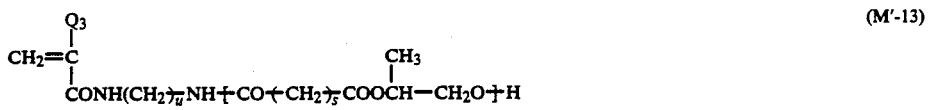
(M'-13)
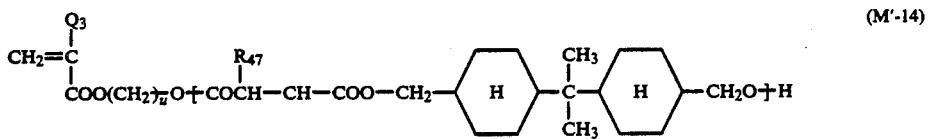
(M'-14)
(M'-15)

-continued

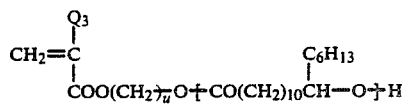 (M'-16)

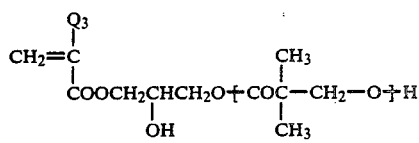 (M'-17)

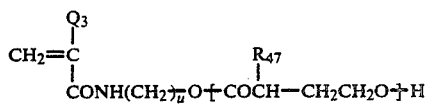 (M'-18)

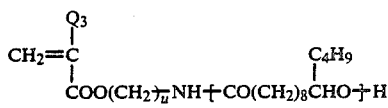 (M'-19)

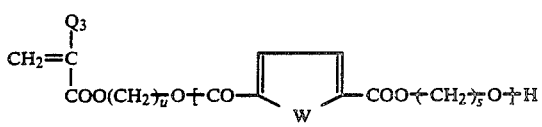 (M'-20)

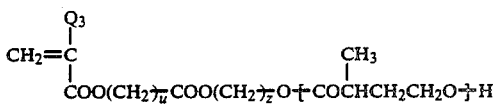 (M'-21)

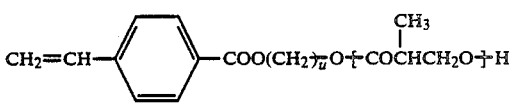 (M'-22)

The resin (B) which can be used as the binder resin in this invention is a graft copolymer containing at least one of the macromonomers represented by the aforesaid general formula (IIIa), (IIIb), (IIIc) or (IIId) as the copolymerizable component and may contain other monomer which meets the properties of the binder resin and can be radical-copolymerized with the macromonomer as other copolymerizable component.

For example, the binder resin (B) contains preferably a monomer corresponding to the copolymerizable component represented by the general formula (I) of the resin (A) as such as other copolymerizable component in an amount of from 30% by weight to 99% by weight of the copolymer.

The resin (B) may further contain, as the copolymerizable component other copolymerizable monomer together with the polyester type macromonomer represented by the general formula (IIIa), (IIIb), (IIIc) or (IIId) and the monomer corresponding to the copolymerizable component represented by the general formula (I). Specific examples of such copolymerizable monomer include the other copolymerizable monomers as described for the resin (A) above.

The content of the above described other copolymerizable monomer is preferably not more than 30% by weight, more preferably not more than 20% by weight based on the total copolymerizable components.

The electrophotographic light-sensitive material of this invention is sometimes desired to have a higher mechanical strength while keeping the excellent electrophotographic characteristics thereof. For the purpose, a method for introducing a heat- and/or photocurable functional group as described for the resin (A) into the main chain of the graft type copolymer can be applied.

More specifically, it is preferred that the resin (B) contains at least one monomer having a heat- and/or photocurable functional group, as the copolymerizable component, together with the macromonomer represented by the general formula (IIIa), (IIIb), (IIIc) or (IIId) and, preferably, the monomer represented by the general formula (I). By properly crosslinking the polymers by such a heat- and/or photocurable functional group, the interaction among the polymers can be increased to improve the strength of the film formed by the resin. Thus, the resin of this invention further containing such a heat and/or photocurable functional group has the effects of increasing the interaction among the binder resins, thereby more improving the film strength without adversely affecting the proper adsorption and covering of the binder resin on the surface of the photoconductive particles such as zinc oxide particles.

As described above, the resin (B') in which the specific acidic group is bonded to only one terminal of the polymer main chain is preferred. The acidic groups used in the resin (B') are the same as the acidic groups bonded to the terminal of the polymer main chain of the resin (A).

Further, in order to introduced the acidic group into the terminal of the polymer main chain, the same methods as described for the resin (A) can be employed. However, a method in which the acidic group is introduced by a high molecular reaction has some problems in that the reaction only proceeds slowly and a long time for the reaction is necessary, and in that the reaction hardly proceeds quantitatively, because the resin (B) has a high molecular weight. Therefore, it is preferred to perform a polymerization reaction using a polymerization initiator and/or a chain transfer agent containing the acidic group in order to synthesize the resin (B').

In addition to the resins (A) (including the resin (A')) and (B) (including the resin (B')), the resin binder according to this invention may further comprise other known resins. Suitable examples of such resins include alkyd resins, polybutyral resins, polyolefins, ethylene-vinyl acetate copolymers, styrene resins, ethylene-butadiene resins, acrylate-butadiene resins, and vinyl alkanoate resins.

The proportion of these other resins should not exceed 30% by weight based on the total binder. If the proportion exceeds 30% by weight, the effects of this invention, particularly improvement of electrostatic characteristics, would be lost.

Where the resin (A) and/or resin (B) according to this invention contain the heat-curable functional group described above, a reaction accelerator may be used, if desired, in order to accelerate a crosslinking reaction in the light-sensitive layer. Examples of usable reaction accelerators which can be employed in the reaction system for forming a chemical bond between functional groups include an organic acid (e.g., acetic acid, propionic acid, butyric acid, benzenesulfonic acid, and p-toluenesulfonic acid), and a crosslinking agent.

Specific examples of crosslinking agents are described, for example, in Shinzo Yamashita and Tosuke Kaneko (ed.), *Kakyozai Handbook*, Taiseisha (1981), including commonly employed crosslinking agents, such as organosilanes, polyurethanes, and polyisocyanates, and curing agents, such as epoxy resins and melamine resins.

When the crosslinking reaction is a polymerization reaction system, polymerization initiators (e.g., peroxides and azobis series polymerization initiators, and preferably azobis series polymerization initiators) and monomers having a polyfunction polymerizable group (e.g., vinyl methacrylate, allyl methacrylate, ethylene glycol diacrylate, polyethylene glycol diacrylate, divinylsuccinic acid esters, divinyladipic acid esters, diallylsuccinic acid esters, 2-methylvinyl methacrylate, and divinylbenzene) can be used as the reaction accelerator.

When the binder resin containing a heat-curable functional group is employed in this invention, the photoconductive substance-binder resin dispersed system is subjected to heat-curing treatment. The heat-curing treatment can be carried out by drying the photoconductive coating under conditions more severe than those generally employed for the preparation of conventional photoconductive layer. For example, the heat-curing can be achieved by treating the coating at a temperature of from 60 to 120° C for 5 to 120 minutes. When, the above described reaction accelerator is used, the heat-curing treatment can be performed under milder conditions.

The ratio of the resin (A) (including the resin (A')) to the resin (B) (including the resin (B')) in this invention varied depending on the kind, particle size, and surface conditions of the inorganic photoconductive substance used. In general, the weight ratio of the resin (A) to the resin (B) is 5 to 80:95 to 20, preferably 10 to 60:90:40.

The ratio of the weight average molecular weight of the resin (B) (including the resin (B')) to that of the resin (A) (including the resin (A')) is preferably not less than 1.2, and more preferably not less than 2.0.

The inorganic photoconductive substance which can be used in this invention includes zinc oxide, titanium oxide, zinc sulfide, cadmium sulfide, cadmium carbonate, zinc selenide, cadmium selenide, tellurium selenide, and lead sulfide.

The resin binder is used in a total amount of from 10 to 100 parts by weight, preferably from 15 to 50 parts by weight, per 100 parts by weight of the inorganic photoconductive substance.

If desired, various dyes can be used as spectral sensitizers in this invention. Examples of the spectral sensitizers are carbonium dyes, diphenylmethane dyes, triphenylmethane dyes, xanthene dyes, phthalein dyes, polymethine dyes (e.g., oxonol dyes, merocyanine dyes, cyanine dyes, rhodacyanine dyes, and styryl dyes), and phthalocyanine dyes (including metallized dyes). Reference can be made to, for example, Harumi Miyamoto and Hidehiko Takei, *Imaging*, Vol. 1973, No. 8, . p. 12, C. J. Young, et al., *RCA Review*, Vol. 15, p. 469 (1954), Kohei Kiyota, et al., *Denkitsushin Gakkai Ronbunshi*, Vol. J 63-C, No. 2, p. 97 (1980), Yuji Harasaki, et al., *Kogyo Kagaku Zasshi*, Vol. 66, pp. 78 and 188 (1963), and Tadaaki Tani, *Nihon Shashin Gakkaishi*, Vol. 35, p. 208 (1972).

Specific examples of the carbonium dyes, triphenylmethane dyes, xanthene dyes, and phthalein dyes are described, for example, in JP-B-51-452, JP-A-50-90334, JP-A-50-114227, JP-A-53-39130, JP-A-53-82353, U.S. Patents 3,052,540 and 4,054,450, and JP-A-57-16456.

The polymethine dyes, such as oxonol dyes, merocyanine dyes, cyanine dyes, and rhodacyanine dyes, include those described in F. M. Harmmer, *The Cyanine Dyes and Related Compounds*. Specific examples thereof include those described, for example, in U.S. Pat. Nos. 3,047,384, 3,110,591, 3,121,008, 3,125,447, 3,128,179, 3,132,942, and 3,622,317, British Patents 1,226,892, 1,309,274 and 1,405,898, JP-B-48-7814 and JP-B-55-18892.

In addition, polymethine dyes capable of spectrally sensitizing in the longer wavelength region of 700 nm or more, i.e., from the near infrared region to the infrared region, include those described, for example, in JP-A-47-840, JP-A-47-44180, JP-B-51-41061, JP-A-49-5034, JP-A-49-45122, JP-A-57-46245, JP-A-56-35141, JP-A-57-157254, JP-A-61-26044, JP-A-61-27551, U.S. Pat. Nos. 3,619,154 and 4,175,956, and *Research disclosure*, Vol. 216, pp. 117 to 118 (1982).

The light-sensitive material of this invention is particularly excellent in that the performance properties are not liable to variation even when combined with various kinds of sensitizing dyes.

If desired, the photoconductive layer may further contain various additives commonly employed in conventional electrophotographic light-sensitive layer, such as chemical sensitizers. Examples of the additives include electron-accepting compounds (e.g., halogen, benzoquinone, chloranil, acid anhydrides, and organic carboxylic acids) as described in the above-mentioned *Imaging*, Vol. 1973, No. 8, p. 12; and polyarylalkane compounds, hindered phenol compounds, and p-phenylenediamine compounds as described in Hiroshi Kokado, et al., *Saikin-no Kododen Zairyo to Kankotai no Kaihatsu Jitsuyoka*, Chaps. 4 to 6, Nippon Kagaku Joho K. K. (1986).

The amount of these additives is not particularly restricted and usually ranges from 0.0001 to 2.0 parts by weight per 100 parts by weight of the photoconductive substance.

The photoconductive layer suitably has a thickness of from 1 to 100 μm, preferably from 10 to 50 μm.

In cases where the photoconductive layer functions as a charge generating layer in a laminated light-sensitive material composed of a charge generating layer and a charge transport layer, the thickness of the charge generating layer suitably ranges from 0.01 to 1 μm, particularly from 0.05 to 0.5 μm.

If desired, an insulating layer can be provided on the light-sensitive layer of this invention. When the insulating layer is made to serve for the main purposes for protection and improvement of durability and dark decay characteristics of the light-sensitive material, its thickness is relatively small. When the insulating layer is formed to provide the light-sensitive material suitable for application to special electrophotographic processes, its thickness is relatively large, usually ranging from 5 to 70 μm, particularly from 10 to 50 μm.

Charge transport material in the above-described laminated light-sensitive material include polyvinylcarbazole, oxazole dyes, pyrazoline dyes, and triphenylmethane dyes. The thickness of the charge transport layer ranges from 5 to 40 μm, preferably from 10 to 30 μm.

Resins to be used in the insulating layer or charge transport layer typically include thermoplastic and thermosetting resins, e.g., polystyrene resins, polyester resins, cellulose resins, polyether resins, vinyl chloride resins, vinyl acetate resins, vinyl chloride-vinyl acetate copolymer resins, polyacrylate resins, polyolefin resins, urethane resins, epoxy The photoconductive layer according to this invention can be provided on any known support. In general, a support for an electrophotographic light-sensitive layer is preferably electrically conductive. Any of conventionally employed conductive supports may be utilized in this invention. Examples of usable conductive supports include a substrate (e.g., a metal sheet, paper, and a plastic sheet) having been rendered electrically conductive by, for example, impregnating with a low resistant substance; the above-described substrate with the back side thereof (opposite to the light-sensitive layer side) being rendered conductive and having further coated thereon at least one layer for the purpose of prevention of curling; the above-described substrate having provided thereon a water-resistant adhesive layer; the above-described substrate having provided thereon at least one precoat layer; and paper laminated with a conductive plastic film on which aluminum is deposited.

Specific examples of conductive supports and materials for imparting conductivity are described, for example, in Yoshio Sakamoto, *Denshishashin*, Vol. 14, No. 1, pp. 2 to 11 (1975), Hiroyuki Moriga, *Nyumon Tokushushi no Kagaku*, Kobunshi Kankokai (1975), and M. F. Hoover, *J. Macromol. Sci. Chem.*, A-4(6), pp. 1327 to 1417 (1970).

In accordance with this invention, an electrophotographic light-sensitive material which exhibits excellent electrostatic characteristics and mechanical strength even under severe conditions. The electrophotographic light-sensitive material according to this invention is also advantageously employed in the scanning exposure system using a semiconductor laser beam.

The present invention will now be illustrated in greater detail with reference to the following examples, but it should be understood that the present invention is not to be construed as being limited thereto.

SYNTHESIS EXAMPLE A-1

Synthesis of Resin (A-1)

A mixed solution of 96 g of benzyl methacrylate, 4 g of thiosalicylic acid, and 200 g of toluene was heated to 75° C. in a nitrogen stream, and 1.0 g of 2,2'-azobisisobutyronitrile (hereinafter simply referred to as AIBN) was added thereto to effect reaction for 4 hours. To the reaction mixture was further added 0.4 g of AIBN, followed by reacting for 2 hours, and thereafter 0.2 g of AIBN was added thereto, followed by reacting for 3 hours with stirring. The resulting copolymer (A-1) had a weight average molecular weight (hereinafter simply referred to as Mw) of $6.8 \times 10^3$.

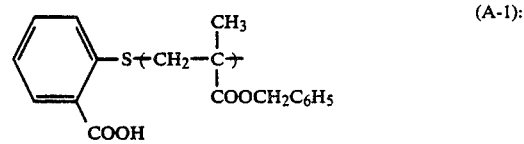

SYNTHESIS EXAMPLES A-2 TO A-13

Synthesis of Resins (A-2) to (A-13)

Resins (A) shown in Table 1 below were synthesized under the same polymerization conditions as described in Synthesis Example A-1, except for using the monomers described in Table 1 below in place of 96 g of benzyl methacrylate, respectively. These resins had an Mw of from $6.0 \times 10^3$ to $8.0 \times 10^3$.

TABLE 1

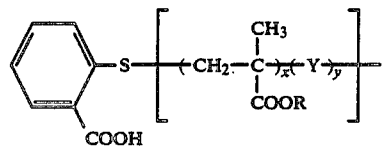

| Synthesis Example No. | Resin (A) | R | —Y— | x/y (weight ratio) |
|---|---|---|---|---|
| A-2 | (A-2) | —C₂H₅ | — | 96/0 |
| A-3 | (A-3) | —C₆H₅ | — | 96/0 |

TABLE 1-continued
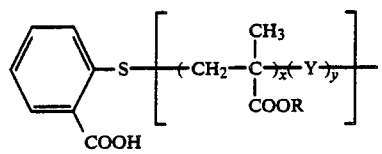
| Synthesis Example No. | Resin (A) | R | —Y— | x/y (weight ratio) |
|---|---|---|---|---|
| A-4 | (A-4) | ![2-chlorophenyl] 2-chlorophenyl group | — | 96/0 |
| A-5 | (A-5) | 2,6-substituted (CH$_3$, Cl) phenyl | — | 96/0 |
| A-6 | (A-6) | —CH$_3$ | —CH$_2$—CH(COOCH$_3$)— | 86/10 |
| A-7 | (A-7) | —C$_2$H$_5$ | —CH$_2$—CH(C$_6$H$_5$)— | 86/10 |
| A-8 | (A-8) | 2,6-dibromophenyl | —CH$_2$—C(CH$_3$)(COOC$_2$H$_5$)— | 66/30 |
| A-9 | (A-9) | —CH$_2$-(2-naphthyl) | — | 96/0 |
| A-10 | (A-10) | —(CH$_2$)$_2$-(1-naphthyl) | — | 96/0 |
| A-11 | (A-11) | 2-(COC$_6$H$_5$)phenyl | — | 96/0 |
| A-12 | (A-12) | 2-(CN)phenyl | —CH$_2$—C(CH$_3$)(COOC$_2$H$_5$)— | 76/20 |

TABLE 1-continued

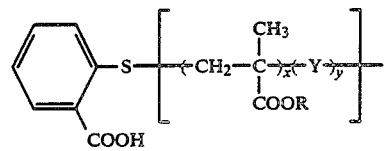

| Synthesis Example No. | Resin (A) | R | —Y— | x/y (weight ratio) |
|---|---|---|---|---|
| A-13 | (A-13) | —CH$_2$CH$_2$OC$_6$H$_5$ | — | 96/0 |

SYNTHESIS EXAMPLES A-14 TO A-24

Synthesis of Resins (A-14) to (A-24)

Resins (A) shown in Table 2 below were synthesized under the same reaction conditions as described in Synthesis Example A-1, except for using the methacrylates and mercapto compounds described in Table 2 below in place of 96 g of benzyl methacrylate and 4 g of thiosalicylic acid and replacing 200 g of toluene with 150 g of toluene and 50 g of isopropanol, respectively.

TABLE 2

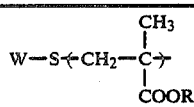

| Synthesis Example No. | Resin (A) | Mercapto Compound (W—) | | —R | | Weight Average Molecular Weight |
|---|---|---|---|---|---|---|
| A-14 | (A-14) | HOOCCH$_2$CH$_2$CH$_2$— | 4 g | —C$_2$H$_5$ | 96 g | 7.3 × 10$^3$ |
| A-15 | (A-15) | HOOCCH$_2$— | 5 g | —C$_3$H$_7$ | 95 g | 5.8 × 10$^3$ |
| A-16 | (A-16) | HOOC—CH—<br>      \|<br>HOOC—CH$_2$— | 5 g | —CH$_2$C$_6$H$_5$ | 95 g | 7.5 × 10$^3$ |
| A-17 | (A-17) | HOOCCH$_2$CH$_2$— | 5.5 g | —C$_6$H$_5$ | 94.5 g | 6.5 × 10$^3$ |
| A-18 | (A-18) | HOOCCH$_2$— | 4 g | 3-bromophenyl | 96 g | 5.3 × 10$^3$ |
| A-19 | (A-19) | (HO)$_2$P(=O)—OCH$_2$CH$_2$— | 3 g | 2,6-dichlorophenyl | 97 g | 6.0 × 10$^3$ |
| A-20 | (A-20) | HO$_3$SCH$_2$CH$_2$— | 3 g | 3-methylphenyl | 97 g | 8.8 × 10$^3$ |
| A-21 | (A-21) | H$_5$C$_2$O—P(=O)(OH)—OCH$_2$CH$_2$— | 4 g | 2-chloro-4-methylphenyl | 96 g | 7.5 × 10$^3$ |
| A-22 | (A-22) | 4-(—CH$_2$CH$_2$OOC)-phthalic anhydride | 7 g | 3-acetylphenyl | 93 g | 5.5 × 10$^3$ |

TABLE 2-continued $$W-S(CH_2-\underset{COOR}{\underset{|}{\overset{CH_3}{\underset{|}{C}}}})$$

| Synthesis Example No. | Resin (A) | Mercapto Compound (W—) | | —R | | Weight Average Molecular Weight |
|---|---|---|---|---|---|---|
| A-23 | (A-23) | $H_5C_2-\underset{OH}{\underset{|}{\overset{O}{\overset{\|}{P}}}}-OCH_2CH_2-$ | 6 g | (o-COOCH₃ phenyl) | 94 g | 4.5 × 10³ |
| A-24 | (A-24) | (3-SO₃H-phenyl)-NHCOCH₂CH₂— | 4 g | (naphthyl) | 96 g | 5.6 × 10³ |

SYNTHESIS EXAMPLE A-25

Synthesis of Resin (A-25)

A mixed solution of 100 g of 1-naphthyl methacrylate, 150 g of toluene and 50 g of isopropanol was heated to 80° C. in a nitrogen stream, and 5.0 g of 4,4'-azobis(4-cyanovaleric acid) (hereinafter simply referred to as "ACV") was added thereto, followed by reacting with stirring for 5 hours. Then, 1 g of ACV was added thereto, followed by reacting with stirring for 2 hours, and thereafter 1 g of ACV was added thereto, followed by reacting with stirring for 3 hours. The resulting copolymer (A-25) had a weight average molecular weight of 7.5×10³.

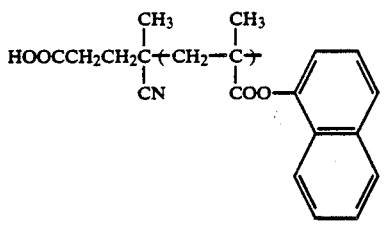

$$HOOCCH_2CH_2\underset{CN}{\underset{|}{\overset{CH_3}{\overset{|}{C}}}}(CH_2-\underset{COO-}{\underset{|}{\overset{CH_3}{\overset{|}{C}}}})-\text{(1-naphthyl)} \quad (A-25)$$

SYNTHESIS EXAMPLE A-26

Synthesis of Resin (A-26)

A mixed solution of 50 g of methyl methacrylate and 150 g of methylene chloride was cooled to −20° C. in a nitrogen stream, and 5 g of a 10% hexane solution of 1,1-diphenylhexyl lithium prepared just before was added thereto, followed by stirring for 5 hours. Carbon dioxide was passed through the mixture at a flowing rate of 10 ml/cc for 10 minutes with stirring, the cooling was stopped and the reaction mixture was allowed to cool to room temperature with stirring. Then, the reaction mixture was added to a solution of 50 ml of 1N hydrochloric acid in 1 liter of methanol to precipitate, and the white powder was collected by filtration. The powder was washed with water until the washings became neutral, and dried under reduced pressure to obtain 18 g of the copolymer having a weight average molecular weight of 6.5×10³.

$$C_5H_{11}-\underset{C_6H_5}{\underset{|}{\overset{C_6H_5}{\overset{|}{C}}}}(CH_2-\underset{COOCH_3}{\underset{|}{\overset{CH_3}{\overset{|}{C}}}})COOH \quad (A-26)$$

SYNTHESIS EXAMPLE A-27

Synthesis of Resin (A-27)

A mixed solution of 95 g of n-butyl methacrylate, 4 g of thioglycolic acid, and 200 g of toluene was heated to 75° C. in a nitrogen stream, and 1.0 g of ACV was added thereto to effect reaction for 6 hours. Then, 0.4 g of AIBN was added thereto, followed by reacting for 3 hours. The resulting copolymer had a weight average molecular weight of 7.8×10³.

$$W(CH_2-\underset{COOC_4H_9}{\underset{|}{\overset{CH_3}{\overset{|}{C}}}})- \quad (A-27)$$

$$W: HOOCCH_2S-/HOOCCH_2CH_2\underset{CH_3}{\underset{|}{\overset{CH_3}{\overset{|}{C}}}}-: 4/1 \text{ (weight ratio)}$$

SYNTHESIS EXAMPLE M-1

Synthesis of Macromonomer (MM-1)

A mixture of 90.1 g of 1,4-butanediol, 105.1 g of succinic anhydride, 1.6 g of p-toluenesulfonic acid monohydrate, and 200 g of toluene was refluxed by heating with stirring in a flask equipped with a Dean-Stark refluxing condenser for 4 hours. The amount of water azeotropically distilled off with toluene was 17.5 g.

Then, after adding a mixture of 17.2 g of acrylic acid and 150 g of toluene, and 1.0 g of tert-butylhydroquinone to the aforesaid reaction mixture, the reaction was carried out for 4 hours with stirring under refluxing. After cooling to room temperature, the reaction mixture was precipitated in 2 liters of methanol and solids thus precipitated were collected by filtration and dried under reduced pressure to provide 135 g of the desired macromonomer (MM-1) having a weight average molecular weight of $6.8 \times 10^3$.

(MM-1): $CH_2=CH-COO+(CH_2)_5OCO+(CH_2)_2COO+H$

SYNTHESIS EXAMPLE M-2

Synthesis of Macromonomer (MM-2)

A mixture of 120 g of 1,6-hexanediol, 114.1 g of glutaric acid anhydride, 3.0 g of p-toluenesulfonic acid monohydrate, and 250 g of toluene was refluxed under the same condition as in Synthesis Example M-1. The amount of water azeotropically distilled off was 17.5 g.

After cooling to room temperature, the reaction mixture was precipitated in 2 liters of n-hexane and after removing a liquid phase by decantation, the solid precipitates were collected and dried under reduced pressure.

The aforesaid reaction product was dissolved in toluene and the content of a carboxy group was determined by a neutralization titration method with a 0.1 N methanol solution of potassium hydroxide. The content was 500 μmol/g.

A mixture of 100 g of the aforesaid solid product, 8.6 g of methacrylic acid, 1.0 g of tert-butylhydroquinone, and 200 g of methylene chloride was stirred at room temperature to dissolve the solid product. Then, a mixture of 20.3 g of dicyclohexyl carbodiimide (hereinafter simply referred to as D.C.C.), 0.5 g of 4-(N,N-dimethyl-)aminopyridine, and 100 g of methylene chloride was added dropwise to the aforesaid mixture with stirring over a period of one hour, followed by further stirring for 4 hours as it was.

With the addition of the D.C.C. solution, insoluble crystals deposited. The reaction mixture was filtered through a 200 mesh nylon cloth to remove the insoluble matters.

The filtrate was re-precipitated in 2 liters of hexane and the powder thus precipitated was collected by filtration. To the powder was added 500 ml of acetone and after stirring the mixture for one hour, the insoluble matters were subjected to a natural filtration using a filter paper. After concentrating the filtrate under reduced pressure to ½ of the original volume, the solution thus concentrated was added to 1 liter of ether, and the mixture was stirred for one hour. The solids thus deposited were collected by filtration and dried under reduced pressure.

Thus, 53 g of the desired macromonomer (MM-2) having a weight average molecular weight of $8.2 \times 10^3$ was obtained.

(MM-2): $CH_2=\overset{CH_3}{\underset{|}{C}}-COO+(CH_2)_5OCO(CH_2)_3COO+H$

SYNTHESIS EXAMPLE M-3

Synthesis of Macromonomer (MM-3)

In an oil bath kept at an outside temperature of 150° C. was stirred 500 g of 12-hydroxystearic acid under reduced pressure of from 10 to 15 mmHg for 10 hours while distilling off water produced. The content of a carboxy group of the liquid product obtained was 600 μmol/g.

A mixture of 100 g of the aforesaid liquid product, 18.5 g of methacrylic acid anhydride, 1.5 g of tert-butylhydroquinone, and 200 g of tetrahydrofuran was stirred for 6 hours at a temperature of from 40° C. to 45° C. and the reaction mixture obtained was added dropwise to 1 liter of water with stirring over a period of one hour, followed by stirring for further one hour. The mixture was allowed to stand, the sediment thus formed was collected by decantation, dissolved in 200 g of tetrahydrofuran, and precipitated in one liter of methanol. The sediment thus formed was collected by decantation and dried under reduced pressure to provide 62 g of the desired macromonomer (MM-3) having a weight average molecular weight of $6.7 \times 10^3$.

(MM-3): $CH_2=\overset{CH_3}{\underset{|}{C}}\ \overset{C_6H_{13}}{\underset{|}{}}$
$COO+CH(CH_2)_{10}COO+H$

SYNTHESIS EXAMPLE M-4

Synthesis of Macromonomer (MM-4)

According to the synthesis method described in S. Penczek et al, *Makromol. Chem.*, Vol. 188, page 1347 (1987), the macromonomer (MM-4) having the following structure was synthesized.

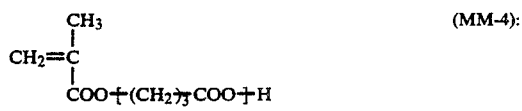

(MM-4): $CH_2=\overset{CH_3}{\underset{|}{C}}$
$COO+(CH_2)_5COO+H$

Weight average molecular weight: $7.3 \times 10^3$

SYNTHESIS EXAMPLE M-5

Synthesis of Macromonomer (MM-5)

To a mixed solution of 50 g of Macromonomer (MM-4) obtained in Synthesis Example M-4, 3 g of methanol, 0.5 g of tert butylhydroquinone and 150 g of methylene chloride was added dropwise a mixed solution of 6 g of D.C.C., 0.1 g of 4-(N,N-dimethyl-)aminopyridine, and 10 g of methylene chloride at a temperature of from 20° C. to 25° C. with stirring over a period of 30 minutes, followed by further stirring for 4 hours as it was.

Then, 5 g of formic acid was added to the reaction mixture, followed by stirred for 1 hour. The insoluble matters were removed by filtration, the filtrate was re-precipitated in 1 liter of methanol, and after removing the liquid phase by decantation, the precipitates were collected and dried under reduced pressure to obtain 28 g of the viscous product having a weight average molecular weight of $7.5 \times 10^3$.

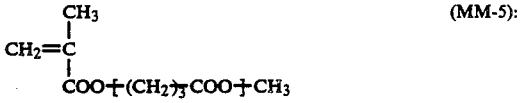

(MM-5): $CH_2=\overset{CH_3}{\underset{|}{C}}$
$COO+(CH_2)_5COO+CH_3$

SYNTHESIS EXAMPLE M-6

Synthesis of Macromonomer (MM-6)

A mixture of 90.1 g of 1,4-butanediol, 105.1 g of succinic anhydride, 1.6 g of p-toluenesulfonic acid monohydrate, and 200 g of toluene was refluxed in a flask equipped with a Dean-Stark refluxing condensor with stirring for 4 hours. The amount of water azeotropically distilled off with toluene was 17.5 g.

Then, after adding a mixture of 21.2 g of 2-hydroxyethyl methacrylate and 150 g of toluene, and 1.0 g of tert-butylhydroquinone to the aforesaid reaction mixture, a mixture of 33.5 g of D.C.C., 1.0 g of 4-(N,N-dimethylamino)pyridine, and 100 g of methylene chloride was added dropwise to the above mixture with stirring over a period of one hour, followed by stirring for further 4 hours as it was.

The reaction mixture was filtered through a 200 mesh nylon cloth to filter off insoluble matters. The filtrate was precipitated in 3 liters of methanol, and the powder thus formed was collected by filtration. The powder was dissolved in 200 g of methylene chloride and the solution was re-precipitated in 3 liters of methanol. The powder thus formed was collected by filtration and dried under reduced pressure to provide 103 g of the desired macromonomer (MM-6) having a weight average molecular weight of $6.3 \times 10^3$.

(MM-6):

SYNTHESIS EXAMPLE M-7

Synthesis of Macromonomer (MM-7)

A mixture of 120 g of 1,6-hexanediol, 114.1 g of glutaric anhydride, 3.0 g of p-toluenesulfonic acid monohydrate, and 250 g of toluene was refluxed under the same conditions as in Synthesis Example M-6. The amount of water azeotropically distilled off was 17.5 g.

After cooling to room temperature, the reaction mixture was precipitated in 2 liters of n-hexane and after removing a liquid phase by decantation, the sediment thus formed was collected and dried under reduced pressure.

The reaction product thus obtained was dissolved in toluene and the content of a carboxy group was determined by the neutralization titration method using a 0.1 N methanol solution of potassium hydroxide. The content was 500 $\mu$mol/g.

A mixture of 100 g of the above solid product, 10.7 g of glycidyl methacrylate, 1.0 g of tert-butylhydroquinone, 1.0 g of N,N-dimethyldodecylamine, and 200 g of xylene was stirred for 5 hours at 140° C. After cooling, the reaction mixture was re-precipitated in 3 liters of n-hexane and after removing the liquid phase by decantation, the sediment was collected and dried under reduced pressure.

When the content of remaining carboxy group of the macromonomer obtained was determined by the aforesaid neutralization titration method, the content was 8 $\mu$mol/g and the conversion rate was 99.8%.

Thus, 63 g of the desired macromonomer (MM-7) having a weight average molecular weight of $7.6 \times 10^3$ was obtained.

(MM-7):

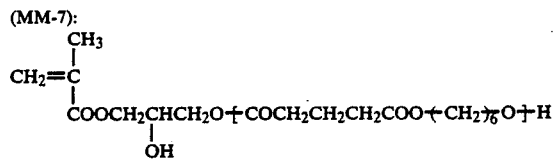

SYNTHESIS EXAMPLE M-8

Synthesis of Macromonomer (MM-8)

To a mixture of 100 g of the polyester oligomer obtained in Synthesis Example M-7, 200 g of methylene chloride, and 1 ml of dimethylformamide was added dropwise 15 g of thionyl chloride with stirring at a temperature of from 25° C. to 30° C. Thereafter, the mixture was stirred for 2 hours as it was. Then, after distilling off methylene chloride and excessive thionyl chloride under reduced pressure by an aspirator, the residue was dissolved in 200 g of tetrahydrofuran and 11.9 g of pyridine and then 8.7 g of allyl alcohol was added dropwise to the solution with stirring at a temperature of from 25° C. to 30° C. Thereafter, the mixture was stirred for 3 hours as it was, and the reaction mixture was poured into one liter of water, followed by stirring for one hour. After allowing the reaction mixture to stand, the liquid product thus sedimented was collected by decantation. The liquid product was poured into one liter of water, followed by stirring for 30 minutes and, after allowing to stand the mixture, the liquid product thus sedimented was collected by decantation. The aforesaid operation was repeatedly carried out until the supernatant solution became neutral.

Then, 500 ml of diethyl ether was added to the liquid product followed by stirring to form solids, which were collected by filtration and dried under reduced pressure to provide 59 g of the desired macromonomer (MM-8) having a weight average molecular weight of $7.7 \times 10^3$.

(MM-8):

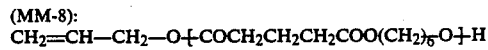

SYNTHESIS EXAMPLE M-9

Synthesis of Macromonomer (MM-9)

In an oil bath kept at an outside temperature of 150° C. was stirred 500 g of 12-hydroxystearic acid for 10 hours under a reduced pressure of from 10 to 15 mmHg while distilling off water formed. The content of a carboxy group of the liquid product obtained was 600 $\mu$mol/g.

To a mixture of 100 g of the aforesaid liquid product, 13.9 g of 2-hydroxyethyl acrylate, 1.5 g of tert-butylhydroquinone, and 200 g of methylene chloride was added dropwise a mixture of 24.8 g of D.C.C., 0.8 g of 4-(N,N-dimethyl)aminopyridine, and 100 g of methylene chloride with stirring at room temperature over a period of one hour, followed by stirring for 4 hours as it was.

The reaction mixture was filtered through a 200 mesh nylon cloth to filter off insoluble matters. After concentrating the filtrate under reduced pressure, 300 g of n-hexane was added to the residue formed followed by stirring and insoluble matters were filtered off using a filter paper. After concentrating the filtrate, the residue formed was dissolved in 100 g of tetrahydrofuran, the mixture was re-precipitated in one liter of methanol, and the sediment thus formed was collected by decantation. The product was dried under reduced pressure to provide 60 g of the desired macromonomer (MM-9) having a weight average molecular weigh of $6.7 \times 10^3$.

(MM-9):
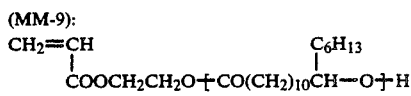

SYNTHESIS EXAMPLE B-1

Synthesis of Resin (B-1)

A mixture of 85 g of ethyl methacrylate, 15 g of the compound (MM-1) obtained in Synthesis Example M-1, and 200 g of toluene was heated to 75° C. under a nitrogen gas stream. After adding thereto 0.6 g of 1,1'-azobis(cyclohexane-1-carbonitrile) (hereinafter referred to as ABCC), the mixture was stirred for 4 hours. Then, 0.3 g of ABCC was added thereto, followed by stirring for 3 hours and thereafter further adding thereto 0.2 g of ABCC, followed by stirring for 4 hours.

A weight average molecular weight of the copolymer (B-1) obtained was $9.1 \times 10^4$.

(B-1):
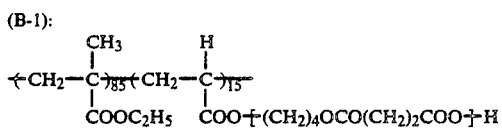

SYNTHESIS EXAMPLE B-2

Synthesis of Resin (B-2)

A mixture of 95 g of benzyl methacrylate, 5 g of the compound (MM-4) obtained in Synthesis Example M-4, and 200 g of toluene was heated to 75° C. under a nitrogen gas stream. After adding 0.6 g of 4,4'-azobis(2-cyanovaleric acid) (hereinafter referred to as ACV) to the reaction mixture, the resulting mixture was stirred for 4 hours. Then, 0.3 g of ACV was added thereto, followed by stirring for 3 hours and thereafter 0.2 g of ACV was further added thereto, followed by stirring for 3 hours. The weight average molecular weight of the copolymer (B-2) thus obtained was $1.2 \times 10^5$.

(B-2):
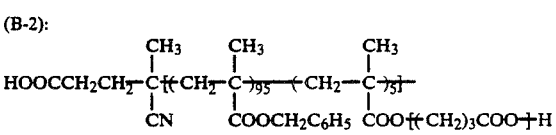

SYNTHESIS EXAMPLES B-3 TO B-13

Synthesis of Resins (B-3) to (B-13)

Resins (B) shown in Table 3 below were synthesized under the same polymerization conditions as described in Synthesis Example B-1, respectively. These resins obtained had an Mw of from $8.5 \times 10^4$ to $1.0 \times 10^5$.

TABLE 3

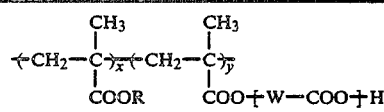

| Synthesis Example No. | Resin (B) | R | x/y (weight ratio) | Mw of Macromonomer | —W— |
|---|---|---|---|---|---|
| B-3 | (B-3) | —$C_2H_5$ | 85/15 | $7.5 \times 10^3$ |  |
| B-4 | (B-4) | —$CH_2C_6H_5$ | 90/10 | $5.8 \times 10^3$ |  |
| B-5 | (B-5) | —$C_2H_5$ | 80/20 | $6.2 \times 10^3$ |  |
| B-6 | (B-6) | 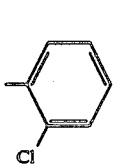 | 90/10 | $7.0 \times 10^3$ |  |
| B-7 | (B-7) | 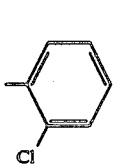 | 93/7 | $3.2 \times 10^3$ |  |

TABLE 3-continued $$\{CH_2-\underset{\underset{COOR}{|}}{\overset{\overset{CH_3}{|}}{C}}\}_x\{CH_2-\underset{\underset{COO\{W-COO\}H}{|}}{\overset{\overset{CH_3}{|}}{C}}\}_y$$

| Synthesis Example No. | Resin (B) | R | x/y (weight ratio) | Mw of Macromonomer | —W— |
|---|---|---|---|---|---|
| B-8 | (B-8) | 2,3-dimethylphenyl (o-xylyl) | 92/8 | $4.5 \times 10^3$ | $-(CH_2)_4OCOCH_2-C_6H_4-CH_2-$ |
| B-9 | (B-9) | 2,6-dichlorophenyl | 90/10 | $6.7 \times 10^3$ | $-\underset{\underset{C_6H_{13}}{|}}{CH}-(CH_2)_{10}-$ |
| B-10 | (B-10) | $-CH_2-$naphthyl | 90/10 | $7.3 \times 10^3$ | $-(CH_2)_{12}-$ |
| B-11 | (B-11) | $-CH_2C_6H_5$ | 88/12 | $6.8 \times 10^3$ | $-CH_2-\underset{\underset{CH_3}{|}}{\overset{\overset{CH_3}{|}}{C}}-$ |
| B-12 | (B-12) | $-CH_2-$(o-tolyl) | 92/8 | $4.6 \times 10^3$ | $-CH_2CH=CH-CH_2OCO\{CH_2\}-$ |
| B-13 | (B-13) | 3-acetylphenyl | 94/6 | $3.8 \times 10^3$ | $-(CH_2)_2O(CH_2)OCO(CH_2)_2-$ |

SYNTHESIS EXAMPLES B-14 TO B-23

Synthesis of Resins (B-14) to (B-23)

Resins (B) shown in Table 4 below were synthesized under the same polymerization conditions as described in Synthesis Example B-1 except for using the mercapto compounds shown below as the chain transfer agents, respectively. These resins obtained had an Mw of from $8.0 \times 10^4$ to $1.0 \times 10^5$.

TABLE 4

$$R'-S-(-CH_2-\underset{\underset{COO-R}{|}}{\overset{\overset{CH_3}{|}}{C}})_x(CH_2-\underset{\underset{COO(CH_2)_2COO(-W-COO-)H}{|}}{\overset{\overset{CH_3}{|}}{C}})_y$$

| Synthesis Example No. | Resin (B) | R' | R | x/y (weight ratio) | Mw of Macromonomer | —W— |
|---|---|---|---|---|---|---|
| B-14 | (B-14) | HOOC—HC—<br>HOOC—CH$_2$ | —CH$_2$C$_6$H$_5$ | 95/5 | 7.0 × 10$^3$ | —(CH$_2$)$_6$OCO(CH$_2$)$_3$— |
| B-15 | (B-15) | HOOCH$_2$C—H$_2$C— | " | 94/6 | 5.8 × 10$^3$ | —CH$_2$—C(C$_2$H$_5$)(C$_2$H$_5$)—CH$_2$OCO(CH$_2$)$_2$— |
| B-16 | (B-16) | HOOC(CH$_2$)$_2$CONH(H$_2$C)$_2$— | —C$_2$H$_5$ | 92/8 | 7.2 × 10$^3$ | —(CH$_2$)$_4$OCO(CH$_2$)$_2$— |
| B-17 | (B-17) | HO(CH$_2$)$_2$— |  | 85/15 | 4.5 × 10$^3$ | —(CH$_2$)$_4$OCO(CH$_2$)$_4$— |
| B-18 | (B-18) |  |  | 96/4 | 7.5 × 10$^3$ | —(CH$_2$)$_8$OCOCH=CH— |
| B-19 | (B-19) | HO$_3$S(CH$_2$)$_2$— | 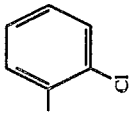 | 97/3 | 3.8 × 10$^3$ | —(CH$_2$)$_3$OCOCH$_2$CH(C$_4$H$_9$)— |
| B-20 | (B-20) |  | 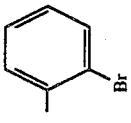 | 90/10 | 6.8 × 10$^3$ | —CH(CH$_2$)$_8$—<br>C$_4$H$_9$ |

TABLE 4-continued $$R'-S+\left(-CH_2-C\underset{COO-R}{\overset{CH_3}{-}}\right)_x\left(-CH_2-C\underset{COO(CH_2)_2COO+W-COO+H}{\overset{CH_3}{-}}\right)_y$$

| Synthesis Example No. | Resin (B) | R' | R | x/y (weight ratio) | Mw of Macromonomer | —W— |
|---|---|---|---|---|---|---|
| B-21 | (B-21) | ![o-COOH-phenyl]—COOH (ortho) | —CH$_2$C$_6$H$_5$ | 92/8 | $4.8 \times 10^3$ | —(CH$_2$)$_6$OCO$+$CH$_2$)$_4$— |
| B-22 | (B-22) | C$_2$H$_5$O—P(=O)(OH)—O$+$CH$_2$)$_2$— | 2,6-dimethylphenyl-CH$_2$— (—CH$_2$—C$_6$H$_3$(CH$_3$)$_2$) | 90/10 | $7.3 \times 10^3$ | —CH$_2$CH(C$_2$H$_5$)—CH$_2$OCO(CH$_2$)$_2$— |
| B-23 | (B-23) | o-COOH-phenyl—COOH | —C$_2$H$_5$ | 90/10 | $6.5 \times 10^3$ | —CH$_2$—C$_6$H$_4$—CH$_2$OCO(CH$_2$)$_3$— |

SYNTHESIS EXAMPLES B-24 TO B-31 thesis Example B-2, respectively. These resins obtained had an Mw of from $8.0 \times 10^4$ to $2 \times 10^5$.

TABLE 5

$$R''\text{-}\!\!\left(\!\!\text{CH}_2\text{-}\underset{\underset{\text{COOR}}{|}}{\overset{\overset{\text{CH}_3}{|}}{C}}\!\!\right)_{\!\!x}\!\!\left(\!\!\text{CH}_2\text{-}\underset{\underset{\text{COO(CH}_2)_2\text{OCO(CH}_2)_2\text{COO}\text{-}\!\!\left[(\text{CH}_2)_2\text{OCO(CH}_2)_2\text{COO}\right]_{\!\!n}\!\!\text{H}}{|}}{\overset{\overset{\text{CH}_3}{|}}{C}}\!\!\right)_{\!\!y}\!\!-$$

Mw of the macromonomer portion: $5.6 \times 10^3$

| Synthesis Example No. | Resin (B) | R''— | R | x/y (weight ratio) |
|---|---|---|---|---|
| B-24 | (B-24) | HOCH₂–C(CH₃)(CN)– | —C₄H₉(n) | 85/15 |
| B-25 | (B-25) | HOCH₂CH₂CH₂–C(CH₃)(CN)– | —C₂H₅ | 80/20 |
| B-26 | (B-26) | HOH₂C–C(CH₂OH)(CH₂OH)–NHCO–C(CH₃)(CH₃)– | —C₆H₅ | 88/12 |
| B-27 | (B-27) | CH₃–C(CH₂OH)(CH₂OH)–NHCO–C(CH₃)(CH₃)– | —CH₂C₆H₅ | 90/10 |
| B-28 | (B-28) | HO-[tetrahydropyrimidine]-C(CH₃)(CH₃)– | o-tolyl | 90/10 |
| B-29 | (B-29) | [N-CH₂CH₂OH tetrahydropyrimidine]-C(CH₃)(CH₃)– | —C₂H₅ | 88/12 |
| B-30 | (B-28) | [N-CH₂CH₂OH tetrahydropyrimidine]-C(CH₃)(CH₃)– | —C₃H₇ | 85/15 |
| B-31 | (B-31) | HO(CH₂)₂NHCO–C(CH₃)(CH₃)– | o-chlorophenyl | 80/20 |

Synthesis of Resins (B-24) to (B-31)

Resins (B) shown in Table 5 below were synthesized under the same polymerization conditions as described in Synthesis Example B-2, except for using the azobis compounds shown below in place of ACV used in Syn-

SYNTHESIS EXAMPLES B-32 TO B-41

Synthesis of Resins (B-32) to (B-41)

Resins (B) shown in Table 6 below were synthesized under the same polymerization conditions as described in Synthesis Example B-1, respectively. These resins obtained had an Mw of from $9.0 \times 10^4$ to $1.2 \times 10^5$.

TABLE 6

$$+CH_2-\underset{\underset{COO-R}{|}}{\overset{\overset{CH_3}{|}}{C}}\mathrm{\rightarrowtail}_{\overline{x}}(Y)_{\overline{y}}(CH_2-\underset{\underset{COO+W-COO+H}{|}}{\overset{\overset{CH_3}{|}}{C}})_{\overline{z}}$$

| Synthesis Example No. | Resin (B) | R | Y | W | x/y/z (weight ratio) |
|---|---|---|---|---|---|
| B-32 | (B-32) | —CH₃ | —CH₂—CH—<br>$\quad\quad$\|<br>$\quad\quad$COOCH₃ | —(CH₂)₄OCO(CH₂)₃— | 65/20/15 |
| B-33 | (B-33) | —C₄H₉ | —CH₂—CH—<br>$\quad\quad$\|<br>$\quad\quad$C₆H₅ | —(CH₂)₃OCO—(CH₂)₂— | 70/15/15 |
| B-34 | (B-34) | —CH₂C₆H₅ | —CH₂—CH—<br>$\quad\quad$\|<br>$\quad\quad$COOCH₃ | —(CH₂)₆OCO(CH₂)₂— | 75/15/10 |
| B-35 | (B-35) | —C₆H₅ | —CH₂—CH—<br>$\quad\quad$\|<br>$\quad\quad$COOC₂H₅ | —(CH₂)₆OCOCH=CH— | 70/15/15 |
| B-36 | (B-36) | —CH₃ | —CH₂—CH—<br>$\quad\quad$\|<br>$\quad\quad$CN | $\quad$C₆H₁₃<br>$\quad$\|<br>—CH(CH₂)₁₀— | 70/10/20 |
| B-37 | (B-37) | —C₂H₅ | —CH₂—CH—<br>$\quad\quad$\|<br>$\quad\quad$CONH₂ | —(CH₂)₆—OCO(CH₂)₃— | 70/10/20 |
| B-38 | (B-38) | (o-chlorophenyl) | $\quad\quad$CH₃<br>$\quad\quad$\|<br>—CH₂—C—<br>$\quad\quad$\|<br>$\quad\quad$COOCH₂CH₂Cl | $\quad\quad\quad\quad$CH₃<br>$\quad\quad\quad\quad$\|<br>—(CH₂)₆OCOCH₂CH— | 75/10/15 |
| B-39 | (B-39) | —C₂H₅ | —CH₂—CH—<br>$\quad\quad$\|<br>$\quad\quad$COOCH₃ | —(CH₂)₁₂— | 75/15/10 |
| B-40 | (B-40) | —CH₂C₆H₅ | $\quad\quad$CH₃<br>$\quad\quad$\|<br>—CH₂—C—<br>$\quad\quad$\|<br>$\quad\quad$COOCH₂CH₂OH | $\quad\quad$C₂H₅<br>$\quad\quad$\|<br>—CH₂—CH—CH₂OCO(CH₂)₃— | 80/10/10 |
| B-41 | (B-41) | (2,3-dimethyl-chlorophenyl)<br>CH₃, Cl substituents | —CH₂—CH—<br>$\quad\quad$\|<br>$\quad\quad$C₆H₅ | $\quad\quad$CH₃<br>$\quad\quad$\|<br>—CH₂—C—CH₂OCO(CH₂)₂—<br>$\quad\quad$\|<br>$\quad\quad$CH₃ | 65/20/15 |

SYNTHESIS EXAMPLE B-42

Synthesis of Resin (B-42)

A mixture of 80 g of benzyl methacrylate, 20 g of the compound (MM-5) obtained in Synthesis Example M-5, and 200 g of toluene was reacted under the same polymerization conditions as described in Synthesis Example B-2. The weight average molecular weight of the copolymer (B-42) thus obtained was $9.8 \times 10^4$.

(B-42):

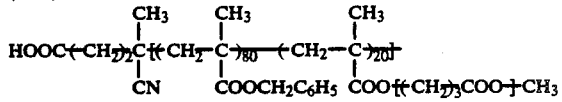

$$\mathrm{HOOC(CH_2)_2C(CH_2-C)_{80}-(CH_2-C)_{20}}$$
with CN, COOCH₂C₆H₅, COO(CH₂)₃COO—CH₃ substituents

SYNTHESIS EXAMPLE B-43

Synthesis of Resin (B-43)

A mixture of 80 g of ethyl methacrylate, 20 g of the compound (MM-6) obtained in Synthesis Example M-6, and 150 q of toluene was heated to 70° C. under a nitrogen gas stream. After adding thereto 0.8 g of ACV, the reaction mixture was stirred for 6 hours. Then, 0.1 g of ACV was added thereto, followed by stirring for 2 hours and thereafter 0.1 g of ACV was further added thereto, followed by stirring for 3 hours. The weight average molecular weight of the copolymer (B-42) thus obtained was $9.2 \times 10^4$.

SYNTHESIS EXAMPLES B-44 TO B-59

Synthesis of Resins (B-44) to (B-59)

Resins (B) shown in Table 7 below were synthesized under the same polymerization conditions as described in Synthesis Example B-43, respectively. These resins (B-43):

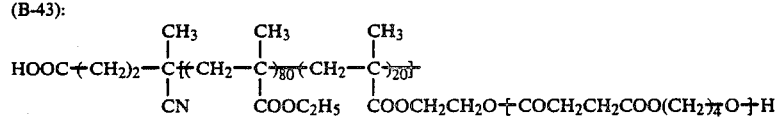

obtained had an Mw of from $8.5 \times 10^4$ to $1.0 \times 10^5$.

TABLE 7

$$\text{HOOC}(CH_2)_2-\underset{\underset{CN}{|}}{\overset{\overset{CH}{|}}{C}}-[(CH_2-\underset{\underset{COOR}{|}}{\overset{\overset{CH_3}{|}}{C}})_x(Y)_y(CH_2-\underset{\underset{\underset{OH}{|}}{COOCH_2CHCH_2O(CO-W-O)H}}{\overset{\overset{CH}{|}}{C}})_z]$$

| Synthesis Example No. | Resin (B) | R | x | —Y— | y | —W— | z |
|---|---|---|---|---|---|---|---|
| B-44 | (B-44) | —CH$_3$ | 70 | —CH$_2$—CH—<br>\|<br>COOCH$_3$ | 10 | —(CH$_2$)$_3$COO(CH$_2$)$_4$— | 20 |
| B-45 | (B-45) | —CH$_3$ | 75 | — | 0 | —(CH$_2$)$_3$COO(CH$_2$)$_6$— | 25 |
| B-46 | (B-46) | —CH$_3$ | 85 | — | 0 | —(CH$_2$)$_2$COO—CH$_2$—C(CH$_3$)$_2$—CH$_2$— | 15 |
| B-47 | (B-47) | —C$_2$H$_5$ | 75 | —CH$_2$—CH—<br>\|<br>COOCH$_3$ | 10 | —(CH$_2$)$_3$COO(CH$_2$)$_2$— | 15 |
| B-48 | (B-48) | —C$_3$H$_7$ | 80 | — | 0 | —CH$_2$—C$_6$H$_4$—CH$_2$COO(CH$_2$)$_4$— | 20 |
| B-49 | (B-49) | —C$_2$H$_5$ | 70 | —CH$_2$—CH—<br>\|<br>C$_6$H$_5$ | 20 | —CH=CH—COOCH$_2$—C$_6$H$_4$—CH$_2$— | 10 |
| B-50 | (B-50) | —C$_6$H$_5$ | 70 | —CH$_2$—CH—<br>\|<br>COOC$_2$H$_5$ | 10 | —(CH$_2$)$_3$COO(CH$_2$)$_6$— | 20 |
| B-51 | (B-51) | —CH$_2$C$_6$H$_5$ | 80 | — | 0 | —(CH$_2$)$_{10}$CH(C$_6$H$_{13}$)— | 20 |
| B-52 | (B-52) | —C$_2$H$_5$ | 90 | — | 0 | —(CH$_2$)$_{16}$— | 10 |
| B-53 | (B-53) | —C$_3$H$_7$ | 85 | — | 0 | —CH$_2$—C(CH$_3$)$_2$— | 15 |
| B-54 | (B-54) | —C$_4$H$_9$ | 75 | —CH$_2$—CH—<br>\|<br>CN | 10 | —CH(C$_2$H$_5$)—CH$_2$COO(CH$_2$)$_3$— | 15 |

TABLE 7-continued $$\text{HOOC}(\text{CH}_2)_2-\underset{\underset{\text{CN}}{|}}{\overset{\overset{\text{CH}}{|}}{\text{C}}}-[(\text{CH}_2-\underset{\underset{\text{COOR}}{|}}{\overset{\overset{\text{CH}_3}{|}}{\text{C}}})_x(\text{Y})_y(\text{CH}_2-\underset{\underset{\underset{\text{OH}}{|}}{\text{COOCH}_2\text{CHCH}_2\text{O}(\text{CO}-\text{W}-\text{O})_{\overline{h}}\text{H}}}{\overset{\overset{\text{CH}}{|}}{\text{C}}})_z]$$

| Synthesis Example No. | Resin (B) | R | x | —Y— | y | —W— | z |
|---|---|---|---|---|---|---|---|
| B-55 | (B-55) | <img: dimethylphenyl> | 60 | —CH$_2$—C(CH$_3$)(COOCH$_2$CH$_2$CN)— | 10 | —(CH$_2$)$_3$COOCH$_2$CH(C$_2$H$_5$)CH$_2$— | 30 |
| B-56 | (B-56) | —C$_2$H$_5$ | 60 | — | 0 | —(CH$_2$)$_2$COOCH$_2$—C(C$_2$H$_5$)(C$_2$H$_5$)—CH$_2$— | 40 |
| B-57 | (B-57) | —C$_2$H$_5$ | 72 | —CH$_2$—CH(CONH$_2$)— | 8 | $+$CH$_2)_3$COO(CH$_2)_6$— | 20 |
| B-58 | (B-58) | —CH$_2$—C$_6$H$_5$ | 70 | — | 0 | $+$CH$_2)_5$— | 30 |
| B-59 | (B-59) | —CH$_3$ | 30 | —CH$_2$—C(CH$_3$)(COOC$_2$H$_5$)— | 20 | ( CH$_2)_3$COO(CH$_2)_3$— | 50 |

SYNTHESIS EXAMPLE B-60

Synthesis of Resin (B-60)

A mixture of 80 g of ethyl methacrylate, 20 g of Macromonomer (MM-10) having the structure shown below, 0.8 g of thioglycolic acid, and 150 g of toluene was heated to 80° C. under a nitrogen gas stream. After adding 0.5 g of ABCC to the reaction mixture, the resulting mixture was stirred for 5 hours. Then, 0.3 g of ABCC was added thereto, followed by stirring for 4 hours and thereafter 0.3 g of ABCC was further added thereto, followed by stirring for 5 hours. The weight average molecular weight of the copolymer (B-60) thus obtained was $1.8 \times 10^5$.

Macromonomer (MM-10):

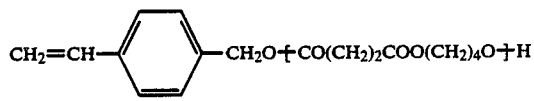

(B-60):

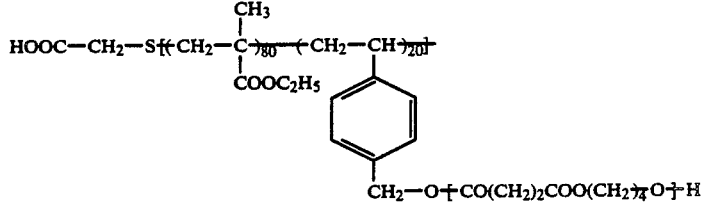

SYNTHESIS EXAMPLES B-61 TO B-71

Synthesis of Resins (B-61) TO (B-71)

Resins (B) shown in Table 8 below were synthesized under the same polymerization conditions as described in Synthesis Example B-60, except for employing the monomers and the mercapto compounds shown below, respectively. The resins thus-obtained had an Mw of from $9.0 \times 10^4$ to $2.0 \times 10^5$.

TABLE 8

$$R'-S+CH_2-\underset{\underset{COOR}{|}}{\overset{\overset{CH_3}{|}}{C}})_x(Y)_y(CH_2-\underset{\underset{COOCH_2CH_2(CO-W-O)_zH}{|}}{\overset{\overset{CH_3}{|}}{C}})_z$$

| Synthesis Example No. | Resin (B) | R'— | R | x | —Y— | y | —W— | z |
|---|---|---|---|---|---|---|---|---|
| B-61 | (B-61) | HOOCCH$_2$CH$_2$— | —CH$_3$ | 75 | —CH$_2$—CH—<br>\|<br>COOCH$_3$ | 15 | $+$CH$_2)_2$COO(CH$_2)_6$— | 10 |
| B-62 | (B-62) | HOOC—CH—<br>\|<br>HOOC—CH$_2$ | —C$_2$H$_5$ | 70 | — | | $+$CH$_2)_2$COO(CH$_2)_4$— | 30 |
| B-63 | (B-63) | ⟨o-C$_6$H$_4$(COOH)⟩— | —C$_3$H$_7$ | 80 | — | | $+$CH$_2)_{16}$— | 20 |
| B-64 | (B-64) | | —C$_2$H$_5$ | 65 | —CH$_2$—CH—⟨C$_6$H$_5$⟩ | 20 | $+$CH$_2)_3$COO(CH$_2)_2$— | 15 |
| B-65 | (B-65) | HOCHCH$_2$—<br>\|<br>HOCH$_2$ | —C$_2$H$_5$ | 80 | —CH$_2$—CH—<br>\|<br>CN | 10 | $+$CH$_2)_2$COO(CH$_2)_6$— | 10 |
| B-66 | (B-66) | O<br>\|\|<br>HO—P—OCH$_2$CH$_2$—<br>\|<br>OH | —CH$_2$C$_6$H$_5$ | 80 | — | | C$_6$H$_{13}$<br>\|<br>$+$CH$_2)_{10}$CH— | 20 |
| B-67 | (B-67) | ⟨o-C$_6$H$_4$(SO$_3$H)⟩—CONHCH$_2$CH$_2$— | —CH$_2$—⟨o-C$_6$H$_4$(CH$_3$)⟩ | 70 | —CH$_2$—CH—<br>\|<br>COOC$_2$H$_5$ | 10 | CH$_3$<br>\|<br>—CH$_2$—C—CH$_3$<br>\|<br>CH$_3$ | 20 |

TABLE 8-continued $$R'-S+(CH_2-\underset{COOR}{\underset{|}{C}})_x+Y)_y+CH_2-\underset{COOCH_2O+CO-W-O)_zH}{\underset{|}{C}}_z$$

| Synthesis Example No. | Resin (B) | R'— | R | x | —Y— | y | —W— | z |
|---|---|---|---|---|---|---|---|---|
| B-68 | (B-68) | 4-COOCH₂CH₂— substituted phthalic anhydride group | —C₄H₉ | 75 | —CH₂—CH(CONH₂)— | 5 | —CH₂CH(CH₃)— | 20 |
| B-69 | (B-69) | H₅C₂O—P(=O)(OH)—OCH₂CH₂— | o-tolyl (C₆H₄CH₃) | 75 | — | | —(CH₂)₂COOCH₂CHCH₂— with C₂H₅ branch | 25 |
| B-70 | (B-70) | H₅C₂O—P(=O)(OH)—OCH₂CH₂— | —C₆H₅ | 65 | —CH₂—CH(COOCH₃)— | 10 | —(CH₂)₂COOCH₂C(CH₃)₂—CH₂— | 25 |
| B-71 | (B-71) | maleic anhydride—S(CH₂)OCO(CH₂)₂— | —CH₂—C₆H₅ | 80 | — | | —(CH₂)₃COO(CH₂)₆— | 20 |

SYNTHESIS EXAMPLES B-72 TO B-77

Synthesis of Resins (B-72) to (B-77)

A mixture of the monomer and macromonomer each corresponding to the repeating unit shown in Table 9 below and 150 g of toluene was heated to 80° C. under a nitrogen gas stream. After adding 0.8 g of ABCC to the reaction mixture, the resulting mixture was stirred for 5 hours. Then, 0.5 g of ABCC was added thereto, followed by stirring for 3 hours and thereafter 0.5 g of ABCC was added thereto, the mixture was heated to 90° C., followed by stirring for 4 hours. The copolymers thus-obtained had an Mw of from $8 \times 10^4$ to $1.2 \times 10^5$.

COMPARATIVE EXAMPLE A

An electrophotographic light-sensitive material was produced in the same manner as described in Example 1, except for using 34 g of Resin (R-1) having the structure shown below in place of 34 g of Resin (B-1).

Resin (R-1):

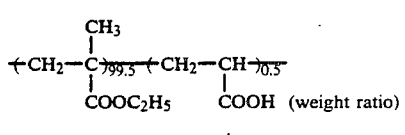

Mw: $9.8 \times 10^4$

TABLE 9

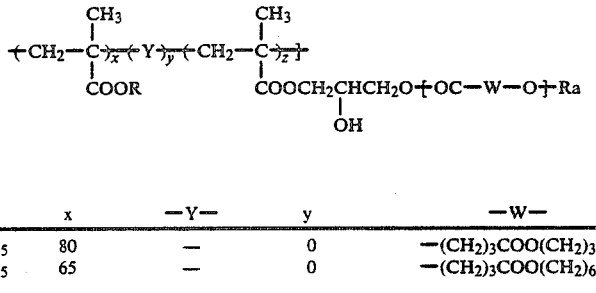

| Synthesis Example No. | Resin (B) | —R— | x | —Y— | y | —W— | z | Ra |
|---|---|---|---|---|---|---|---|---|
| B-72 | (B-72) | —C$_2$H$_5$ | 80 | — | 0 | —(CH$_2$)$_3$COO(CH$_2$)$_3$— | 20 | —CH$_3$ |
| B-73 | (B-73) | —C$_2$H$_5$ | 65 | — | 0 | —(CH$_2$)$_3$COO(CH$_2$)$_6$— | 35 | H |
| B-74 | (B-74) | —CH$_3$ | 60 | —CH$_2$—CH—<br>\|<br>COOCH$_3$ | 15 | —(CH$_2$)$_3$COO(CH$_2$)$_4$— | 25 | H |
| B-75 | (B-75) | —C$_3$H$_7$ | 60 | —CH$_2$—CH—<br>\|<br>C$_6$H$_5$ | 15 | —CH$_2$—C$_6$H$_4$—CH$_2$COO(CH$_2$)$_6$— | 25 | H |
| B-76 | (B-76) | —CH$_3$ | 30 | —CH$_2$—C(CH$_3$)—<br>\|<br>COOC$_2$H$_5$ | 40 | —(CH$_2$)$_3$COOCH$_2$CH(CH$_3$)—CH$_2$— | 30 | H |
| B-77 | (B-77) | —CH$_2$C$_6$H$_5$ | 80 | — | 0 | —CH=CH—COO(CH$_2$)$_2$— | 20 | —COCH$_3$ |

EXAMPLE 1

A mixture of 6 g (solid basis, hereinafter the same) of Resin (A-1), 34 g (solid basis, hereinafter the same) of Resin (B 1), 200 g of zinc oxide, 0.018 g of Cyanine Dye (I) shown below, 0.10 g of phthalic anhydride, and 300 g of toluene was dispersed in a ball mill for 3 hours to prepare a coating composition for a light-sensitive layer. The coating composition was coated on paper subjected to electrically conductive treatment, with a wire bar to a dry coverage of 20 g/m$^2$, followed by drying at 110° C. for 30 seconds. The coated material was allowed to stand in a dark place at 20° C. and 65% RH (relative humidity) for 24 hours to prepare an electrophotographic light-sensitive material.

COMPARATIVE EXAMPLE B

An electrophotographic light-sensitive material was prepared in the same manner as described in Example 1, except for using 34 g of poly(ethyl methacrylate) (Resin (R-2)) having an Mw of $2.4 \times 10^5$ in place of 34 g of Resin (B-1).

Each of the light-sensitive materials obtained in Example 1 and Comparative Examples A and B was evaluated for film properties in terms of surface smoothness and mechanical strength; electrostatic characteristics; image forming performance; image forming performance under environmental conditions of 30° C. and Cyanine Dye (I):

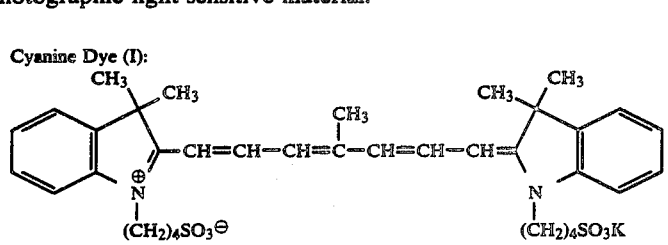

80% RH; oil-desensitivity when used as an offset master plate precursor (expressed in terms of contact angle of the layer with water after oil-desensitization treatment); and printing suitability (expressed in terms of background stain and printing durability) according to the following test methods. The results obtained are shown in Table 10 below.

1) Smoothness of Photoconductive Layer:

The smoothness (sec/cc) was measured using a Beck's smoothness tester manufactured by Kumagaya Riko K. K. under an air volume condition of 1 cc.

2) Mechanical Strength of Photoconductive Layer

The surface of the light-sensitive material was repeatedly (1000 times) rubbed with emery paper (#1000) under a load of 50 g/cm$^2$ using a Heidon 14 Model surface testing machine (manufactured by Shinto Kagaku K. K.). After dusting, the abrasion loss of the photoconductive layer was measured to obtain film retention (%).

3) Electrostatic Characteristics

The sample was charged with a corona discharge to a voltage of $-6$ kV for 20 seconds in a dark room at 20° C. and 65% RH using a paper analyzer ("Paper Analyzer SP-428" manufactured by Kawaguchi Denki K. K.). Ten seconds after the corona discharge, the surface potential $V_{10}$ was measured. The sample was allowed to stand in the dark for an additional 180 seconds, and the potential $V_{190}$ was measured. The dark decay retention (DRR; %), i.e., percent retention of potential after dark decay for 180 seconds, was calculated from the following equation:

$$DRR\ (\%) = (V_{190}/V_{10}) \times 100$$

Separately, the sample was charged to $-500$ V with a corona discharge and then exposed to monochromatic light having a wavelength of 785 nm, and the time required for decay of the surface potential $V_{10}$ to one tenth was measured to obtain an exposure $E_{1/10}$ (erg/cm$^2$).

Further, the sample was charged to $-500$ V with a corona discharge in the same manner as described for the measurement of $E_{1/10}$, then exposed to monochromatic light having a wavelength of 785 nm, and the time required for decay of the surface potential $V_{10}$ to one-hundredth was measured to obtain an exposure $E_{1/100}$ (erg/cm$^2$).

The measurements were conducted under conditions of 20° C. and 65% RH (hereinafter referred to as Condition I) or 30° C. and 80% RH (hereinafter referred to as Condition II).

4) Image Forming Performance

After the samples were allowed to stand for one day under Condition I or II, each sample was charged to $-5$ kV and exposed to light emitted from a gallium-aluminum-arsenic semiconductor laser (oscillation wavelength: 780 nm; output: 2.8 mW) at an exposure amount of 50 erg/cm$^2$ (on the surface of the photoconductive layer) at a pitch of 25 μm and a scanning speed of 300 m/sec. The thus formed electrostatic latent image was developed with a liquid developer ("ELP-T" produced by Fuji Photo Film Co., Ltd.), followed by fixing. The duplicated image was visually evaluated for fog and image quality. The original used for the duplication was composed of letters by a word processor and a cutting of letters on straw paper pasted up thereon.

5) Contact Angle With Water

The sample was passed once through an etching processor using an oil-desensitizing solution ("ELP-EX" produced by Fuji Photo Film Co., Ltd.) to render the surface of the photoconductive layer oil-desensitive. On the thus oil-desensitized surface was placed a drop of 2 μl of distilled water, and the contact angle formed between the surface and water was measured using a goniometer.

6) Printing Durability

The sample was processed in the same manner as described in 4) above to form toner images, and the surface of the photoconductive layer was subjected to oil-desensitization treatment under the same conditions as described in 5) above. The resulting lithographic printing plate was mounted on an offset printing machine ("Oliver Model 52", manufactured by Sakurai Seisakusho K. K.), and printing was carried out. The number of prints obtained until background stains in the non-image areas appeared or the quality of the image areas was deteriorated was taken as the printing durability. The larger the number of the prints, the higher the printing durability.

TABLE 10

| | Example 1 | Comparative Example A | Comparative Example B |
|---|---|---|---|
| Surface Smoothness (sec/cc) | 130 | 95 | 140 |
| Film Strength (%) | 95 | 88 | 92 |
| Electrostatic Characteristics: | | | |
| $V_{10}(-V)$: | | | |
| Condition I | 560 | 555 | 565 |
| Condition II | 555 | 500 | 560 |
| DRR (%): | | | |
| Condition I | 85 | 80 | 86 |
| Condition II | 83 | 75 | 84 |
| $E_{1/10}$ (erg/cm$^2$): | | | |
| Condition I | 28 | 30 | 27 |
| Condition II | 30 | 33 | 30 |
| $E_{1/100}$ (erg/cm$^2$): | | | |
| Condition I | 47 | 70 | 65 |
| Condition II | 50 | 94 | 80 |
| Image-Forming Performance: | | | |
| Condition I | Good | No good (reduction of DM, slight background fog) | Good |
| Condition II | Good | Poor (background fog) | Poor (background fog) |
| Contact Angle With Water (°) | 10 or less | 10 to 25 | 10° or less |
| Printing Durability: | 10,000 | 5,000 | 8,000 |

As can be seen from the results shown in Table 10, the light-sensitive material according to the present invention had good surface smoothness and film strength of the photoconductive layer and good electrostatic characteristics. When it was used as an offset master plate precursor, the duplicated image obtained was clear and free from background stains in the non-image area. While the reason therefor has not been proven conclusively, these results appear to be due to sufficient adsorption of the binder resin onto the photoconductive substance and sufficient covering of the surface of the particles with the binder resin. For the same reason, oil-desensitization of the offset master plate precursor with an oil-desensitizing solution was sufficient to render the non-image areas satisfactorily hydrophilic, as shown by a small contact angle of 10° or less with water. On practical printing using the resulting master plate, no background stains were observed in the prints.

On the other hand, the sample of Comparative Example A had a large value of $E_{1/100}$. The larger this value, the higher the tendency of the formation of background stains in the non-image areas. Further, the sample had reduced $V_{10}$ and DRR under the conditions of high temperature and high humidity. Moreover, when it was used as an offset master plate precursor, the contact angle with water after the oil-desensitization treatment widely varied one by one, and on practical printing background stains was observed from the start of printing in some cases. The background stains became severe from the 5,000 the print even when no background stain was observed at the beginning of printing.

The sample of Comparative Example B had almost satisfactory values on the electrostatic characteristics of $V_{10}$, DRR and $E_{1/10}$ under the normal condition. However, with respect to $E_{1/100}$, the value obtained was more than twice that of the light-sensitive material according to the present invention.

The value of $E_{1/100}$ indicated an electrical potential remaining in the non-image areas after exposure at the practice of image formation. The smaller this value, the less the background stains in the non-image areas. More specifically, it is requested that the remaining potential is decreased to $-10V$ or less Therefore, an amount of exposure necessary to make the remaining potential below $-10V$ is an important factor. In the scanning exposure system using a semiconductor laser beam, it is quite important to make the remaining potential below $-10$ V by a small exposure amount in view of a design for an optical system of a duplicator (such as cost of the device, and accuracy of the optical system).

From all these considerations, it is thus clear that an electrophotographic light-sensitive material satisfying both the requirements of electrostatic characteristics and printing suitability can be obtained only using the binder resin according to the present invention.

EXAMPLES 2 TO 20

An electrophotographic light-sensitive material was prepared in the same manner as described in Example 1, except for replacing Resin (A-1) and Resin (B-1) with each of Resins (A) and (B) shown in Table 11 below, respectively.

The performance properties of the resulting light sensitive materials were evaluated in the same manner as described in Example 1. The results obtained are shown in Table 11 below. The electrostatic characteristics in Table 11 are those determined under Condition II (30° C. and 80% RH).

TABLE 11

| Example No. | Resin (A) | Resin (B) | $V_{10}$ (−V) | DRR (%) | $E_{1/10}$ (erg/cm$_2$) | $E_{1/100}$ (erg/cm$_2$) |
|---|---|---|---|---|---|---|
| 2 | A-3 | B-2 | 550 | 83 | 28 | 46 |
| 3 | A-4 | B-3 | 650 | 86 | 18 | 35 |
| 4 | A-5 | B-4 | 640 | 86 | 20 | 34 |
| 5 | A-8 | B-5 | 655 | 87 | 17 | 32 |
| 6 | A-9 | B-5 | 545 | 83 | 22 | 36 |
| 7 | A-10 | B-16 | 540 | 83 | 21 | 35 |
| 8 | A-11 | B-4 | 555 | 87 | 19 | 33 |
| 9 | A-12 | B-14 | 550 | 86 | 20 | 34 |
| 10 | A-13 | B-15 | 545 | 82 | 25 | 43 |
| 11 | A-14 | B-18 | 540 | 83 | 29 | 45+ |
| 12 | A-16 | B-11 | 550 | 82 | 29 | 46 |
| 13 | A-18 | B-21 | 640 | 87 | 19 | 35 |
| 14 | A-19 | B-23 | 650 | 88 | 18 | 31 |
| 15 | A-20 | B-24 | 565 | 84 | 22 | 36 |
| 16 | A-21 | B-26 | 630 | 87 | 21 | 34 |
| 17 | A-22 | B-29 | 565 | 84 | 23 | 37 |
| 18 | A-23 | B-34 | 550 | 83 | 22 | 34 |
| 19 | A-24 | B-35 | 570 | 86 | 20 | 33 |
| 20 | A-25 | B-39 | 565 | 85 | 21 | 35 |

Further, when these electrophotographic light-sensitive materials were employed as offset master plate precursors under the same printing condition as described in Example 1, more than 10,000 good prints were obtained respectively.

It can be seen from the results described above that each of the light-sensitive materials according to the present invention was satisfactory in all aspects of photoconductive layer surface smoothness, film strength, electrostatic characteristics, and printing suitability.

Moreover, it can be seen that the electrostatic characteristics are further improved by the use of the Resin (A') and the electrostatic characteristics and printing suitability are further improved by the use of the Resin (B').

EXAMPLES 21 TO 28

An electrophotographic light-sensitive material was prepared in the same manner as described in Example 1, except for replacing 6 g of Resin (A-1) with 6.5 g each of Resins (A) shown in Table 12 below, replacing 34 g of Resin (B-1) with 33.5 g each of Resins (B) shown in Table 12 below, and replacing 0.02 g of Cyanine Dye (I) with 0.018 g of Cyanine Dye (II) shown below.

Cyanine Dye (II):

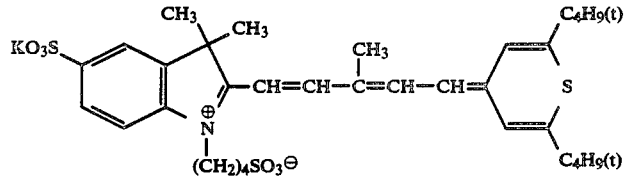

TABLE 12

| Example No. | Resin (A) | Resin (B) |
|---|---|---|
| 21 | A-25 | B-11 |
| 22 | A-16 | B-12 |
| 23 | A-17 | B-13 |
| 24 | A-4 | B-14 |
| 25 | A-3 | B-31 |
| 26 | A-12 | B-32 |
| 27 | A-10 | B-33 |
| 28 | A-10 | B-35 |

As the results of the evaluation of each sample in the manner as described above, it can be seen that each of the light-sensitive materials according to the present invention is excellent in charging properties, dark charge retention, and photosensitivity, and provides a clear duplicated image free from background fog even when processed under severe conditions of high temperature and high humidity (30° C and 80% RH). Further, when these materials were employed as offset master plate precursors, more than 10,000 prints of a clear image free from background fog were obtained respectively.

EXAMPLE 29

A mixture of 6.5 g of Resin (A-1), 33.5 g of Resin (B-9), 200 g of zinc oxide, 0.03 g of uranine, 0.075 g of Rose Bengale, 0.045 g of Bromophenol Blue, 0.1 g of phthalic anhydride, and 240 g of toluene was dispersed in a ball mill for 3 hours to prepare a coating composition for a light-sensitive layer. The coating composition was coated on paper subjected to electrically conductive treatment, with a wire bar to a dry coverage of 20 g/m$^2$, followed by drying at 110° C. for 30 seconds. The coated material was allowed to stand in a dark place at 20° C. and 65% RH (relative humidity) for 24 hours to prepare an electrophotographic light-sensitive material.

COMPARATIVE EXAMPLE C

An electrophotographic light-sensitive material was prepared in the same manner as in Example 29, except for using 33.5 g of Resin (R-1) described above in place of 33.5 g of Resin (B-9).

COMPARATIVE EXAMPLE D

An electrophotographic light-sensitive material was produced in the same manner as in Example 29, except for using 33.5 g of Resin (R-2) described above in place of 33.4 g of Resin (B-9).

Each of the light-sensitive materials obtained in Example 29 and Comparative Examples C and D was evaluated for film properties in terms of surface smoothness and mechanical strength; electrostatic characteristics; image forming performance; image forming performance under environmental conditions of 30° C. and 80% RH; oil-desensitivity when used as an offset master plate precursor (expressed in terms of contact angle of the layer with water after oil-desensitization treatment); and printing suitability (expressed in terms of background stain and printing durability) according to the test methods as described in Example 1, except that the electrostatic characteristics and image forming performance were evaluated according to the following test methods.

7) Electrostatic Characteristics

The sample was charged with a corona discharge to a voltage of $-6$ kV for 20 seconds in a dark room at 20° C. and 65% RH using a paper analyzer "Paper Analyzer SP-428" manufactured by Kawaguchi Denki K. K. Ten seconds after the corona discharge, the surface potential $V_{10}$ was measured. The sample was allowed to Stand in the dark for an additional 60 seconds, and the potential $V_{70}$ was measured. The dark decay retention (DRR; %), i.e., percent retention of potential after dark decay for 60 seconds, was calculated from the following equation:

$$DRR\ (\%) = (V_{70}/V_{10}) \times 100$$

Separately, the sample was charged to $-500$ V with a corona discharge and then exposed to visible light of 2.0 lux, and the time required for decay of the surface potential $V_{10}$ to one-tenth was measured to obtain an exposure $E_{1/10}$ (lux·sec).

Further, the sample was charged to $-500$ V with a corona discharge in the same manner as described for the measurement of $E_{1/10}$, then exposed to visible light of 2.0 lux, and the time required for decay of the surface potential $V_{10}$ to one-hundredth was measured to obtain an exposure $E_{1/100}$ (lux·sec).

The measurements were conducted under conditions of 20° C. and 65% RH (hereinafter referred to as Condition I) or 30° C. and 80% RH (hereinafter referred to as Condition II).

8) Image Forming Performance

After the samples were allowed to stand for one day under Condition I or II, each sample was processed using an automatic plate making machine "ELP 404V" (manufactured by Fuji Photo Film Co., Ltd.) using a toner "ELP-T" (manufactured by Fuji Photo Film Co., Ltd.) under condition I or II. The duplicated image thus obtained was visually evaluated for fog and image quality. the original used for the duplicated image was composed of letters by a word processor and a cutting of letters on straw paper pasted up thereon.

The results obtained are shown in Table 13 below.

TABLE 13

|  | Example 29 | Comparative Example C | Comparative Example D |
|---|---|---|---|
| Surface Smoothness (sec/cc) | 135 | 90 | 145 |
| Film Strength (%) | 96 | 87 | 92 |
| Electrostatic Characteristics: | | | |
| $V_{10}\ (-V)$: | | | |
| Condition I | 565 | 555 | 565 |
| Condition II | 555 | 505 | 560 |
| DRR (%): | | | |
| Condition I | 93 | 85 | 88 |
| Condition II | 91 | 80 | 83 |
| $E_{1/10}$ (erg/cm$^2$): | | | |
| Condition I | 11.5 | 13 | 13 |
| Condition II | 12.0 | 14 | 15 |
| $E_{1/100}$ (erg/cm$^2$): | | | |
| Condition I | 28 | 42 | 40 |
| Condition II | 33 | 53 | 55 |
| Image-Forming Performance: | | | |
| Condition I | Good | Good | Good |
| Condition II | Good | Poor (background fog) | Poor (background fog) |
| Contact Angle With Water (°) | 10° or less | 10 to 25 | 10° or less |
| Printing Durability: | 10,000 | 4,000 | 8,000 |

As can be seen from the results shown in Table 13, the light-sensitive material according to the present invention had sufficient surface smoothness and film strength of the photoconductive layer, and good electrostatic characteristics which were hardly changed depending on the fluctuation of environmental conditions. The duplicated image obtained was clear and free from background stains.

On the contrary, the sample of comparative Example C using a known random type copolymer exhibited the severe degradation of electrostatic characteristics, particularly, under the conditions of high temperature and high humidity. Further, the duplicated image was on the level insufficient for practical use.

The sample of Comparative Example D was inferior to the sample according to the present invention in its electrostatic characteristics, particularly, in the fluctuations of $E_{1/100}$ value due to the change of environmental conditions. In the duplicated image of the original composed of letters by a word processor and a cutting of letters on straw paper, scraches of fine lines and background stains were observed under the conditions of high temperature and high humidity.

Furthermore, when each of the samples was used as an offset master plate precursor, the sample of Comparative Example C exhibited background stains on the print from the start of printing, and the sample of Comparative Example D provided up to 7,500 prints of a clear image, while the sample of Example 29 according to the present invention could provide more than 10,000 prints of a clear image free from background stains.

From all these considerations, it is clear that only the electrophotographic light-sensitive material according to the present invention is excellent in view of bath smoothness and mechanical strength of photoconductive layer, electrostatic characteristics and printing suitability.

EXAMPLES 30 TO 35

An electrophotographic light-sensitive material was prepared in the same manner as described in Example 29, except for replacing Resin (A-1) and Resin (B-9) with each of 6.0 g of Resin (A) and 34.0 g of Resin (B) shown in Table 14 below, respectively.

TABLE 14

| Example No. | Resin (A) | Resin (B) |
|---|---|---|
| 30 | A-2 | B-14 |
| 31 | A-7 | B-19 |
| 32 | A-8 | B-23 |
| 33 | A-14 | B-28 |
| 34 | A-26 | B-35 |
| 35 | A-27 | B-39 |

As the results of the evaluation of each sample in the manner as described above, it can be seen that each of the light-sensitive materials according to the present invention is excellent in charging properties, dark charge retention, and photosensitivity, and provides a clear duplicated image free from background fog even when processed under severe conditions of high temperature and high humidity (30° C. and 80% RH). Further, when these materials were employed as offset master plate precursors, more than 10,000 prints of a clear image free from background fog were obtained respectively.

EXAMPLE 36

A mixture of 6 g of Resin (A-4), 34 g of Resin (B-43), 200 g of zinc oxide, 0.018 g of Cyanine Dye (I) shown below, 0.10 g of phthalic anhydride, and 300 g of toluene was dispersed in a ball mill for 2 hours to prepare a coating composition for a light-sensitive layer. The resulting coating composition was coated on paper subjected to electrically conductive treatment, with a wire bar to a dry coverage of 20 g/m², followed by drying at 110° C. for 30 seconds. The coated material was then allowed to stand in a dark place at 20° C and RH for 24 hours to prepare an electrophotographic light-sensitive material.

Cyanine Dye (I):

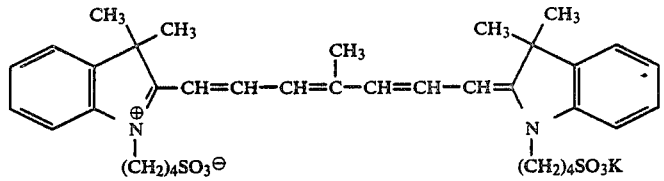

COMPARATIVE EXAMPLE E

An electrophotographic light-sensitive material was prepared in the same manner as described in Example 36, except for using 40 g of Resin (P-1) having the structure shown below in place of 6 g of Resin (A-4) and 34 g of Resin (B-43).

Resin (P-1):

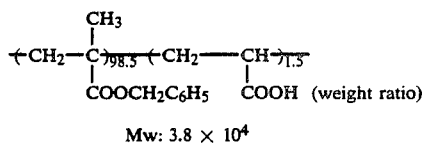

Mw: $3.8 \times 10^4$

COMPARATIVE EXAMPLE F

An electrophotographic light-sensitive material was prepared in the same manner as described in Example 36, except for using 6 g of Resin (P-2) having the structure shown below and 34 g of poly(ethyl methacrylate) having an Mw of $2.4 \times 10^5$ in place of Resin (A-4) and Resin (B-43).

Resin (P-2):

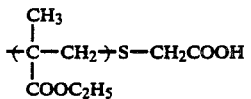

Mw: $8 \times 10^3$

Each of the light-sensitive materials obtained in Example 36 and Comparative Examples E and F was evaluated for film properties in terms of surface smoothness and mechanical strength; electrostatic characteristics; image forming performance; image forming performance under environmental conditions of 30° C. and 80% RH; oil-desensitivity when used as an offset master plate precursor (expressed in terms of contact angle of the layer with water after oil-desensitization treatment); and printing suitability (expressed in terms of background stain and printing durability) according to the following test methods. The results obtained are shown in Table 15 below.

1) Smoothness of Photoconductive Layer

The smoothness (sec/cc) was measured using a Beck's smoothness tester manufactured by Kumagaya Riko K. K. under an air volume condition of 1 cc.

2) Mechanical Strength of Photoconductive Layer

The surface of the light-sensitive material was repeatedly (1000 times) rubbed with emery paper (#1000) under a load of 55 g/cm$^2$ using a Heidon 14 Model surface testing machine (manufactured by Shinto Kagaku K. K.). After dusting, the abrasion loss of the photoconductive layer was measured to obtain film retention (%).

3) Electrostatic Characteristics

The sample was charged with a corona discharge to a voltage of $-6$ kV for 20 seconds in a dark room at 20° C. and 65% RH using a paper analyzer ("Paper Analyzer SP-428" manufactured by Kawaguchi Denki K. K.). Ten seconds after the corona discharge, the surface potential $V_{10}$ was measured. The sample was allowed to stand in the dark for an additional 180 seconds, and the potential $V_{190}$ was measured. The dark decay retention (DRR; %), i.e., percent retention of potential after dark decay for 180 seconds, was calculated from the following equation:

$$DRR\ (\%) = (V_{190}/V_{10}) \times 100$$

Separately, the sample was charged to $-500$ V with a corona discharge and then exposed to monochromatic light having a wavelength of 785 nm, and the time required for decay of the surface potential $V_{10}$ to one-tenth was measured to obtain an exposure $E_{1/10}$ (erg/Cm$^2$).

Further, the sample was charged to $-500$ V with a corona discharge in the same manner as described for the measurement of $E_{1/10}$, then exposed to monochromatic light having a wavelength of 785 nm, and the time required for decay of the surface potential $V_{10}$ to one-hundredth was measured to obtain an exposure $E_{1/100}$ (erg/cm$^2$).

The measurements were conducted under conditions of 20° C. and 65% RH (hereinafter referred to as Condition I) or 30° C. and 80% RH (hereinafter referred to as Condition II).

4) Image Forming Performance

After the samples were allowed to stand for one day under Condition I or II, each sample was charged to $-5$ kV and exposed to light emitted from a gallium-aluminum-arsenic semiconductor laser (oscillation wavelength: 780 nm; output: 2.8 mW) at an exposure amount of 50 erg/cm$^2$ (on the surface of the photoconductive layer) at a pitch of 25 μm and a scanning speed of 300 m/sec. The thus formed electrostatic latent image was developed with a liquid developer ("ELP-T" produced by Fuji Photo Film Co., Ltd.), followed by fixing. The duplicated image was visually evaluated for fog and image quality. The original used for the duplication was composed of letters by a word processor and a cutting of letters on straw paper pasted up thereon.

5) Contact Angle With Water

The sample was passed once through an etching processor using an oil-desensitizing solution ("ELP-EX" produced by Fuji Photo Film Co., Ltd.) to render the surface of the photoconductive layer oil-desensitive. On the thus oil-desensitized surface was placed a drop of 2 μl of distilled water, and the contact angle formed between the surface and water was measured using a goniometer.

6) Printing Durability

The sample was processed in the same manner as described in 4) above to form toner images, and the surface of the photoconductive layer was subjected to oil-desensitization treatment under the same conditions as described in 5) above. The resulting lithographic printing plate wa mounted on an offset printing machine ("Oliver Model 52", manufactured by Sakurai Seisakusho K. K.), and printing was carried out. The number of prints obtained until background stains in the non-image areas appeared or the quality of the image areas was deteriorated was taken as the printing durability. The larger the number of the prints, the higher the printing durability.

TABLE 15

|  | Example | Comparative Example | |
| --- | --- | --- | --- |
|  | 36 | E | F |
| Surface Smoothness (sec/cc) | 95 | 90 | 92 |
| Film Strength (%) | 97 | 92 | 86 |
| Electrostatic Characteristics: | | | |
| $V_{10}$ (−V): | | | |
| Condition I | 610 | 520 | 510 |
| Condition II | 605 | 430 | 480 |
| DRR (%): | | | |
| Condition I | 86 | 61 | 79 |
| Condition II | 84 | 38 | 76 |
| $E_{1/10}$ (erg/cm$^2$): | | | |
| Condition I | 17 | 100 | 31 |
| Condition II | 19 | 200 or more | 35 |
| $E_{1/100}$ (erg/cm$^2$): | | | |
| Condition I | 33 | 200 or more | 100 |
| Condition II | 37 | 200 or more | 115 |
| Image-Forming Performance: | | | |
| Condition I | Good | Poor (reduced $D_m$, scratches of fine lines or letters) | No good (slight background fog) |
| Condition II | Good | Very poor (indiscriminative images from background fog) | Poor (scratches of fine lines or letters) |
| Contact Angle With Water (°) | 10 or less | 15 to 30 (widely scattered) | 10 |
| Printing Durability: | 10,000 | Background | 8,000 |

TABLE 15-continued

| Example | Comparative Example | |
|---|---|---|
| 36 | E | F |
| or more | stains from the start of printing | |

As can be seen from the results shown in Table 15, the light-sensitive material according to the present invention had good surface smoothness and film strength of the photoconductive layer and good electrostatic characteristics. When it was used as an offset master plate precursor, the duplicated image was clear and free from background stains in the non-image area. While the reason therefor has not been proven conclusively, these results appear to be due to sufficient adsorption of the binder resin onto the photoconductive substance and sufficient covering of the surface of the particles with the binder resin. For the same reason, oil-desensitization of the offset master plate precursor with an oil-desensitizing solution was sufficient to render the non-image areas satisfactorily hydrophilic, as shown by a small contact angle of 10° or less with water. On practical printing using the resulting master plate, no background stains were observed in the prints.

The sample of Comparative Example E had a reduced DRR and an increased $E_{1/10}$ and exhibited insufficient photoconductivity under the conditions of high temperature and high humidity.

The sample of Comparative Example F had almost satisfactory values on the electrostatic characteristics of $V_{10}$, DRR and $E_{1/10}$ under the normal condition. However, with respect to $E_{1/100}$, the value obtained was more than twice that of the light-sensitive material according to the present invention. Further, under the conditions of high temperature and high humidity, the tendency of degradation of DRR and $E_{1/10}$ was observed. Moreover, the $E_{1/100}$ value was further increased under such conditions.

The value of $E_{1/100}$ indicated an electrical potential remaining in the non-image areas after exposure at the practice of image formation. The smaller this value, the less the background stains in the non-image areas. More specifically, it is requested that the remaining potential is decreased to $-10V$ or less. Therefore, an amount of exposure necessary to make the remaining potential below $-10$ V is an important factor. In the scanning exposure system using a semiconductor laser beam, it is quite important to make the remaining potential below $-10$ V by a small exposure amount in view of a design for an optical system of a duplicator (such as cost of the device, and accuracy of the optical system).

When the sample of Comparative Example F was actually imagewise exposed by a device of a small amount of exposure, the occurrence of background fog in the non-image areas was observed.

Furthermore, when it was used as an offset master plate precursor, the printing durability was up to 8,000 prints under the printing conditions under which the sample according to the present invention provided more than 10,000 good prints.

From all these considerations, it is thus clear that an electrophotographic light-sensitive material satisfying both the requirements of electrostatic characteristics and printing suitability can be obtained only using the binder resin according to the present invention.

EXAMPLES 37 TO 52

An electrophotographic light-sensitive material was prepared in the same manner as described in Example 36, except for replacing Resin (A-4) and Resin (B 43) with each of Resins (A) and Resins (B) shown in Table 16 below, respectively.

The performance properties of the resulting light-sensitive materials were evaluated in the same manner as described in Example 36. The results obtained are shown in Table 16 below. The electrostatic characteristics in Table 16 are those determined under Condition II (30° C and 80% RH).

TABLE 16

| Example No. | Resin (A) | Resin (B) | $V_{10}$ (−V) | DRR (%) | $E_{1/10}$ (erg/cm$_2$) | $E_{1/10}$ (erg/cm$_2$) |
|---|---|---|---|---|---|---|
| 37 | A-3 | B-44 | 560 | 82 | 21 | 40 |
| 38 | A-5 | B-45 | 600 | 85 | 19 | 36 |
| 39 | A-8 | B-46 | 605 | 85 | 18 | 35 |
| 40 | A-9 | B-47 | 565 | 85 | 18 | 36 |
| 41 | A-10 | B-48 | 555 | 83 | 20 | 37 |
| 42 | A-11 | B-49 | 560 | 84 | 20 | 40 |
| 43 | A-12 | B-50 | 550 | 80 | 21 | 43 |
| 44 | A-13 | B-51 | 550 | 80 | 22 | 44 |
| 45 | A-17 | B-52 | 550 | 82 | 20 | 40 |
| 46 | A-18 | B-60 | 590 | 83 | 17 | 34 |
| 47 | A-19 | B-62 | 600 | 84 | 18 | 35 |
| 48 | A-20 | B-63 | 580 | 80 | 22 | 43 |
| 49 | A-21 | B-64 | 590 | 82 | 20 | 40 |
| 50 | A-22 | B-66 | 550 | 79 | 23 | 45 |
| 51 | A-23 | B-68 | 560 | 81 | 21 | 41 |
| 52 | A-24 | B-72 | 585 | 83 | 19 | 35 |

Further, when these electrophotographic light-sensitive materials were employed as offset master plate precursors under the same printing condition as described in Example 36, more than 10,000 good prints were obtained respectively.

It can be seen from the results described above that each of the light-sensitive materials according to the present invention was satisfactory in all aspects of surface smoothness and film strength of photoconductive layer, electrostatic characteristics, and printing suitability.

Further, it can be seen that the electrostatic characteristics are further improved by the use of the resin (A') and the electrostatic characteristics and printing suitability are further improved by the use of the resin (B').

EXAMPLES 53 TO 70

An electrophotographic light-sensitive material was prepared in the same manner as described in Example 36, except for replacing 6 g of Resin (A-4) with 6.5 g each of Resins (A) shown in Table 17 below, replacing 34 g of Resin (B-43) with 33.5 g each of Resins (B) shown in Table 17 below, and replacing 0.02 g of Cyanine Dye (I) with 0.018 g of Cyanine dye (II) shown below.

Cyanine Dye (II):

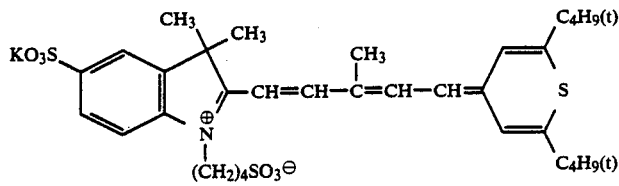

TABLE 17

| Example No. | Resin (A) | Resin (B) |
|---|---|---|
| 53 | A-25 | B-53 |
| 54 | A-16 | B-54 |
| 55 | A-17 | B-55 |
| 56 | A-4 | B-56 |
| 57 | A-3 | B-73 |
| 58 | A-12 | B-74 |
| 59 | A-10 | B-75 |
| 60 | A-10 | B-77 |

As the results of the evaluation of each sample in the manner as described in Example 36, it can be seen that each of the light-sensitive materials according to the present invention is excellent in charging properties, dark charge retention, and photosensitivity, and provides a clear duplicated image free from background fog even when processed under severe conditions of high temperature and high humidity (30° C. and 80% RH). Further, when these materials were employed as offset master plate precursors, more than 10,000 prints of a clear image free from background fog were obtained respectively.

EXAMPLE 61

A mixture of 6.5 g of Resin (A-1), 33.5 g of Resin (B-51), 200 g of zinc oxide, 0.03 g of uranine, 0.075 g of Rose Bengale, 0.045 g of Bromophenol Blue, 0.1 g of phthalic anhydride, and 240 g of toluene was dispersed in a ball mill for 2 hours to prepare a coating composition for a light-sensitive layer. The resulting coating composition was coated on paper subjected to electrically conductive treatment, with a wire bar to a dry coverage of 20 g/m², followed by drying at 110° C. for 30 seconds. The coated material was then allowed to stand in a dark plate at 20° C. and 65% RH for 24 hours to prepare an electrophotographic light-sensitive material.

COMPARATIVE EXAMPLE G

An electrophotographic light-sensitive material was prepared in the same manner as in Example 61, except for using 40 g of Resin (P-1) described hereinbefore in place of Resin (A-1) and Resin (B-51).

Each of the light-sensitive materials obtained in Example 61 and Comparative Example G was evaluated for film properties in terms of surface smoothness and mechanical strength; electrostatic characteristics; image forming performance; image forming performance under environmental conditions of 30° C. and 80% RH; oil-desensitivity when used as an offset master plate precursor (expressed in terms of contact angle of the layer with water after oil-desensitization treatment); and printing suitability (expressed in terms of background stain and printing durability) according to the test methods as described in Example 36, except that the electrostatic characteristics and image forming performance were evaluated according to the following test methods described in Example 29.

The results obtained are shown in Table 18 below.

TABLE 18

| | Example 61 | Comparative Example G |
|---|---|---|
| Surface Smoothness (sec/cc) | 98 | 91 |
| Film Strength (%) | 96 | 90 |
| Electrostatic Characteristics: | | |
| $V_{10}$ (−V): | | |
| Condition I | 560 | 545 |
| Condition II | 550 | 480 |
| DRR (%): | | |
| Condition I | 92 | |
| Condition II | 91 | 55 |
| $E_{1/10}$ (lux · sec): | | |
| Condition I | 9.5 | 18 |
| Condition II | 9.4 | 16 |
| $E_{1/100}$ (lux · sec): | | |
| Condition I | 15 | 76 |
| Condition II | 14 | 65 |
| Image-Forming Performance: | | |
| Condition I | Good | No good (slight background fog) |
| Condition II | Good | Very poor (reduced $D_m$, scratches of letters) |
| Contact Angle With Water (°) | 10 or less | 15 to 30 (widely scattered) |
| Printing Durability: | 10,000 or more | Background stains from the start of printing |

As can be seen from the results shown in Table 18, the light-sensitive material according to the present invention had sufficient surface smoothness and film strength of the photoconductive layer, and good electrostatic characteristics which were hardly changed depending on the fluctuation of environmental conditions. The duplicated image obtained was clear and free from background stains.

On the contrary, the sample of comparative Example G using a known random type copolymer exhibited the severe degradation of electrostatic characteristics, particularly, under the conditions of high temperature and high humidity. Further, the duplicated image was on the level insufficient for practical use.

Furthermore, when each of the samples was used as an offset master plate precursor, the sample of Comparative Example G exhibited background stains on the print from the start of printing, while the sample of Example 61 according to the present invention could provide more than 10,000 prints of a clear image free from background stains.

From all these considerations, it is clear that only the electrophotographic light-sensitive material according to the present invention is excellent in view of both smoothness and mechanical strength of photoconductive layer, electrostatic characteristics and printing suitability.

EXAMPLES 62 TO 67

An electrophotographic light-sensitive material was prepared in the same manner as described in Example 61, except for replacing 6.5 g of Resin (A-1) with 6 g each of Resins (A) shown in Table 19 below, replacing 33.5 g of Resin (B-51) with 34 g each of Resins (B) shown in Table 19 below.

TABLE 19

| Example No. | Resin (A) | Resin (B) |
|---|---|---|
| 62 | A-2 | B-56 |
| 63 | A-7 | B-61 |
| 64 | A-8 | B-63 |
| 65 | A-14 | B-65 |
| 66 | A-26 | B-69 |
| 67 | A-27 | B-73 |

As the results of the evaluation of each sample in the manner as described above, it can be seen that each of the light-sensitive materials according to the present invention is excellent in charging properties, dark charge retention, and photosensitivity, and provides a clear duplicated image free from background fog even when processed under severe conditions of high temperature and high humidity (30° C. and 80% RH). Further, when these materials were employed as offset master plate precursors, more than 10,000 prints of a clear image free from background fog were obtained respectively.

While the invention has been described in detail and with reference to specific embodiments thereof, it will be apparent to one skilled in the art that various changes and modifications can be made therein without departing from the spirit and scope thereof.

What is claimed is:

1. An electrophotographic light-sensitive material comprising a support having provided thereon at least one photoconductive layer containing an inorganic photoconductive substance and a binder resin, wherein the binder resin comprises (A) at least one resin having a weight average molecular weight of from $1 \times 10^3$ to $2 \times 10^4$ and containing not less than 30% by weight of a copolymerizable component corresponding to a repeating unit represented by the general formula (I) described below and having at least one acidic group selected from the group consisting of —PO$_3$H$_2$, —SO$_3$H, —COOH, —OH,

(wherein R represents a hydrocarbon group or —OR' (wherein R' represents a hydrocarbon group)) and a cyclic acid anhydride-containing group at one of the terminals of the main chain thereof;

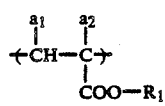

wherein $a_1$ and $a_2$ each represents a hydrogen atom, a halogen atom, a cyano group or a hydrocarbon group; and $R_1$ represents a hydrocarbon group; and (B) at least one copolymer resin having a weight average molecular weight of from $3 \times 10^4$ to $1 \times 10^6$ and containing at least one polyester type macromonomer having a weight average molecular weight of from $1 \times 10^3$ to $1.5 \times 10^4$ and represented by the following general formula (IIIa), (IIIb), (IIIc), or (IIId):

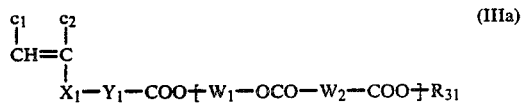

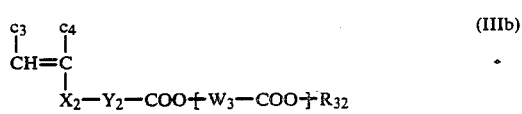

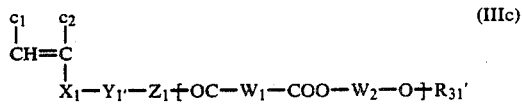

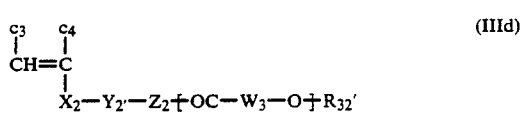

wherein the group in the brackets represents a recurring unit; $c_1$ and $c_2$, which may be the same or different, each represents a hydrogen atom, a halogen atom, a cyano group, a hydrocarbon group having from 1 to 8 carbon atoms, —COO—V$_1$, or —COO—V$_2$ bonded through a hydrocarbon group having from 1 to 8 carbon atoms (wherein V$_1$ and V$_2$ each represents a hydrocarbon group having from 1 to 18 carbon atoms); X$_1$ represents a direct bond, —COO—, —OCO—, -(CH$_2$)$_{l_1}$-COO—, -(CH$_2$)$_{l_2}$—OCO— (wherein $l_1$ and $l_2$ each represents an integer of from 1 to 3),

(wherein d$_1$ represent a hydrogen atom or a hydrocarbon group having from 1 to 12 carbon atoms), —CONHCONH—, —CONHCOO—, —O—,

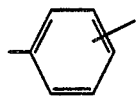

or —SO$_2$—; Y$_1$ represents a group bonding X$_1$ to —COO—; W$_1$ and W$_2$, which may be the same or different, each represents a divalent aliphatic group, a divalent aromatic group (each of the aforesaid groups may have, in the bond of each divalent organic moiety, at least one bonding group selected from —O—, —S—,

(wherein d$_2$ represents a hydrogen atom or a hydrocarbon group having from 1 to 12 carbon atoms), —SO$_2$—, —COO—, —OCO—, —CONHCO—, —NHCONH—,

(wherein $d_3$ has the same meaning as $d_2$),

(wherein $d_4$ has the same meaning as $d_2$), and

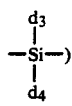

or an organic moiety composed of a combination of these moieties; $R_{31}$ represents a hydrogen atom or a hydrocarbon group; $c_3$ and $c_4$ have the same meaning as $c_1$ and $c_2$; $X_2$ has the same meaning as $X_1$; $Y_2$ represents a group bonding $X_2$ to —COO—; $W_3$ represents a divalent aliphatic group; $R_{32}$ has the same meaning as $R_{31}$; $R_{31}'$ represents a hydrogen atom, a hydrocarbon group or —COR$_{33}'$ (wherein $R_{33}'$ represents a hydrocarbon group); $Y_1'$ represents a group bonding $X_1$ to $Z_1$; $Z_1$ represents —CH$_2$—; —O—, or —NH—; $Y_2'$ represents a group bonding $X_2$ to $Z_2$; $Z_2$ has the same meaning as $Z_1$; and $R_{32}'$ has the same meaning as $R_{31}'$.

2. An electrophotographic light-sensitive material as claimed in claim 1, wherein the copolymerizable component corresponding to a repeating unit represented by the general formula (I) is a copolymerizable component corresponding to a repeating unit represented by the following general formula (IIa) or (IIb):

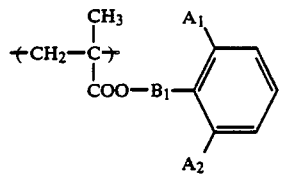

(IIa)

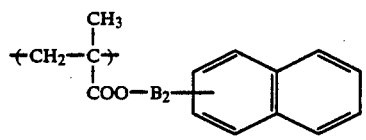

(IIb)

wherein $A_1$ and $A_2$ each represents a hydrogen atom, a hydrocarbon group having from 1 to 10 carbon atoms, a chlorine atom, a bromine atom, —COD$_1$ or —COOD$_2$, wherein $D_1$ and $D_2$ each represents a hydrocarbon group having from 1 to 10 carbon atoms, provided that both $A_1$ and $A_2$ do not simultaneously represent hydrogen atoms; and $B_1$ and $B_2$ each represents a direct bond or a linking group containing from 1 to 4 linking atoms, which connects —COO— and the benzene ring.

3. An electrophotographic light-sensitive material as claimed in claim 2, wherein the linking group containing from 1 to 4 linking atoms represented by $B_1$ or $B_2$ is —(CH$_2$)$_{n1}$— ($n_1$ represents an integer of 1, 2 or 3), —CH$_2$OCO—, —CH$_2$CH$_2$OCO—, —(CH$_2$O)$_{n2}$— ($n_2$ represents an integer of 1 or 2), or —CH$_2$CH$_2$O—.

4. An electrophotographic light-sensitive material as claimed in claim 1, wherein the acidic group bonded to the terminal of the polymer main chain of the resin (A) is selected from —PO$_3$H$_2$ —SO$_3$H, —COOH,

(wherein R represents a hydrocarbon group or —OR' wherein R' represents a hydrocarbon group), and a cyclic acid anhydride-containing group.

5. An electrophotographic light-sensitive material as claimed in claim 1, wherein the resin (A) further contains from 1 to 20% by weight of a copolymerizable component having a heat- and/or photocurable functional group.

6. An electrophotographic light-sensitive material as claimed in claim 1, wherein the resin (B) has at least one acidic group selected from —PO$_3$H$_2$, —SO$_3$H, —COOH, —OH,

(wherein $R_0$ represents a hydrocarbon group or —OR$_0'$, wherein $R_0'$ represents a hydrocarbon group), and a cyclic acid anhydride-containing group at the terminal of the main chain 7. An electrophotographic light-sensitive material as claimed in claim 1, wherein a content of the macromonomer in the resin (B) is from 0.5 to 80% by weight.

8. An electrophotographic light-sensitive material as claimed in claim 1, wherein the resin (B) further contains from 30 to 99% by weight of a copolymerizable component corresponding to a repeating unit represented by the general formula (I).

9. An electrophotographic light-sensitive material as claimed in claim 1, wherein a weight ratio of the resin (A) to the resin (B) is 5 to 80:95 to 20.

* * * * *